US012150907B2

(12) United States Patent
O'Keefe et al.

(10) Patent No.: US 12,150,907 B2
(45) Date of Patent: Nov. 26, 2024

(54) PATIENT MOVING DEVICE

(71) Applicant: HAPAI TRANSFER SYSTEMS LIMITED, Christchurch (NZ)

(72) Inventors: Alex O'Keefe, Christchurch (NZ); Keith Alexander, Christchurch (NZ)

(73) Assignee: Hapai Transfer Systems Limited, Christchurch (NZ)

( * ) Notice: Subject to any disclaimer, the term of this patent is extended or adjusted under 35 U.S.C. 154(b) by 424 days.

(21) Appl. No.: 17/414,951

(22) PCT Filed: Dec. 17, 2019

(86) PCT No.: PCT/NZ2019/050160

§ 371 (c)(1),
(2) Date: Jun. 17, 2021

(87) PCT Pub. No.: WO2020/130853

PCT Pub. Date: Jun. 25, 2020

(65) Prior Publication Data

US 2022/0133565 A1 May 5, 2022

(30) Foreign Application Priority Data

Dec. 17, 2018 (NZ) ........................................ 749365

(51) Int. Cl.
*A61G 7/10* (2006.01)

(52) U.S. Cl.
CPC ......... *A61G 7/1017* (2013.01); *A61G 7/1046* (2013.01); *A61G 7/1086* (2013.01); *A61G 7/1096* (2013.01); *A61G 2200/34* (2013.01)

(58) Field of Classification Search
CPC ...... A61G 7/10; A61G 7/1017; A61G 7/1046; A61G 7/1086; A61G 7/1096; A61G 2200/34; A61G 5/14
See application file for complete search history.

(56) References Cited

U.S. PATENT DOCUMENTS 4,435,863 A * 3/1984 Lerich .................. A61G 7/1046
5/87.1
5,117,516 A 6/1992 Penner
(Continued)

FOREIGN PATENT DOCUMENTS

DE 102017109876 A1 11/2018
EP 0547901 A1 6/1993
(Continued)

OTHER PUBLICATIONS

WO 2013051492—english translation (Year: 2013).*
(Continued)

*Primary Examiner* — Justin C Mikowski
*Assistant Examiner* — Amanda L Bailey
(74) *Attorney, Agent, or Firm* — Resonance IP Law, PC

(57) ABSTRACT

A patient-moving device (1) for patient handling. The device (1) includes a chassis (3), patient-support (5), and knee-rest (37). The device (1) includes a primary pivot (17) and a secondary pivot (11) located eccentrically from the primary pivot (17). A reorientation mechanism (4) is coupled to the patient-support (5), primary pivot (17) and chassis (3). During operation to reorientate the reorientation mechanism (4) during patient handling the patient support (5) is movable relative to the chassis (3) by rotation of the primary pivot (17) and/or secondary pivot (11) and the knee rest (37) is movable relative to at least a portion of the chassis (3).

19 Claims, 25 Drawing Sheets

(56) References Cited

U.S. PATENT DOCUMENTS

| | | | | |
|---|---|---|---|---|
| 5,148,557 | A | 9/1992 | Fridman | |
| 8,832,874 | B2 * | 9/2014 | Alexander | A61G 7/1017 254/10 R |
| 10,045,895 | B2 | 8/2018 | Eklof et al. | |
| 2019/0254896 | A1 | 8/2019 | Hacikadiroglu | |

FOREIGN PATENT DOCUMENTS

| | | | | | |
|---|---|---|---|---|---|
| EP | 1029524 | A2 | * | 8/2000 | A61G 7/1017 |
| EP | 3721849 | A1 | | 10/2020 | |
| JP | 2000-296154 | A | | 10/2000 | |
| JP | 2010-279491 | A | | 12/2010 | |
| JP | 2016064079 | A | * | 4/2016 | |
| JP | 2016154773 | A | | 9/2016 | |
| JP | 2016189967 | A | | 11/2016 | |
| JP | 2017023298 | A | * | 2/2017 | |
| JP | 2017023300 | A | * | 2/2017 | A61G 5/00 |
| JP | 2017225553 | A | | 12/2017 | |
| JP | 6462384 | | | 1/2019 | |
| WO | 1996011658 | A1 | | 4/1996 | |
| WO | WO-2011002312 | A1 | * | 1/2011 | A61G 3/0236 |
| WO | WO-2013051492 | A1 | * | 4/2013 | A61G 7/1017 |
| WO | 2015004702 | A1 | | 1/2015 | |
| WO | 2015004704 | A1 | | 1/2015 | |
| WO | 2017199349 | A1 | | 11/2017 | |

OTHER PUBLICATIONS

JP 2017023298—english translation (Year: 2017).*

Tibia. Cleveland Clinic. 2022. https://my.clevelandclinic.org/health/body/23026tibia#:~: text=Your%20tibia%20is%20the%20second,are%20around%2015%20inches%20long. (Year: 2022).*

PCT/NZ2019/050160, Hapai Transfer Systems Limited, International Search Report Dated Apr. 3, 2020, ISA/EP, 3 pp.

PCT/NZ2019/050160, Hapai Transfer Systems Limited, Written Opinion Dated Apr. 3, 2020, ISA/EP, 9 pp.

* cited by examiner

PATIENT MOVING DEVICE

TECHNICAL FIELD

This invention relates to a patient moving device for moving a person of limited mobility. In particular, the device is one for moving a patient between seated and transport positions.

BACKGROUND ART

The movement of persons having limited mobility presents a challenge. Often elderly, sick, or physically impaired individuals lack the strength to lift themselves from a seated position into a traditional transport aid such as a walking frame or a wheelchair for transport to another location. Lifting these individuals to assist their transfer can be awkward and may require a level of strength that a caregiver is unable to provide physically or according to safety guidelines.

Additionally, it can be difficult for caregivers to position patients far enough back in their chairs when returning the person of limited mobility to the seated position.

Some devices have been suggested to assist with transferring persons of limited mobility from a seated position. However, many existing devices are complex, with a large number of moving components and/or electrical systems, making them expensive. In addition, these devices typically have a large footprint and are heavy, making them impractical for many applications, particularly for use in the home.

It is also axiomatically desirable to minimise any discomfort experienced by the person being transferred due to the motion and/or ergonomics of the device. U.S. Pat. No. 8,832,874 by Alexander describes various embodiments of a person moving device for moving patients of limited mobility. Although effective in lifting and moving patients, the Alexander embodiments were found to be uncomfortable for certain patients during the lifting and lowering process.

It is an object of at least preferred embodiments of the present invention to address one or more of the above-mentioned disadvantages and/or to at least provide the public with a useful alternative.

In this specification where reference has been made to patent specifications, other external documents, or other sources of information, this is generally to provide a context for discussing features of the invention. Unless specifically stated otherwise, reference to such external documents or sources of information is not to be construed as an admission that such documents or such sources of information, in any jurisdiction, are prior art or form part of the common general knowledge in the art.

SUMMARY OF INVENTION

Reference herein that is made to an axis, pivot, pivot axis, rotation or the like should be understood to include both reference to (or relating to) a physical axis formed at a connection of two objects and/or to 'effective', or 'virtual' pivot axis.

It will be readily appreciated by one skilled in the art, that rotation is axiomatically defined according to a frame of reference, by which the relative rotation of one point may be measured/compared with respect to another point. As such, a pivot axis may also involve an actual physical/mechanical pivot axis or, may simply be defined in geometric, virtual or effective terms as the point/axis about which relative rotation of any other points are measured. Solely by way of illustration, a circular hoop and a spoked wheel of the same diameter may have the same centre of rotation, while the hoop has a virtual, effective or geometric pivot axis/centre of rotation, while the spoked wheel also has a physical, mechanical pivot point/axis.

Numerous situations and circumstances exist whereby an at least partially incapacitated, injured or infirmed person (hereinafter referred to as a 'patient') in some measure requires assistance in movement. In particular, the need to be moved safely and comfortably between sitting positions is synonymous with the ubiquitous daily human needs for toileting, washing, clothing changes and the like. The present invention is particularly, though not exclusively, suited to moving such a patient with the assistance of at least one other person, hereinafter referred to as a 'carer'.

As used herein, the term chassis includes any rolling chassis or any other mobile or static structure, platform, housing, framework, body, monocoque, or other load-bearing configuration.

As used herein, the term "terrain", includes the earth's surface or any surface overlaying same including, but not limited to, flooring, carpet, roadways, footpaths, lifts and the like.

As used herein, the terms "person" moving, lifting, lowering, transporting, or relocating and/or "patient" moving, lifting, lowering, transporting, or relocating should be understood to be encompassed by the terms "patient" (or person) moving, unless explicitly stated to the contrary.

To aid brevity, the term 'lifting' will be used to refer interchangeably to both the lifting and converse 'lowering' of the person.

It will also be understood that any angular orientation term referenced with respect to the patient moving device and herein described or defined with respect to both an orientation and a clockwise or anticlockwise rotation therefrom, should be interpreted as being viewed from an observer with the patient or 'rear' side of the patient moving device to the observer's left and the carer or 'front' side to the observer's right.

It should be understood the terms patient and carer are not limiting and include, respectively, any person requiring movement assistance and any person assisting with said movement and are not limited, respectively, to formally/officially designated patient or health-care professional.

The present invention relates to a person-moving device, hereinafter referred to as a 'patient moving device'.

A desirable interaction between the patient and carer through the use of a patient moving device is a balance of ensuring the patient's physical comfort and safety, whilst efficiently utilising the physical input of the carer without requiring difficult, strenuous or complex inputs.

In a commonplace, exemplary situation in a nursing care facility/assisted living-type environment, an elderly and/or infirmed patient seated in a chair may be unable to raise themselves from the chair unassisted. Similarly, further assistance may be required to transport them to, and be safely lowered onto, the toilet, together with appropriate clothing and sanitary assistance and then reversing the procedure to be returned to their chair.

As used herein the term 'moving' should be understood to refer to any reorientation or repositioning and includes any rotation or linear movement or measurements thereof and any combination of the aforementioned.

It should also be explicitly noted, that as used herein, the term "person-moving device" also includes such a device configured for use in a fixed or static position, (either temporarily or permanently), and includes lifting a seated person or patient to undertake any desired or required activities before being subsequently lowered into the same seating position.

Patients with weight-bearing capacity and/or sufficient upper-body strength and dexterity to raise themselves from a seated position are often also able to utilise other mobility means such as walking frame, crutches, wheelchairs and the like. Consequently, the present invention is particularly, though not exclusively, suited for use with patients with at least partially restricted upper-body strength and/or dexterity.

Carers such as family, friends and even trained health care professionals are vulnerable to musculoskeletal injuries during patient handling activities. This injury risk is exacerbated if available lifting equipment is complex, slow/difficult to implement and/or otherwise places additional time-pressure on busy staff.

Protecting the carers from injury during patient handling, whilst ensuring effective patient handling requires the efficient application of the carer's physical strength via simple, controllable, safely constrained movements.

Fully-electrically-powered lifting devices remove any direct need for a carer to provide the motive lifting force. However, the motive electrical power must be supplied either by potentially cumbersome cabling and/or stored in heavy battery storage, thus adding complexity and reduced device availability associated with device re-charging. In contrast, a fully mechanical, or electro-mechanical (mechanical with electric power assistance) device offers simplicity of operation, immediate availability and high reliability.

Consequently, the use of a mechanical mechanism employing some form of mechanical advantage would enable a carer to apply a reduced force over a longer distance through a constrained path to avoid repetitive, strenuous, or irregular motion to lift or lower the patient during patient moving.

It will be understood that a given population includes a distribution of size and weight individuals. As discussed earlier, the predominant patient-type suited for use with a patient-moving device as described herein are primarily, (although not exclusively) elderly, injured and/or infirmed adults. However, despite the physical variability of such patients, it is possible to define certain physical parameters that may validly apply to any user, particularly in conjunction with one or more criteria to eliminate highly atypical body size and/or weight. As an example, a patient body-weight upper limit of 120 Kg encompasses the $95^{th}$ percentile of the population in almost all countries, including New Zealand and the USA.

Preferably, the device is adapted for use with patients up to 120 Kg though this should not be seen to be limiting. The purpose of this criteria is to enable the input lifting forces applied by the carer to be limited to within manageable and safe levels for most users.

Turning to the interaction between the patient and the device it can be seen that, irrespective of size and shape variations in patients, the location of certain body portions may be accurately inferred or deduced due to their interrelationship with corresponding portions of the device.

Thus, for reference purposes only, a seated patient can be considered to have:

- a torso inclination angle $\theta$ with respect to vertical, where a substantially upright posture with a vertical torso gives an inclination angle $\theta \sim 0°$,
- a hip angle $\beta$, subtending the interior angle between the axis of the patient's femur/thigh and their torso/trunk where a thigh/femur orientation substantially orthogonal to the torso, gives a hip angle of $\beta \sim 90°$,
- a knee angle $\lambda$, denoting the interior angle between the thigh/femur and the shin/tibia—where a shin/tibia orientation substantially orthogonal to the thigh/femur, gives a knee angle $\lambda \sim 90°$, and
- a shin angle $\Omega$ with respect to vertical, where a substantially vertical shin/tibia gives a shin angle $\Omega \sim 0°$.

It can be seen that, irrespective of the patient's height and shape, when a patient's anterior torso is engaged in intimate contact with a corresponding patient-support of the device, the patient-engaging outer surface of the patient-support and the patient's anterior torso/chest can be considered spatially equivalent, i.e. the trajectory of the patient-engaging surface of the patient-support during patient handling is a valid representative, proxy, or substitute for the movement trajectory of the corresponding anterior torso/chest of any size or weight patient.

Similarly, when a patient's anterior knee surface is engaged in direct contact with a corresponding knee-support part of the device (hereinafter termed knee-rest), the patient-engaging surface of the knee-rest and the patient's anterior knee surface can be considered spatially equivalent, i.e. the trajectory of the patient-engaging surface of the knee-rest during patient handling is a substantially, or effectively valid representative, proxy, or substitute for the movement trajectory of the patient's anterior knee surface of any size or weight patient.

Furthermore, a knee-rest connected to the device at a knee-rest pivot axis may be configured such that the patient's knee joint pivot and the knee-rest pivot axis are aligned substantially co-axially when the patient-engaging surface of the knee-rest and the patient's anterior knee surface are in contact. The knee joint pivot and the knee rest pivot axis can thus be considered directly correlated and spatially equivalent, i.e. the trajectory of the knee-rest pivot axis during patient handling is a valid representative, proxy, or substitute for the movement trajectory of the corresponding knee-joint of any size or weight patient.

Moreover, it will be further appreciated that certain other locations of a patient's body such as the patient's centre of mass or Jugular notch may potentially be physically restricted from being in direct physical contact with certain portions of a patient-moving device during patient handling. However, such locations are also potentially valuable reference points to track and define the motion of separate portions of the patient's body during patient handling. The centre of mass is a helpful measure of the effective centre region of the patient, while the Jugular notch is representative of the upper extremities of the body, whilst still being in a fixed spatial relationship with the torso, unlike the neck and head.

Whilst the precise location of different patient's centre of mass or Jugular notch will vary based on body shape, designating a representative reference value still provides a means to unequivocally, repeatably and reliably track spatial positions that represent typical centre of mass or Jugular notch positions of patients. As such, the designations centre of mass and Jugular notch are used herein as reference labels generic to all patients for designated/defined spatial positions offset from the device at defined positions representative of a typical patient's centre of mass or Jugular notch.

Correspondingly, a predetermined spatial offset from portions of the device, (such as a patient-support, and/or knee-rest) may also be incorporated in the spatial definition of the patient's posterior torso surface, spine, hip joint/pivot axis, femur and/or knee joint/pivot axis.

It will thus be understood that as used herein, definitions of the movement of various parts of the device during patient handling may be made with reference to pivots, points or axes, offset spatially from the physical device. In addition to reference points located on the device, the offset reference positions include the orientation, angle and/or position designated as a patient's:

Centre of mass;
Jugular notch;
torso;
femur;
tibia;
hip joint/axis:
knee joint/axis, and/or
ankle joint/axis.

It will be appreciated that the magnitude of the offset distance of any given reference point may be specific or calculated as a matter of convenience and operational preference, in order to facilitate useful comparison and/or performance analysis.

Thus, according to a first aspect of the present invention, there is provided a patient-moving device for patient handling, the patient handling including raising and lowering a seated patient between sitting and transport positions, and moving a raised patient in the transport position, said device including:

a terrain-engaging mobile chassis;
a primary pivot;
a patient-support, connected to said primary pivot and formed to engage with, and at least partially support, a patient's anterior torso during patient handling;
at least one knee-rest, formed to engage with, and at least partially support, a patient's anterior knee surfaces during patient handling;
a reorientation mechanism, coupled to said patient-support and chassis,
wherein:
said patient support and primary pivot are pivotable about a primary pivot axis;
said patient support is movable relative to the chassis;
said chassis and said primary pivot are movable relative to each other, and
operation to reorientate the reorientation mechanism during patient handling to raise or lower a seated patient between the initial sitting position and the transport position thus re-orientates the patient support between a patient loading/unloading configuration and a patient transport configuration.

Preferably said relative movement between the chassis and said primary pivot may include rotational, pivoting, linear, curvilinear or combinations thereof.

Preferably said relative movement between the chassis and said primary pivot is provided, at least in part, by a secondary pivot, pivotable about a secondary pivot axis and located eccentrically to said primary pivot.

Preferably, the at least one knee rest is movable relative to at least a portion of the chassis.

According to another aspect of the present invention there is provided a patient-moving device for patient handling, said patient handling including raising and lowering a seated patient between sitting and transport positions, and moving a raised patient in the transport position, said device including:

a terrain-engaging mobile chassis;
a primary pivot, pivotable about a primary pivot axis;
a secondary pivot, pivotable about a secondary pivot axis and located eccentrically from said primary pivot;
a patient-support, formed to engage with, and at least partially support, a patient's anterior torso during patient handling;
at least one knee-rest, formed to engage with, and at least partially support, a patient's anterior knee surfaces during patient handling;
a reorientation mechanism, and coupled to said patient-support, primary pivot and chassis,
wherein:
operation to reorientate the reorientation mechanism during patient handling to raise or lower a seated patient between sitting and transport positions respectively re-orientates the patient support between a patient loading/unloading configuration and a patient transport configuration;
said patient support is movable relative to the chassis by rotation of said primary pivot and/or said secondary pivot, and
the at least one knee rest is movable relative to at least a portion of the chassis.

Preferably, the at least one knee rest is movable relative to at least a portion of the chassis by being pivotable about a tertiary pivot axis, the tertiary pivot axis located eccentrically from said primary pivot axis.

Preferably, the at least one knee rest is pivotable about a tertiary pivot axis, the tertiary axis preferably located on the chassis.

Preferably, the at least one knee rest is movable relative to at least a portion of the chassis by being pivotable about a tertiary pivot axis located on the chassis.

Preferably, the tertiary pivot axis is coaxial with said secondary pivot axis.

Preferably, the at least one knee rest is pivotable about said tertiary or secondary pivot axis in conjunction with said primary pivot.

Preferably, the at least one knee rest is connected to, or proximal to, or located at said primary pivot.

Preferably, the at least one knee rest movement during patient handling correlates with, or is proximal to, the movement of said primary pivot.

Preferably, the secondary pivot axis is located on the chassis.

It should be appreciated that the at least one knee rest may include componentry and structure additional to a contact surface upon which the patient's knees may rest and thus reference herein to the term "knee rest" should preferably be understood to refer to a structure including a contact surface formed to engage with, and at least partially support, a patient's anterior knee surfaces during patient handling.

It will be axiomatic to one skilled in the art, that configuring the knee-rest of a patient handling device to be movable during patient handling is functionally, conceptually and practically different from simply incorporating a means to adjust the knee-rest position before use to accommodate different patient sizes.

Preferably, said reorientation mechanism is configured to enable pivoting of the patient support by said primary pivot about a primary pivot axis.

As will be well understood, the mass of the patient being supported by the patient support can be considered mechanically equivalent to the same mass concentrated at a single point, i.e., the patient's centre of mass. It has been determined that the variations in position of the centre of mass, in the sagittal plane, from the full size and weight range of patients able to use the patient moving device lie within the area (herein a centre-of-mass aggregation region) of a 200 mm sided square, i.e. +/−100 mm from a centre-point of the square. Moreover, it has further been determined that said centre-of-mass aggregation region geometric centre-point would be positioned 340 mm horizontally and 270 mm vertically above (or 434 mm at 38.5° from) said primary pivot for a given patient using the patient moving device. As previously referenced, the nomenclature used herein designates the term 'centre-of-mass', 'Centre-of-Mass', as referring to, or relating to the natural meaning of the terms, i.e., the centre of mass of any given patient, while the part-capitalized abbreviation 'CoM' specifically relates to said centre of mass aggregation region geometric centre-point.

Thus, given the patient support is coupled to the primary pivot, and is engaged with a patient's anterior torso throughout patient handling, it follows that said centre-point of the region enclosing the centre of mass location for all patients is:

a representative Centre of Mass (CoM) of any patient, and functionally equivalent to being rigidly connected by said reorientation mechanism to said primary pivot by a linkage of 434 mm orientated at 38.5° above horizontal for a seated patient with an upright, substantially vertical torso with an inclination angle θ~0° and knees engaged with said at least one knee rest such that the patient's knee-joint pivot axis is co-axial with said primary pivot.

This allows the trajectory path of the CoM to provide a reliable and accurate representative, proxy or surrogate for the trajectory path of all patients during patient handling.

Preferably, said reorientation mechanism includes an operating handle, preferably manually operable by a carer during patient handling.

Preferably, said operating handle is connected to said primary pivot and operable to rotate the patient support about said primary pivot axis.

It will be appreciated that the reorientation mechanism of the patient-moving device may be adapted to replace or supplement manual operation of an operating handle by a carer by incorporation of powered components controlled by;

- electronic operating controls, operable by a carer or patient during patient handling;
- remote operation controls, operable by a carer, or
- autonomous controls, at least partially operable by a computer independently of direct carer or patient control.

It will further be appreciated that the specific means of operating the patient-moving device does not affect the advantageous features and beneficial patient-handling capabilities described further herein. Consequently, to aid clarity and avoid prolixity and unless otherwise stated, the patient-moving device is described with respect to being manually operable by a carer during patient handling operation. This does not indicate the invention is in any way restricted to same.

Preferably, said reorientation mechanism includes at least one of:

- a multi-bar linkage;
- a geared mechanism;
- a slidable carriage coupled to a curved, curvilinear or linear track;
- at least one pivot;
- a translation mechanism;
- any combination, multiple or permutation of same.

According to another aspect, the present invention includes a method of patient handling using a patient-moving device substantially as described herein.

According to another aspect, the present invention includes a method of patient handling using a patient-moving device substantially as described herein, said patient handling including raising and lowering a seated patient between a sitting position and a transport position, and moving a raised patient in the transport position, said method including:

- operation to reorientate the reorientation mechanism during patient handling to raise or lower a seated patient between sitting and transport positions, re-orientating the patient support between a patient loading/unloading configuration and a patient transport configuration;
- said patient support moving relative to the chassis by rotation of said primary pivot and/or said secondary pivot, and
- the at least one knee rest moving relative to at least a portion of the chassis.

The differing forms of reorientation mechanism are later considered in further detail. Firstly however, it is beneficial to consider the desired performance parameters for the reorientation mechanism for patient handling, in order to clearly appreciate the significance, performance and consequences of the various components, configurations and their movements encompassed in the present invention as described herein Inherent characteristics of many elderly and infirmed patients include decreased flexibility, muscular strength and endurance and increased levels of stomach fat. Collectively, these characteristics lead to difficulty in being comfortably positioned with a hip angle (β) of less than ~80°. Maintaining a substantially constant hip angle (of about 87° or greater) during patient handling is thus desirable to minimise discomfort.

Preferably, a substantially constant hip angle R is maintained during patient handling.

Preferably, the patient moving device is configured such that the patient's seated hip angle β is maintained substantially constant during raising, lowering and transport and is preferably maintained between 80-110°, and more preferably between 85-95° or 87-90°.

It will be understood that any attempt to raise an unrestrained seated patient by applying a force with at least some forward component (i.e. not a solely vertical force) will also cause hip flexion as the torso pivots forwards, thus reducing the hip angle β. The patient-support is preferably formed and configured to engage with, and support, a patient's anterior torso during patient handling. This also acts to at least partially restrain and/or stabilise the patient's torso during raising or lowering of the patient.

In order to raise a patient vertically upwards from a seated position, without pulling on the patient's body or clothing requires some form of lifting surface (e.g. patient slings) to be placed underneath the patient. The difficulty of placing such a lifting surface under the patient is exacerbated by the need to, at least partially, lift the patient vertically.

Consequently, it is highly desirable for the lifting/lowering movement of the patient handling to include some form of horizontal, and optionally, rotational movement, during which the patient's anterior torso is engaged with the patient-support. The magnitude of rotation of the patient's torso will vary:

- the proportion of the patient's body weight distributed between the patient's legs and the patient moving device;
- the stability of the combined patient and patient moving device, and
- the input force required by the carer to move the patient.

It has been determined that a patient torso inclination angle θ of about 70° from vertical provides an optimum transport position during patient handling. The desired degree of torso inclination, as experienced by the patient, is a position absent a feeling they might fall forwards when at high angular values closer to horizontal, while avoiding a feeling of slipping from engagement with the patient-support at lower angles with a greater vertical component.

Thus, it will be understood the patient moving device may still be effective in patient-handling for a wider range of torso angles. In one embodiment, said patient-support is preferably orientated in the transport position to provide a torso inclination angle θ between 50°-90°. Preferably, said torso inclination angle θ is between 60°-80°.

Axiomatically, to reorientate the patient's torso from vertically upright to an inclination angle θ of, for example, 70°, requires rotation. The specifics of different pivoting configurations that may be implemented are later discussed in detail. It will be apparent however that a natural potential position for a single pivot axis would be at the patient's knees, given this mimics the natural action of the knees for an able person standing from a sitting position. If the, at least one, knee-rest is in a fixed position, for example, the knee rest inherently provides a fulcrum to cause the patient's upper body above the knee to pivot about the knee joint pivot.

Preferably the movement of the patient support with respect to the chassis may include rotation, pivoting, linear, curvilinear or combinations thereof.

Preferably, the reorientation mechanism is configured such that rotation of the operating handle causes rotation of the patient support about the primary pivot axis.

In one embodiment, the reorientation mechanism is configured such that rotation of the operating handle causes rotation of the patient support relative to the at least one knee rest.

Preferably, the handle is configured to rotate about the primary pivot axis.

Preferably, the reorientation mechanism includes a coupler link and the operating handle is coupled to the patient support via the coupler link and/or reorientation mechanism.

The term 'coupler link' is established as a term of art in multi-bar mechanical linkages. As used herein however, the term coupler-link is not limited to same and should be interpreted broadly to include any form of linkage and additionally includes any object, structure, mechanism coupling, attachment, mounting, housing and/or any other means of connection.

The use of a primary pivot by which the patient support pivots about the primary pivot axis enables the use of a patient-support in the form of e.g. a patient-support, fixed rigidly to the reorientation mechanism. The patient torso and patient-support are thus maintained in a generally constant spatial-positioning relative to each other as the torso of the patient engaged with the fixed patient-support also pivots about the primary pivot axis.

The patient-support may take differing forms, ranging from a simple padded horizontal bar, to a laterally enlarged, cushioned plate or pad or the like, optionally shaped to cooperate with the contours of a patient's torso contacted by the patient-support.

However, greater flexibility and patient comfort may be achieved for a greater variety of body shapes/sizes if the patient support is adjustable, rather than being fixed in only a single position relative to the reorientation mechanism.

Therefore, preferably said patient-moving device includes a movable patient-support, allowing adjustment to one of a plurality of positions relative to the reorientation mechanism. Preferably, the patient-support is movable with respect to the coupler link, permitting horizontal and/or vertical adjustability. Preferably, the patient support is movable when said device is in said loading/unloading position.

The horizontal adjustment may allow the device to be initially positioned with the patient's knees engaging with the knee-rests, and thereafter adjusting the patient support horizontally to engage comfortably and securely with the patient's anterior torso. A capacity for vertical adjustment enables the height of the patient-support to be adjusted to ensure positioning in comfortable contact with the upper surface of the patient's thighs.

Ensuring close engagement of the chest-support with the patient's anterior torso thereby assists in minimising dislocation during patient handling movement between a sitting position and a transport position. Patients with sufficient upper-body strength may be able to maintain a grasp of the device during patient handling to assist in their own stability and feeling of security. However, as discussed earlier, patients without the ability to maintain their own engagement with the device during patient handling significantly benefit from assistance in maintaining their posture and engagement with the patient-support during patient handling.

Thus, the patient moving device preferably includes a patient securement strap extending from the patient moving device and configured to form a loop around at least the patient's posterior torso in use.

The patient securement strap is preferably fitted around the rear of the patient in order to secure the patient against the patient-support and to provide security against the patient falling. Preferably, the patient securement strap has an adjustable length and thus can be tightened or loosened about the patient to ensure an optimum fit.

One or more strap securement points may be provided on the reorientation mechanism and/or other portions of the patient-support device, including a coupler link, frame, bracket and/or the operating handle.

The patient securement strap provides the ability to assist a slumped seated patient in raising their torso upright. It will also be readily apparent that by appropriately tightening the patient securement strap to securely restrain the patient against the patient support during patient handling, any risk of the patient slipping downwards or laterally during patient handling is greatly minimised. Furthermore, the maintenance of the patient's torso position with respect to the patient support may ensure the patient's hip angle R is maintained between 80-110°, and preferably between 85-95° or 87-90° during patient handling.

Simple prior art straps or slings used to assist in patient handling also typically pass around a patient's posterior torso and, in some cases, pass under the seated patient's hips/thighs. Notwithstanding the difficulty for both a carer and a non-weight-bearing patient in positioning a strap underneath the patient (as discussed previously), it is recognised that such straps/slings typically provide only limited ability to maneuverer a patient in directions non-aligned with the direction of the applied force in the strap/sling without slippage.

In contrast, the combination of the patient support and the patient securement strap allows the patient's torso to be secured therebetween, with the compressive forces being distributed between the opposing sides of the torso. This configuration allows a higher force to be applied to a greater area of the torso with increased frictional resistance to slippage of the patient securement strap upwards towards the patient's armpits during lifting.

Optionally, the relative geometry between the patient securement strap and the patient-support can be selected to cause the patient securement strap to increase the force applied about the patient due to the process of lifting the patient. In one embodiment, the patient securement strap may be connected to the patient-support. In an alternative embodiment, the patient securement strap may be connected to the operating handle and/or coupler link.

Preferably, the patient securement strap is configured to attach to at least one of: the reorientation mechanism; the patient-support; a coupler link; a frame; a bracket; an operating handle.

Preferably, the patient securement strap is securable to the patient support at a position subtending an angle of ϕ~60° (+/−7.5°) from vertically upright with the patient support orientated in said patient loading configuration.

Preferably, the patient securement strap is securable to the operating handle at a position subtending an angle of ϕ~60° (+/−7.5°) from vertically upright with the patient support orientated in said patient loading configuration.

Preferably, the patient securement strap is securable to the reorientation mechanism at a position subtending an angle of ϕ~60° (+/−7.5°) from vertically upright with the patient support orientated in said patient loading configuration.

Preferably, the patient securement strap incorporates at least one force adjustment means. The force adjustment means may take any convenient form such as buckles, pulleys, ratchet or cam buckles, or other mechanism for adjusting the tensioned length of the belt, or in any other way adjusting the force applied to the patient by the patient securement strap.

Prior to commencing patient handling, and after the patient securement strap is placed around the patient sitting in said initial position and attached to the operating handle or patient support, the carer manually tightens the patient securement strap via the force adjustment means.

After the patient is secured and patient handling is commenced, the reorientation mechanism rotates through a small angle until the patient starts to be raised from their initial sitting position. During this initial rotation while the patient remains seated, the innate elasticity of the human torso causes the lower portion of the rotating patient support to further compress the patient's abdomen region below the ribs, whilst the greater rigidity of the ribs and sternum region resists such deformation to a greater extent. Thus, the patient support effectively becomes partially dovetailed or keyed into the region under the ribs and thus further ameliorates the propensity for the patient to slip between patient securement strap and patient support as patient handling commences.

According to a further aspect, said method of patient handling using a patient-moving device further includes:

- fitting a patient securement strap in a loop around the patient's torso posterior, and
- securing the patient securement strap to the patient support;
- adjusting the patient securement strap to engage the patient with the patient support, such that the patient securement strap is securable to the patient support at a position subtending an angle of ϕ~60° (+/−7.5°) from vertically upright with the patient support orientated in said patient loading configuration.

According to a further aspect, said method of patient handling using a patient-moving device further includes:

- fitting a patient securement strap in a loop around the patient's torso posterior, and
- securing the patient securement strap to the operating handle;
- adjusting the patient securement strap to engage the patient with the patient support, such that the patient securement strap is securable to the operating handle at a position subtending an angle of ϕ~60° (+/−7.5°) from vertically upright with the patient support orientated in said patient loading configuration.

According to a further aspect, said method of patient handling using a patient-moving device further includes:

- fitting a patient securement strap in a loop around the patient's torso posterior, and
- securing the patient securement strap to the reorientation mechanism;
- adjusting the patient securement strap to engage the patient with the patient support, such that the patient securement strap is securable to the reorientation mechanism at a position subtending an angle of ϕ~60° (+/−7.5°) from vertically upright with the patient support orientated in said patient loading configuration.

It will be self-evident that the patient securement strap and/or patient support may be used in conjunction with other patient handling devices with alternative reorientation mechanism from those described herein or even devices without any reorientation mechanism.

Preferably, the primary pivot axis is approximately co-axially aligned with a patient's knee joint pivot axis when said patient's anterior knee surface is engaged in direct contact with said at least one knee-rest.

Preferably, the at least one knee-rest position is adjustable with respect to the patient support, permitting horizontal and/or vertical adjustability.

The horizontal adjustment allows the device to be initially positioned with the patient engaging with the patient support, and thereafter adjusting the knee-rest horizontally to engage comfortably and securely with the knees. A capacity for vertical adjustment enables the height of the knee-rest to be adjusted to ensure positioning in comfortable contact. An alternative, or complementary means to accommodate the variations of patients in seating positions of differing vertical heights using a feature of a 4-bar linkage reorientation mechanism is later described more fully.

It will be apparent to one skilled in the art, that if the patient support pivots about a single primary pivot axis positioned eccentrically from the knee joint pivot axis, different parts of the patient's body would experience a differential movement during patient handling as the patient also pivots about their knee joint. The differential movement will vary with the magnitude and direction of eccentricity and if significant may lead to the adverse consequence of losing intimate engagement with the patient-support and/or discomfort for the patient, particularly if firmly secured to the patient-support by a patient securement strap.

As referenced above, utilising a single primary pivot axis, positioned at the patient's knee joint does enable the maintenance of a substantially constant hip angle (around 87°-90°) during reorientation of the patient's torso to 70° in the transport position.

However, a potentially adverse impact for many patients by such a configuration is a deleterious stretching of their hamstrings as their knee joint angle increases during lifting/rotation to reach a torso inclination of around 70°. Typically, such a motion would increase the knee joint angle (λ) from a sitting angle of around 90° to approximately 155°, whilst maintaining an ankle/tibia angle of around 2.5°. It has been found that 155° is a difficult or uncomfortable knee angle (λ)

for many elderly or infirmed patients, when their torso is orientated around 70° from vertical, due to the hamstring stretching involved.

This shortcoming may be partially addressed by moving the primary pivot axis from the knees to a region adjacent the patient's ankles, thereby pivoting the entire patient's body through a constant angle. However, this requires the patient to be placed in a highly unpleasant and impracticable position during patient handling, whilst requiring significant input force from the carer to move between sitting and transport positions.

Preferably, the at least one knee-rest and chassis are also movable relative to each other. The knee rest/chassis relative movement may include rotation, pivoting, linear, curvilinear or combinations thereof.

Preferably, the at least one knee-rest is attached to the reorientation mechanism. Alternatively, the at least one knee-rest may be attached to the chassis or other portion of the device by any convenient means including spring-biased levers, linear and/or curved tracks, cushioned/semi-elastic pads and so forth.

A more advantageous means of addressing the issue of excessive hamstring extension, is by the incorporation of a secondary pivot, allowing differential movement between different portions of the patient's body during patient handling. The secondary pivot may be connected to the at least one knee-rest and is pivotable about a secondary pivot axis located eccentrically from said primary pivot axis.

Preferably, said secondary pivot is located proximal or adjacent the ankle/tibia joint during patient handling. Preferably, the secondary pivot axis is located below and parallel to said primary pivot axis and/or a knee joint pivot axis.

Preferably, the secondary pivot is located at, or adjacent, a connection between the reorientation mechanism and the chassis.

Preferably, the at least one knee-rest is attached to the device such that the at least one knee-rest is movable about said secondary pivot axis during said reorientation. More preferably, the at least one knee-rest is attached to the reorientation mechanism such that the at least one knee-rest rotates about the secondary pivot axis as the patient support rotates about the primary pivot axis.

The effect of adding a secondary pivot axis for the at least one knee-rest to pivot about is to allow the collectively coupled reorientation mechanism and patient-support to pivot together about the connection with the chassis. Consequently, this allows the patient's knees, that are contacting the knee-rest, to also pivot about the secondary pivot axis to pivot forwards, in a direction away from the patient's hips as the patient is lifted from the sitting position. This motion mimics the unfettered natural actions of able-bodied humans rising from a sitting position.

In a single pivot axis embodiment as mentioned previously, the knee joint angle ($\lambda$) changed from a sitting angle of around 90° to approximately 155° as the patient torso inclination $\theta$ moved up to about 70°. In contrast, in embodiments including a secondary pivot, the device may enable the patient's knee joints to move forward, e.g. by 15°, about the secondary pivot axis while the patient's torso inclination $\theta$ may still be orientated up to around 70°, thus only increasing the knee joint angle $\lambda$ to 135°, a 20° reduction relative to single pivot axis embodiments.

To aid clarity, in the mathematical analysis described herein and unless otherwise specifically stated, the patient will be considered to be seated with a substantially vertical upright torso, horizontal femur/thigh and vertical tibia/shin, giving a torso inclination angle $\theta$~0°, a hip angle $\beta$~90°, knee angle $\lambda$~90°, and a shin/tibia angle $\Omega$~0. Any angular variation from these orientations in the initial seated position of the patient would simply be added or subtracted from the respective values as would be well understood by one skilled in the art.

According to one embodiment, the patient moving device is configured such that during operation to reorientate the patient support between a patient loading/unloading configuration and a patient transport configuration with a torso inclination angle $\theta$=70° the patient support rotates about said primary pivot axis through about 70° while the reorientation mechanism rotates about said secondary pivot axis up to 15°. It will be appreciated that although these values have been found to be optimal, minor variations should be considered to be encompassed.

It will be appreciated that the patient's torso inclination angle $\theta$ of a patient, initially seated substantially upright and securely engaged with the patient moving device during patient handling, will directly correspond with the magnitude of rotation about the primary pivot axis of the patient support.

Thus, according to one embodiment, during operation to reorientate the patient support between a patient loading/unloading configuration and a patient transport configuration via reorientation of the coupled reorientation mechanism, the reorientation mechanism is configured such that the primary pivot rotates through an angle of 70°, while the secondary pivot rotates through an angle $\Omega$, selected from one of:

i. $\Omega$=5° to 30°
ii. $\Omega$=11.5° to 25°
iii. $\Omega$=14° to 21°
iv. $\Omega$=15°

According to a further embodiment, during operation to reorientate the patient support through an angular movement $\theta$ between a patient loading/unloading configuration and a patient transport configuration via reorientation of the coupled reorientation mechanism, said reorientation mechanism is configured such that the primary pivot moves in an arc through an angle $\Omega$ about the secondary pivot axis, where angles $\theta$, $\Omega$, and ratios $\theta$:$\Omega$ are selected from one of:

i. $\theta$=90° to 45°,
$\Omega$=5° to 30°,
$\theta$:$\Omega$ ratio=18 to 1.5;
ii. $\theta$=90° to 50°,
$\Omega$=11.5° to 25°,
$\theta$:$\Omega$ ratio=7.8 to 2;
iii. $\theta$=60° to 80°,
$\Omega$=14° to 21°,
$\theta$:$\Omega$ ratio=5.7 to 2.9;
iv. $\theta$=700,
$\Omega$=15°, and
$\theta$:$\Omega$ ratio=4.7.

Preferably, throughout the range of movement the knee joint angle $\lambda$ (+/−10°)=(torso inclination angle $\theta$)−(tibia angle $\Omega$)+90°

It has been determined that typical patients can traverse an ankle/tibia joint axis rotation range of around −10° to +15° (with respect to vertical) without undue discomfort. Considering a typical circumstance with a patient sitting substantially upright with an approximately horizontal thigh/femur, with a shin/tibia slightly forward of vertical (i.e. an ankle joint angle of around 2.5°), lifting the patient into the transport position with a torso inclination angle $\theta$ of 70°, and an interior hip angle $\beta$ of 135°, through an ankle/tibia joint rotation at the secondary pivot of $\Omega$ around 15° produces a resultant horizontal movement of approximately 130 mm.

This horizontal component of the knee joint movement is fundamental in allowing the hip angle to be maintained substantially constant during the 70° torso inclination, whilst reducing the knee joint angle λ from a maximum extension of 155° to 135°.

Thus, preferably, during operation to reorientate the patient support between a patient loading/unloading configuration and a patient transport configuration via manipulation of the coupled reorientation mechanism, said torso inclination angle rotates though an angle θ, while said primary pivot moves in an arc though an angle Ω about the secondary pivot and a distance δ, where angles Ω, θ and distance δ and ratios δ:θ are selected from one of:

i. Ω=5° to 30°,
   θ=90° to 45°,
   δ=40 to 250 mm
   δ:θ=5.6-0.45 mm/°
ii. Ω=11.5° to 25°,
   θ=90° to 50°,
   δ=80 to 180 mm
   δ:θ=3.6-0.9 mm/°
iii. Ω=14° to 21°,
   θ=80° to 60°,
   δ=100 to 150 mm
   δ:θ=2.5-1.25 mm/°
iv. Ω=15°,
   θ=70°,
   δ=130 mm
   δ:θ=1.8 mm/°

It will thus be seen that through the capacity of a second pivot, the device is able to perform a lifting/lowering motion that supports the patient securely through a range of ankle joint, knee joint and hip joint rotation angles that are comfortable and tolerable to a wide range of potential patients.

It will also be understood that an important factor in avoiding patient discomfort during patient handling relates to the ability of the device to conform its manipulation of the patient's torso through differential movements that replicate natural and comfortable human body movements occurring during raising or lowering from a seated position. Any device pivot axis positioned substantially eccentrically from a pivot axis of the corresponding patient's body generates the potential for adverse misalignment or stress on the patient through the resulting contortions experienced during patient handling.

There are effectively three relevant human pivot axes involved during the act of extending the body from a seating position, i.e. ankle, knee and hip pivot joints. Placing a device pivot axis at the patient's hip is impractical for a wieldy mobile device without fouling the object being seated on, e.g. chair, couch, toilet, bed. Therefore, in one embodiment, the device includes pivot axes at, or proximate to, one, or both, of the patient's ankle and knee joint axes.

It will be appreciated that the human body innately possesses a degree of rotational and translational flexibility, which can accommodate small displacements (i.e. eccentricities) of device pivot axes from the corresponding human body's pivot axes. It will be appreciated that placing a pivot axis co-axially with the ankle joint axis may (though not unavoidably) also cause potential clearance issues with the legs of a chair or the like. Conversely, a person's knees are typically unimpeded by most forms of seating devices/furniture and thus presents the most attractive practical choice for a device pivot axis to be co-axial with the human pivot axis, i.e. the knee joint axis.

Thus, a device pivot axis (i.e. at the primary pivot) closely aligned or co-axial with the patient's knee joint axis may utilise the innate flexibility of the patient's ankle joint to accommodate the consequences of small displacements between the position of the secondary pivot (i.e. ankle/tibia pivot axis) and the patient's ankle joint.

Preferably, said chassis includes at least one footrest configured to support the patient's feet during patient handling. The chassis may be configured to place the height of the footrest close to the terrain surface (flooring, carpet, footpath etc) as is practicable, thus maintaining the feet position close to their normal position whilst the patient is seated. In one embodiment, the height of the chassis footrest may be adjustable.

It will thus be appreciated that including both a primary pivot and a secondary pivot provides a powerful tool for a reorientation mechanism to create a specific trajectory or path for different portions of the patient's body.

The reorientation mechanism may take numerous forms, as will be apparent to one skilled in the art. As stated earlier, the reorientation mechanism may include, but is not limited to:

a multi-bar linkage;
a geared mechanism;
a slidable carriage coupled to a curved, curvilinear or linear track;
at least one pivot;
a translation mechanism, and
any combination, multiple or permutation of same.

Considering these exemplary alternative forms of reorientation mechanism in more detail, a multi-bar linkage provides a highly convenient mechanism to configure a wide variety of movement paths. In particular, an at least 4-bar linkage may be configured to produce a curved, linear, or curvilinear path and is thus an attractive reorientation mechanism for a patient lifting device.

4-bar linkages are a highly established area of engineering, producing many recognised configurations, such as rockers, cranks, sliders and so forth with established characteristics dependant on the specific nature of the linkage lengths, interconnections and freedoms of movement.

In the application of patient handling, it will be appreciated that the output movement trajectory or path required inherently cannot include any complete rotations and thus the appropriate linkage arrangement falls into the 'rocker' mechanism category rather than any arrangement with continuous motion.

Conventionally, a 4-bar linkage is formed from a:

rigid ground link or 'frame' connected to
an input link or 'crank', in turn connected to
a 'coupler', in turn connecting to
a 'follower', which is also connected to the frame.

A 'Grashof' linkage is a planar four bar linkage with S+L>P+Q, where

S=length of shortest link,
L=length of longest link,
P and Q are the lengths of the remaining two links.

The relatively predictable and limited movement range required by the device for patient handling naturally suits a 4-bar linkage with two long linkages providing the necessary separation between the patient's feet and torso, while the two other links may be relatively shorter. One of the two shorter length links, i.e. the fixed link is most conveniently formed by the chassis, to which the long links are attached.

It is established that if the Grashof's Law condition is satisfied i.e. S+L≤P+Q, then depending on whether the shortest link 'S' is connected to the ground link by one end, two ends, or no end, there are 3 possible mechanisms, i.e.:

double crank mechanism, where S is the ground link, the input crank and output crank can rotate 360° and S+L>P+Q, double-rocker mechanism, where S is the coupler link, the coupler link can rotate 360° and S+L>P+Q, and crank and rocker mechanism, where S is the input or output crank, the input or output crank rotates 360° and S+L<P+Q.

Thus, in one embodiment, said multi-bar linkage may be a Grashof 4-bar linkage, selected from:

double crank mechanism, double-rocker mechanism, crank and rocker mechanism.

In a further embodiment, the 4-bar linkage is a Grashof double-rocker mechanism, including links S, L, P and Q, where:

L is a first support link,

P is a second support link,

S is a coupler link, and

Q is a ground link in the form of the device chassis.

Preferably, the 4-bar linkage is formed with links S, L, P and Q, configured such that:

L is a first support link of a length 420-550 mm, preferably 490 mm;

P is a second support link of a length 380-500 mm, preferably 450 mm;

S is a coupler link, of a length 30-70 mm, preferably 40 mm, and

Q is a ground link in the form of a portion of the device chassis of length 60-120 mm, preferably 86 mm The resultant path traced by the patient support resultant from the motion of a 4-bar linkage reorientation mechanism (as described above) during patient handling is a curvilinear path generated from the compounded effects of rotation of both the primary and secondary pivots. Consequently, the resultant path cannot have a constant radius, or circular arc.

Some effectual alternative representations for the rotational behaviour of a body utilise the kinematic concept of an instant centre of rotation. Also known as the instant velocity centre, the instant centre of rotation is a point fixed to (or, relative to) a body undergoing planar movement that has zero velocity at a particular instant of time while the velocity vectors of the trajectories of other points in the body generate a circular field around this point.

Multiple instant centre of rotation measurements may be performed to generate:

an averaged centre-of-rotation; i.e., the average of multiple instant centre of rotation measurements, and a centroid; i.e., the path traced by the instantaneous centre of rotation.

Preferably, the path traversed during patient handling by at least one point of the patient support, reorientation mechanism, and/or any other point (e.g. the hips, CoM, Jugular Notch) of the patient securely engaged with the patient support may be defined by at least one corresponding averaged centre-of-rotation. Preferably, said averaged centre-of-rotation is calculated from at least a start point, mid-point and end point of the patient handling to raise or lower a seated patient between sitting and transport positions.

The path traversed during patient handling by at least one point of the patient support, reorientation mechanism, and/or any other point of the patient securely engaged with the patient support may be defined by at least one corresponding centroid. Preferably, said centroid is calculated to include at least a start point, mid-point and end point of the patient handling to raise or lower a seated patient between sitting and transport positions.

It has been found that both the averaged centre-of-rotation and centroid representations for the patient-moving device are adjacently clustered in a region (herein after termed an 'effective-pivot region') located in front of the patient's knee in the horizontal plane and substantially at or below the knee and above the ankle in the vertical plane. This configuration provides the previously described, desired effects of an 'effective', 'virtual' or equivalent pivot position during patient handling which allows the patient to be tilted forwards without excessive vertical movements, whilst maintaining a feeling of security for the patient and minimising any undesirable hamstring stretching. It will be also understood that as the patient's knee is in contact with the knee-rest(s), located co-axially with the primary pivot axis, the position of the averaged centre-of-rotation and centroid representations may be readily defined with respect to the primary pivot axis.

Preferably, said averaged centre-of-rotation is located within an effective-pivot region of at least one of:

a rectangular region 250 mm×450 mm horizontally and vertically respectively, and positioned 50 mm horizontally towards the patient and 400 mm vertically downwards from the primary pivot;

a rectangular region 175 mm×325 mm horizontally and vertically respectively, and positioned 50 mm horizontally towards the patient and 400 mm vertically downwards from the primary pivot;

a rectangular region extending 150 mm horizontally towards the patient and 300 mm vertically from the primary pivot.

Preferably, said centroid is located within an effective-pivot region of at least one of:

a rectangular region 250 mm×450 mm horizontally and vertically respectively, and positioned 50 mm horizontally towards the patient and 400 mm vertically downwards from the primary pivot;

a rectangular region 175 mm×325 mm horizontally and vertically respectively, and positioned 50 mm horizontally towards the patient and 400 mm vertically downwards from the primary pivot;

a rectangular region extending 150 mm horizontally towards the patient and 300 mm vertically from the primary pivot.

Preferably an averaged centre-of-rotation of the path of the CoM during patient handling is located within said effective-pivot region.

Preferably an averaged centroid of the path of the CoM during patient handling is located within said effective-pivot region.

Considering the above-referenced alternative reorientation mechanisms, it is expedient for exemplary purposes, to describe herein an embodiment incorporating several of said alternative reorientation mechanisms, i.e., a geared mechanism and a slidable carriage coupled to a curved, curvilinear or linear track and a pivot.

In one embodiment, in place of the linkages L, P, S and Q of the previous 4-bar linkage embodiment, each individual linkage may be replaced by a functional equivalent, where the functionality of;

first support linkage L is provided by a curved track, attached at one end to the chassis and shaped to correspond to the arc sector swept by the rotation of linkage L about the secondary axis. In this embodiment, the secondary pivot axis is a virtual pivot, located adjacent the location of the patient's ankles on the chassis at the geometric centre of the curved track;

the second support linkage P is provided by a gear or gears of some form such as a quadrant gear, engaging with a toothed gear track on a portion of the curved track, providing the relative rotational input equivalent to the effect of the second support linkage P;

coupler link S is provided by a carriage slidably mounted on the track with a pivotable 'coupler' portion rotatably attached to said gear, thus forming a functional equivalent to the primary pivot (and primary pivot axis) and coupler link S. The patient support is coupled directly (or indirectly via a suitable mounting, housing or the like) to the pivotable coupler portion and, for example, may be manually rotatable for patient handling by a carer via an attached operating handle, and ground link Q is provided by the chassis as a ground link Q between the virtual secondary pivot axis and the attachment point of the curved track.

This identification of the mechanical and functional equivalence between a 4-bar linkage and a curved track and carriage reorientation mechanism, is not made to imply every reorientation mechanism must have such an equivalence; there is no such restriction. Rather, it provides an illustration of the functional flexibility and viability of a wide variety of mechanical, electro-mechanical and electrical equivalents that may be employed in alternative embodiments without departing from the scope of the invention.

Embodiments with yet further alternative reorientation mechanisms include the incorporation of one of more electrical drives in numerous configurations, including as a replacement or supplement to a 4-bar linkage configuration as previously described wherein in one embodiment:

a separate linear electrical drive is attached between the chassis and an extension to the coupler link S, acting eccentrically to the primary and or secondary pivot axis and used to provide the motive force to a purely mechanical 4-bar linkage, by replacing the input force provided manually via an operating handle or as a supplement to same, or replacement of one or more of the pivotal connections of the coupler link S with a rotational electrical drive to add motive power.

As illustrated by these exemplary configurations, there are numerous possible reorientation mechanisms, of which these are just a few illustrations. Preferably, the patient moving device includes:

a virtual line (hereinafter termed "patient rotation line") extending between the primary pivot and a point on the patient support, and a virtual line (hereinafter termed "knee rotation line") extending vertically between the primary pivot and the chassis, when the device is in the loading configuration, and wherein the patient moving device is configured such that manipulation of the reorientation mechanism to rotate the patient support about the primary pivot between the loading and transport configurations results in the:

patient rotation line rotating through an angle θ about the primary pivot, and knee rotation line rotating through an angle Ω from vertical.

Preferably, the knee rotation line rotates through the angle Ω by pivoting about said second pivot.

It will be appreciated that in order to effect measurements of physical size, position, or motion a system of geometric axes is required to provide a defining frame of reference. Typically, and conveniently, in terrestrial environments subject to Newtonian mechanics, a convenient frame of reference for such metrics is that of an observer (i.e. an 'Observational' frame of reference) on the Earth's surface, conceptualised and represented as an infinite plane and not an oblate spheroid. Movement of the patient moving device and the relative movement of its reorientation mechanism, primary and secondary pivots are thus conventionally interpreted with respect to an observer on the earth's surface or a local approximation for the earth's surface such as the surface of the chassis on the earth's terrain surface.

However, changing the observer's frame of reference origin to a specific part of the patient moving device provides a powerful simplification tool to depict, compare and analyse the relative movements of the patient moving device and its components.

As will be readily evident, a rotational movement of the primary pivot about the primary pivot axis causes the reorientation mechanism (and, thus, the attached patient support) to circumscribe a constant-radius circular arc. However, this circular arc movement of the reorientation mechanism/patient support is superimposed/compounded with the separate circular arc path circumscribed by rotational movement of the secondary pivot (at or adjacent the patient's ankles) about the secondary pivot axis. The resultant composite movement is a curvilinear path which is more complex to compare directly with the movement produced by other patient moving devices. This composite movement allows the patient's knees (in contact with the knee-rests at the primary pivot) to move forwards concurrently with their torso being rotated forwards in conjunction with the rotational movement of the patient support.

However, it is this very composite movement that provides key advantages over prior art alternatives with fixed knee-rests, or without knee rests altogether.

Redefining the frame of reference observer origin to be the primary pivot axis, allows the movement of both the secondary pivot (and/or tertiary pivot) and the reorientation mechanism/patient support about the primary pivot axis to be represented by simple constant radius circular arcs.

Thus, according to one aspect of the present invention, there is provided a patient-moving device for patient handling, said patient handling including raising and lowering a seated patient between sitting and transport positions, and moving a raised patient in the transport position, said device including:

a terrain-engaging mobile chassis;

a primary pivot, pivotable about a primary pivot axis;

a secondary pivot, pivotable about a secondary pivot axis and located eccentrically from said primary pivot axis;

a patient-support, formed to engage with, and at least partially support, a patient's anterior torso during patient handling;

at least one knee-rest, formed to engage with, and at least partially support, a patient's anterior knee surfaces during patient handling;

a reorientation mechanism, coupled to said patient-support and chassis, wherein:

operation to reorientate the reorientation mechanism during patient handling to raise or lower a seated patient between sitting and transport positions re-orientates the patient support between a patient loading/unloading configuration and a patient transport configuration, and said patient support is movable relative to the chassis by rotation of said primary pivot and/or said secondary pivot about the primary pivot axis, and wherein, with respect to said primary pivot axis;

during said patient handling, relative rotational movement of said:

chassis;

patient-support;

secondary pivot, reorientation mechanism, and any part of same, and any other point on said patient-moving device are defined by a predetermined angular range Ø (where Ø is measured clockwise and where 0° is vertical).

Preferably, with respect to said primary pivot axis, during said patient handling, relative rotational movement of said:

a representative Centre of Mass (CoM);

secondary pivot;

tertiary pivot;

chassis;

patient-support;

reorientation mechanism;

chassis midpoint;

chassis endpoint;

midpoint of a patient-engaging outer surface of the patient-support;

lowermost point of a patient-engaging outer surface of the patient-support;

operating handle distal end;

patient securement strap patient support attachment point;

patient securement strap reorientation mechanism attachment point;

reorientation mechanism spatial extremity;

any part of same, and/or any other point on said patient-moving device, are defined by a corresponding annulus sector or arc, each annulus sector or arc individually defined by a predetermined angular range Ø and, preferably, radius range r.

Preferably, for said predetermined angular range Ø, said predetermined radius range r is constant for said CoM and secondary pivot and/or tertiary pivot.

Preferably, for said predetermined angular range Ø, said predetermined radius range r is constant for at least one of:

CoM secondary pivot, tertiary pivot patient-support;

reorientation mechanism, chassis midpoint;

chassis endpoint;

midpoint of a patient-engaging outer surface of the patient-support;

lowermost point of a patient-engaging outer surface of the patient-support;

operating handle distal end;

patient securement strap patient support attachment point;

patient securement strap reorientation mechanism attachment point, and/or reorientation mechanism spatial extremity.

Preferably, said predetermined angular range Ø and radius, r, include at least one:

CoM arc with Ø=208.5-278.5° (for θ=70°) and r=434 mm secondary pivot arc with Ø=180°-198.5° (for θ=70° and Ω=15°) and r=41 mm chassis midpoint with Ø=208.5-278.5° (for θ=70°) and r=434 mm;

lowermost point of a patient-engaging outer surface of the patient-support with Ø=280-350° (for θ=70°) and r=310 mm;

patient securement strap patient support attachment point with Ø=24-94.5° (for θ=70°) and r=560 mm, and/or patient securement strap reorientation mechanism attachment point with Ø=16-86° (for θ=70°) and r=975 mm.

As noted above, redefining the frame of reference observer origin to be the primary pivot axis, allows the movement of both the secondary pivot (and/or tertiary pivot) and the reorientation mechanism/patient support about the primary pivot axis to be represented by simple constant radius circular arcs. However, it should be noted that any prior art patient moving devices with fixed position knee-rests (relative to the chassis/patient's ankles) will produce non-constant radius arcs for its CoM path and are thus easily distinguishable from the preferred embodiments described herein.

Furthermore, by redefining the frame of reference observer origin to be the primary pivot axis such prior art patient moving devices are further distinguishable from the present invention, as the tertiary pivot (and secondary pivot when co-axial with the tertiary pivot) always traverses an angular arc during patient handling, while remaining at a static angular value for said prior art.

It will be appreciated that the above-described alternative types of reorientation mechanisms and the associated relative movements of their component parts may also be represented with respect to the primary pivot axis as well as more conventional frames of reference.

An advantageous feature of the 4-bar linkage reorientation mechanism, as described herein, is a capacity to accommodate vertical variations in a patient's seating position, irrespective of whether this is due to differing sized chairs, posture, body size/proportions or the like. As previously described, at the start position of patient handling for raising a seated patient between an initial sitting position and a transport position, the patient may be positioned in intimate contact with the patient support with a substantially upright torso and patient support. The path travelled by the patient support as patient raising commences is a very shallow curve allowing for the progressive 70° tilting of the patient, whilst only travelling a vertical height of less than 100 mm. In the start position, it can be understood that the attachment between the patient support and the reorientation mechanism can be considered to be effectively horizontal, with a vertical offset according to the adjusted position of the patient support after engagement with the patient.

If the seated patient is too low for this start position orientation of the reorientation mechanism for the patient support to engage with the patient's upper thighs, the reorientation mechanism may be rotated to move the patient support downwards until it does contact the patient's upper thighs. In a manually operated patient moving device, this is accomplished by the carer raising the operating handle. Any necessary fitting adjustments and securement of the patient to the patient support may then be performed, and patient handling may then commence.

A salient capability of the 4-bar linkage configuration facilitating this ability is the asymmetry of the path traversed by the patient support between the rotation of the reorientation mechanism upwards and down wards from said start position.

Preferably, during downward rotation of the reorientation mechanism from a horizontal start position, the knee rests located at the primary pivot position move less than 10 mm during a 14° rotation of the coupler link S. Thus, the knee rest(s) attached to the primary pivot also only moves less than 10 mm which may be readily accommodated by a typical patient without causing any hamstring discomfort during patient handling. It will be noted that moving the patient support through a range of −14° to +14° results in a vertical displacement by a point on the patient support of approximately 110 mm. This allows for accommodating chairs of seat heights between ~400 mm up to ~550 mm.

Preferably, the at least one knee-rest is configured to move in conjunction with the path of the primary pivot following a curved, slightly downwards path, by pivoting about the secondary pivot and being attached to the primary pivot. A yet further advantageous consequence of allowing the at least one knee-rest to move in such a manner during patient lifting is that the input force required by the carer in moving the patient between a patient loading/unloading configuration and a patient transport configuration is directly proportional to the magnitude of vertical lift required, i.e. the vertical rise in the patient's CoM.

As stated above, lifting the patient into the transport position with a torso inclination angle θ of 70°, and an interior hip angle β of 135°, through an ankle/tibia joint rotation at the secondary pivot of Ω around 15° produces a resultant horizontal movement of approximately 130 mm. Moreover, in contrast to patient moving devices configured with fixed knee rests, this horizontal movement of 130 mm is accompanied by a vertical drop of approximately 10 mm, i.e., 15% of the total CoM vertical increased required.

In one embodiment, a patient-moving device is provided, including:

- a chassis,
- a reorientation mechanism including a multi-bar linkage, including;
  - a first support link,
  - a second support link,
  - a coupler link, and
- a moveable patient-support, and
- an operating handle.

Preferably, the device further includes knee-rests and, optionally, a position locking means. The first support link is pivotable about a first and second pivot (i.e. said primary pivot and secondary pivot respectively), said second pivot being pivotable relative to the chassis, the second support link being pivotable relative to the chassis about a third pivot, and the coupler link being pivotally attached to the first support link at the second pivot and pivotally attached to the second support link at a pivot.

The moveable patient-support being operably mounted on the chassis by way of the coupler link, the operating handle being mounted relative to the coupler link, and the knee-rests being attached to the first support. Movement of the coupler link and thereby the moveable patient-support is constrained by the first and second support links. The releasably lockable position-locking means may be enabled to stop movement of the coupler link and therefore the moveable patient-support.

In an alternative embodiment, the patient-support is mounted in fixed relation to the coupler link, and the operating handle is operably attached to the coupler link for moving the device between a patient loading/unloading configuration and a patient-transport configuration.

In one embodiment, the coupler link and thereby the patient-support moves through an angle of ~70 degrees relative to the chassis, preferably between about 60 degrees and about 80 degrees, and optionally about 90 degrees from the patient loading/unloading configuration to the patient-transport configuration. The transport position may be configured by using the position locking means in order to carry a patient in a posture wherein their torso is at an angle preferred by the patient, for example between about 10 and 20 degrees from horizontal.

In an embodiment, the chassis, first support link, second support link, and coupler link form a four-bar mechanism of a crossover type, where, in the transport position, a virtual line extending between the first pivot and the second pivot intersects a virtual line extending between the third pivot and the fourth pivot.

In an alternative embodiment, the chassis, first support link, second support link, and coupler link form a four-bar mechanism of a crossover type, where, in the transport position, a virtual line extending between the first pivot and the third pivot intersects a virtual line extending between the third pivot and the fourth pivot.

In an embodiment, the operating handle is rigidly mounted relative to the coupler link at a point distal the first and fourth pivots and moves in tandem with the coupler link.

In one embodiment, the operating handle comprises an L-shaped handle support, though it will be appreciated alternative configurations may be employed. A lever portion is connected to the coupler link and a crossbar. Optionally the handle lever is rigidly connected to the end of the coupler link opposite the fourth pivot, thereby forming an oblique angle with a coupler link at about 125 degrees. Alternatively, the lever portion is integral the coupler link or connected to form a different angle to the coupler link.

In an embodiment, the operating handle and coupler link are in fixed relation to each other such that movement of the operating handle causes a corresponding movement of the coupler link and moveable patient link.

In an embodiment, the position of the moveable patient-support may be adjusted along an axis that is perpendicular to a line intersecting the first and fourth pivots. The patient-support sliding adjustment member is attached to the moveable patient-support and can slide back and forth in the horizontal section of the coupler link.

In an embodiment, the patient-support sliding adjustment member is locked at selected positions during operation of the device. Preferably the locking means is a coupler link locking pin which is locatable in selectable holes in the patient-support sliding adjustment member.

In an embodiment, the position locking means is a telescopic strut connected at a pivot on the coupler link and a pivot on the chassis.

In an embodiment, the movement path of the moveable patient-support, the operating handle and the knee-rests is determined by the geometry of the four-bar mechanism and the position of the moveable patient-support and operating handle on the coupler link.

In an embodiment, the second and third pivots are connected to the chassis at substantially the same height, with the second pivot being about 80-85 millimetres to the front of the third pivot. Alternatively, the second and third pivots may be at different heights. The first and fourth pivots are attached to the coupler link with the fourth pivot located adjacent to a first end of the coupler link and the first pivot spaced about 65-41 millimetres from the fourth pivot and the moveable patient-support.

In an embodiment, the first support link and second support link may be straight links or may be otherwise shaped to improve the ergonomics, compactness and/or safety of the device.

In one embodiment, the first link is an angled V-shaped link such that a substantial part of the first link is rear of the second link. It will be appreciated alternative embodiments may employ differently shaped linkages.

In one embodiment, the movement from patient loading/unloading position to transport position comprises the first link moving through an angle of approximately 25 degrees relative to the chassis, and the coupler link moving through an angle of approximately 65 degrees relative to the first link, thereby moving the moveable patient-support through an angle of approximately 90 degrees relative to the chassis. In an alternative preferred embodiment, the first link moves through an angle of approximately 18.5 degrees relative to the chassis, and the coupler link moves through an angle of approximately 51.5 degrees relative to the first link, thereby moving the moveable patient-support through an angle of approximately 70 degrees relative to the chassis.

In an embodiment, the device comprises two footrests, wherein the first and second support links are located along and move in a sagittal plane that is between the two footrests. That is, the first and second support links may be positioned between a patient's legs when their feet are on the footrests. At least one of the second and third pivots may be located adjacent to a patient's ankles or feet when the footrests are occupied. Alternatively, at least one of the second and third pivots may be forward of the patient's ankles when the footrests are occupied.

In an embodiment, the footrests may be provided by two separate platforms. Alternatively, the footrests may be provided by two sides of a single platform. The footrests may be optionally adjustable.

In an embodiment, the knee-rests are rear-facing.

In an embodiment, rear-facing knee-rests are positioned towards the front of the chassis and attached to the first support link. Optionally the knee-rests may be provided with one or more straps for securing the patient's knees or legs in a fixed location.

In an embodiment, the rear-facing knee-rests may be pivotably attached to an alternative link so as to allow the knee-rests to rotate to match the patient's natural knee position during loading and unloading.

In an alternative embodiment, in moving between the patient loading/unloading configuration and the patient-transport configuration, the patient-support moves along a non-circular arc. Preferably in moving between the patient loading/unloading configuration and the patient-transport configuration, the centre of mass of an occupant of the device does not move vertically by more than 5% of the height of the occupant, more preferably the centre of mass of an occupant of the device does not move vertically by more than 2% of the height of the occupant. In one example, the centre of mass of the occupant does not move vertically by more than 10 cm, preferably by less than 8 cm and more preferably by less than 5 cm. However, such an embodiment may be unsuited for use with patients with certain flexibility, strength and/or mobility constraints.

In an embodiment, the moveable patient-support may be slidable along the coupler link. Alternatively, the moveable patient-support may be slidable along the handle lever or adjustable in height.

In an embodiment, the moveable patient-support may be adjusted on a horizontal plane by unlocking a coupler link locking pin and sliding the patient-support adjustment member until the moveable patient-support contacts the front of the torso of the patient.

In an alternative embodiment, the mechanism formed by the first support link, second support link, coupler link provides a mechanical advantage, such that the force required at the operating handle to transition the occupied patient-loaded device from the patient loading/unloading position to the patient transport position is less than 20%, preferably less than 18%, or more preferably less than 15% of the weight of an occupant who is 180 cm tall, In an alternative embodiment, the mechanism formed by the first support link, second support link, coupler link provides a mechanical advantage, such that the force required at the operating handle to transition the occupied patient-loaded device from the patient loading/unloading position to the patient transport position is less than 15 kg for a 180 cm tall occupant weighing 90 kg In an alternative embodiment, a handle support and two spaced apart crossbars, wherein both crossbars are positioned above the chassis and rear of a front edge of the chassis in the patient loading/unloading configuration, and forward (on the carer side) of the chassis in the patient transport configuration. In an embodiment, at least one of the crossbars is rear (on the patient loading side) of a knee-rest in the patient loading/unloading configuration.

In an alternative embodiment, the operating handle comprises a handle support that is substantially L-shaped and forms an angle with the coupler link of about 135 degrees.

In an embodiment, the device comprises a patient handle connected to the moveable patient-support such that it moves with the moveable patient-support and is positioned to enable the patient to reach and grip it with slightly bent elbows.

In an embodiment, the second and third pivots are provided on the chassis. The second and third pivots may be substantially the same height, the device has one or more rear-facing (patient-facing) knee-rest(s), wherein the second and third pivots are rear of the knee-rest(s).

In an alternative embodiment, in the patient loading/unloading position, the first pivot is substantially vertically aligned with the fourth pivot.

In an embodiment, in the patient transport position, the first pivot is substantially horizontally aligned with the fourth pivot, or is inclined relative to the fourth pivot at an angle in the range of about 10 degrees to about 20 degrees, preferably about 10 degrees to about 15 degrees from horizontal.

In an alternative embodiment, the first link is V-shaped, L-shaped, or C-shaped such that a major part of the first link is positioned forward (on the carer side) of the second link in both the patient loading/unloading and patient-transport configurations.

In an alternative embodiment, the distance between the patient-support and the first pivot is adjustable in length to fit the device to persons of a range of heights.

In an alternative embodiment, the first link is adjustable in length to fit the device to persons of a range of heights. The second link may also be adjustable in length to fit the device to persons of a range of heights.

In an alternative embodiment, the patient-support is a torso support such as a patient-support. The patient-support may optionally be contoured and/or have straps for securing to an occupant In an alternative embodiment, the chassis is mounted on wheels, one or more of the wheels being lockable. The chassis may have two legs that can be splayed to increase the wheelbase of the chassis, or to get around chair legs or other obstructions.

The term 'comprising' as used in this specification and claims means 'consisting at least in part of'. When interpreting statements in this specification and claims that include the term 'comprising', other features besides those prefaced by this term can also be present. Related terms such as 'comprise' and 'comprised' are to be interpreted in a similar manner.

It is intended that reference to a range of numbers disclosed herein (for example, 1 to 10) also incorporates reference to all rational numbers within that range and any range of rational numbers within that range (for example, 1 to 6, 1.5 to 5.5 and 3.1 to 10). Therefore, all sub-ranges of all ranges expressly disclosed herein are hereby expressly disclosed.

As used herein the term '(s)' following a noun means the plural and/or singular form of that noun. As used herein the term 'and/or' means 'and' or 'or', or where the context allows, both.

BRIEF DESCRIPTION OF DRAWINGS

The present invention will now be described by way of example only and with reference to the accompanying drawings in which:

FIG. 6A shows the device and FIG. 6B shows an enlarged schematic view of the four-bar linkage;

FIG. 7A shows the device and FIG. 7B shows an enlarged schematic view of the four-bar linkage;

FIG. 5A shows the device in the patient loading/unloading configuration, FIG. 5B shows the device in an intermediate configuration, and FIG. 5C shows the device in the patient-transport configuration;

DETAILED DESCRIPTION OF A PREFERRED EMBODIMENT

Figure 1:
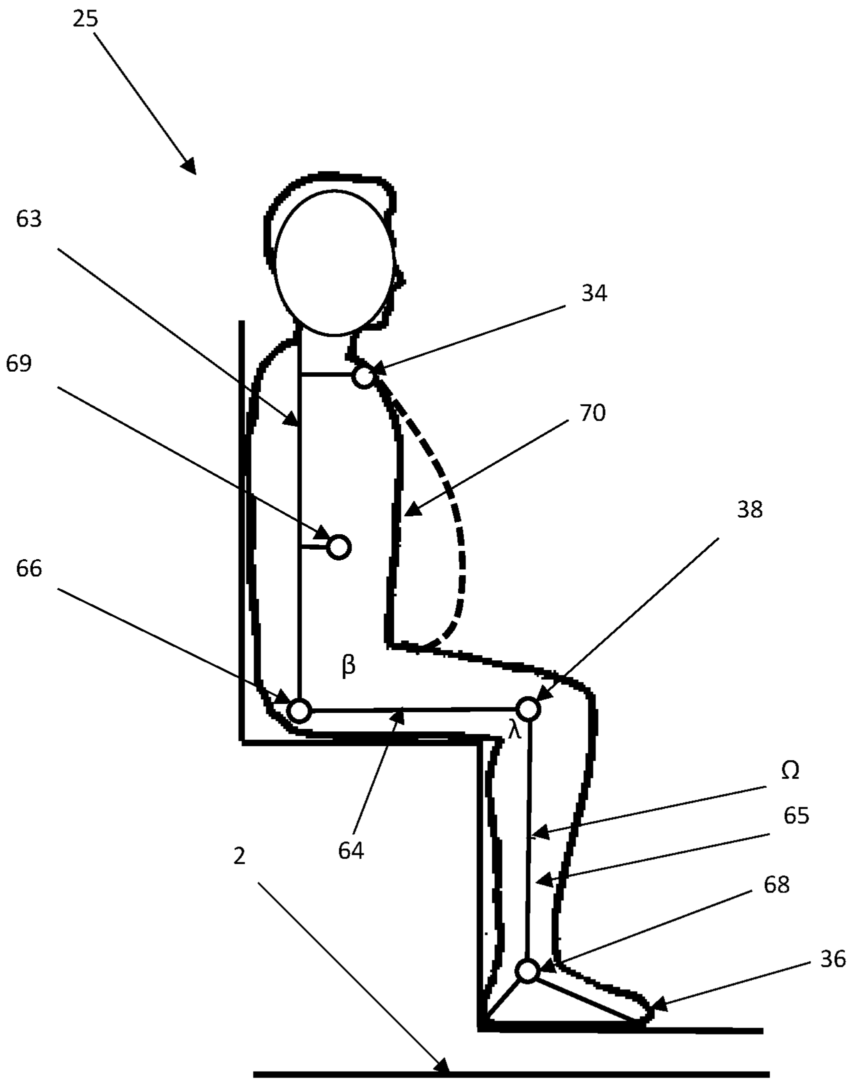
FIG. 1 is a schematic side elevation of an exemplary patient, showing relevant parts and angles.

| | | | |
|---|---|---|---|
| 1 | patient moving device | 46 | Spring |
| 2 | Terrain | 47 | Upper crossbars |
| 3 | chassis | 48 | Lower crossbars |
| 4 | Reorientation mechanism | 49 | Jugular Notch path |
| 5 | Patient-support/chest-pad | 50 | CoM movement path |
| 6 | operating handle | 51 | Handle movement path |
| 7 | first support link | 52 | Prior art pivot axis |
| 8 | Chest pad adjustment handle | 53 | Locking pin hole |
| 9 | second support link | 54 | patient-support sliding adjustment member |
| 10 | Multi-bar linkage | 55 | coupler link locking pin |
| 11 | secondary pivot | 56 | patient securement strap |
| 12 | carer | 57 | strap hooks |
| 13 | third pivot | 58 | Strap securement point |
| 14 | Upper frame | 59 | position locking means |

-continued

| | | | |
|---|---|---|---|
| 15 | coupler link | 60 | Upper lock pivot |
| 16 | patient armrests | 61 | Lower lock pivot |
| 17 | primary pivot | 62 | Jugular notch |
| 18 | Link straps | 63 | torso |
| 19 | fourth pivot | 64 | femur |
| 20 | Primary pivot axis | 65 | tibia |
| 21 | Secondary pivot axis | 66 | Hip joint/axis |
| 22 | Tertiary pivot axis | 67 | Prior art knee rests |
| 23 | Bracing handle | 68 | Ankle joint/axis |
| 24 | Carer foot lever | 69 | Centre of mass (CoM) |
| 25 | patient | 70 | Centre of mass aggregation region |
| 26 | Rear wheels | 71 | hip CoR |
| 27 | Front wheels | 72 | CoM CoR |
| 28 | Knee pads | 73 | Jugular notch CoR |
| 29 | legs | 74 | hip centroid |
| 30 | Knee pad bolts | 75 | CoM centroid |
| 31 | front pivots | 76 | Jugular notch centroid |
| 32 | Knee rest bracket slots | 77 | Effective pivot region |
| 33 | wheel locks | 78 | patient rotation line |
| 34 | Locking lever | 79 | knee rotation line |
| 35 | footrests | 80 | Geared mechanism |
| 36 | foot | 81 | slidable carriage |
| 37 | knee-rest | 82 | curved track |
| 38 | knee joints/axis | 83 | track geometric centre |
| 39 | patient-support surface | 84 | quadrant gear |
| 40 | Knee contact surfaces | 85 | gear track |
| 41 | Knee bracket | 86 | Carriage coupler portion |
| 42 | Lateral knee restraints | 87 | track attachment point |
| 43 | patient handle | 88 | electrical drive |
| 44 | knee-pad mounting link | 89 | drive pivot |
| 45 | Knee rest pivot | 90 | Prior art tibia line |
| 100 | Tracked embodiment | 91 | Prior art CoM arc |
| 200 | Electric embodiment | | |
| | | β | Hip Angle |
| L | Effective First Link | θ | Torso Angle |
| P | Effective Second Link | Ω | Tibia/shin angle |
| S | Effective Coupler Link | λ | Interior Knee Angle |
| Q | Effective Frame Link | φ | Link strap angle |

FIGS. 2-9 show exemplary embodiments of a patient moving device (1) for patient handling. Patient handling includes raising and lowering a seated patient between sitting and transport positions and moving a raised patient in the transport position.

The patient moving device (1) has a patient side or 'rear' side P and an opposite carer side or 'front' side C. The patient handling involves raising and lowering a seated patient between sitting and transport positions and moving a raised patient in the transport position.

An arrow marked "F" has been inserted into the figures where appropriate to indicate a forward direction of the device, the front of the device being the carer side, and the rear of the device being the opposite, patient loading side.

Accordingly, the terms forward, rearward, left side, and right side (or similar) should be construed with reference to the forward direction F of the device, not necessarily with reference to the orientation shown in a given figure, the use of these terms is for ease of explanation and is not intended to be limiting.

It will also be understood that any angular orientation term referenced with respect to the patient moving device and herein described, or defined with respect to both an orientation and a clockwise or anticlockwise rotation therefrom, should be interpreted as being viewed from an observer with the patient or 'rear' side of the patient moving device to the observer's left and the carer or 'front' side to the observer's right.

It will be noted that all figures and graphical representations shown are not necessarily to scale, nor geometrically accurate and are for illustrative purposes only.

FIG. 1 shows a schematic phantom outline view of an exemplary seated patient (25), overlaid on a symbolic representation designating relevant features, elements and locations of the patient's body referenced as follows:

- Jugular Notch, (62);
- torso (63);
- femur (64);
- tibia (65);
- hip joint/axis (66);
- knee joint/axis (67);
- ankle joint/axis (68);
- Centre of Mass, CoM (69);
- a torso inclination angle θ with respect to vertical, where a substantially upright posture with a vertical torso gives an inclination angle θ~0°
- a hip angle β, subtending the interior angle between the axis of the patient's femur/thigh and their torso/trunk, where a thigh/femur orientation substantially orthogonal to the torso gives a hip angle of β~90°;
- a knee angle λ, denoting the interior angle between thigh/femur and the shin/tibia—where a shin/tibia orientation substantially orthogonal to the thigh/femur, gives a knee angle λ~90°, and
- a shin angle Ω with respect to vertical, where a substantially vertical shin/tibia gives a shin angle Ω~0°.

It will be appreciated that the various dimensions and parameters of each of these features will vary with the patient. The patient in the figures is shown for example only.

Figure 2:
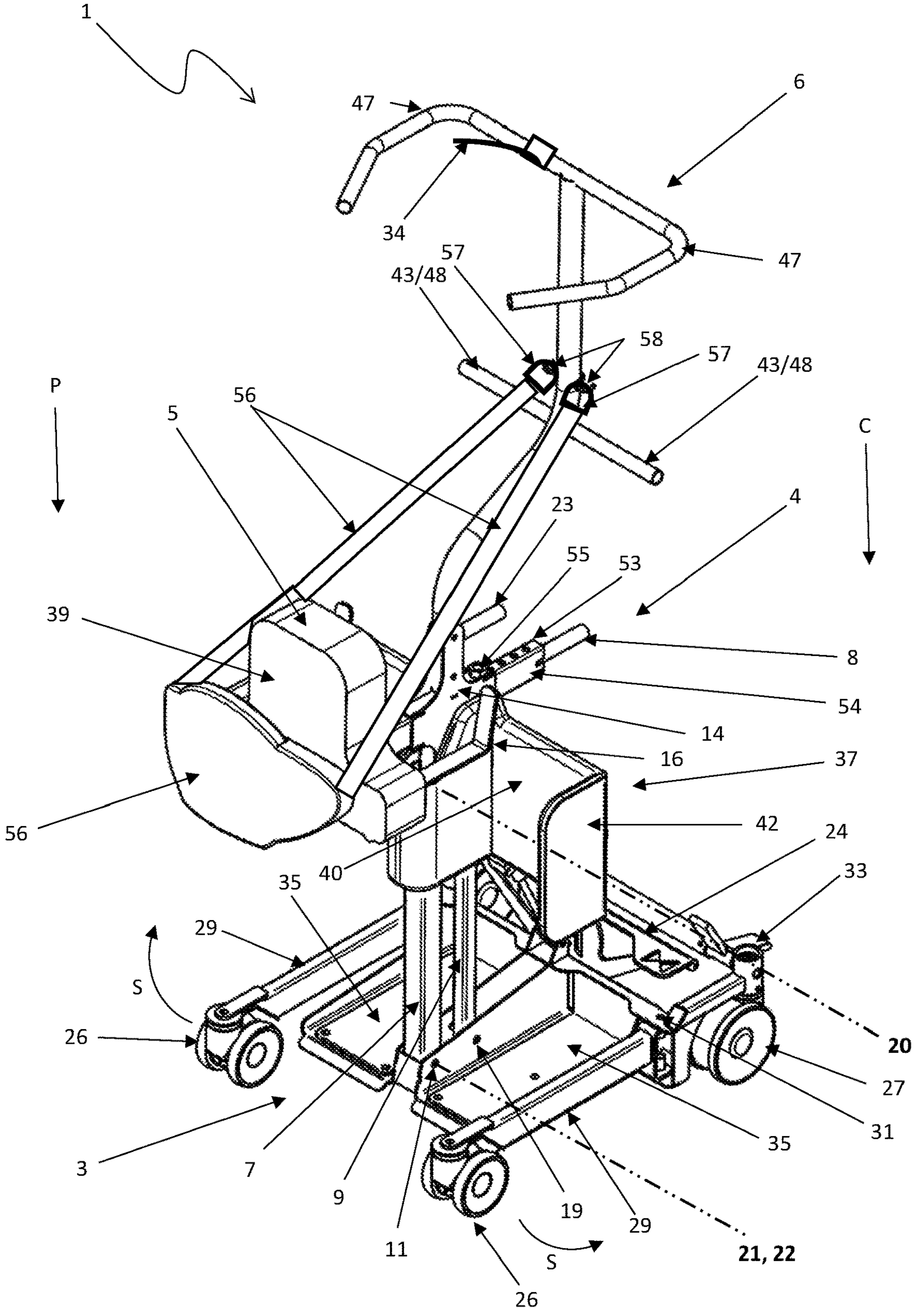
FIG. 2 is a rear perspective view of a patient moving device according to one preferred embodiment.
Figure 3:
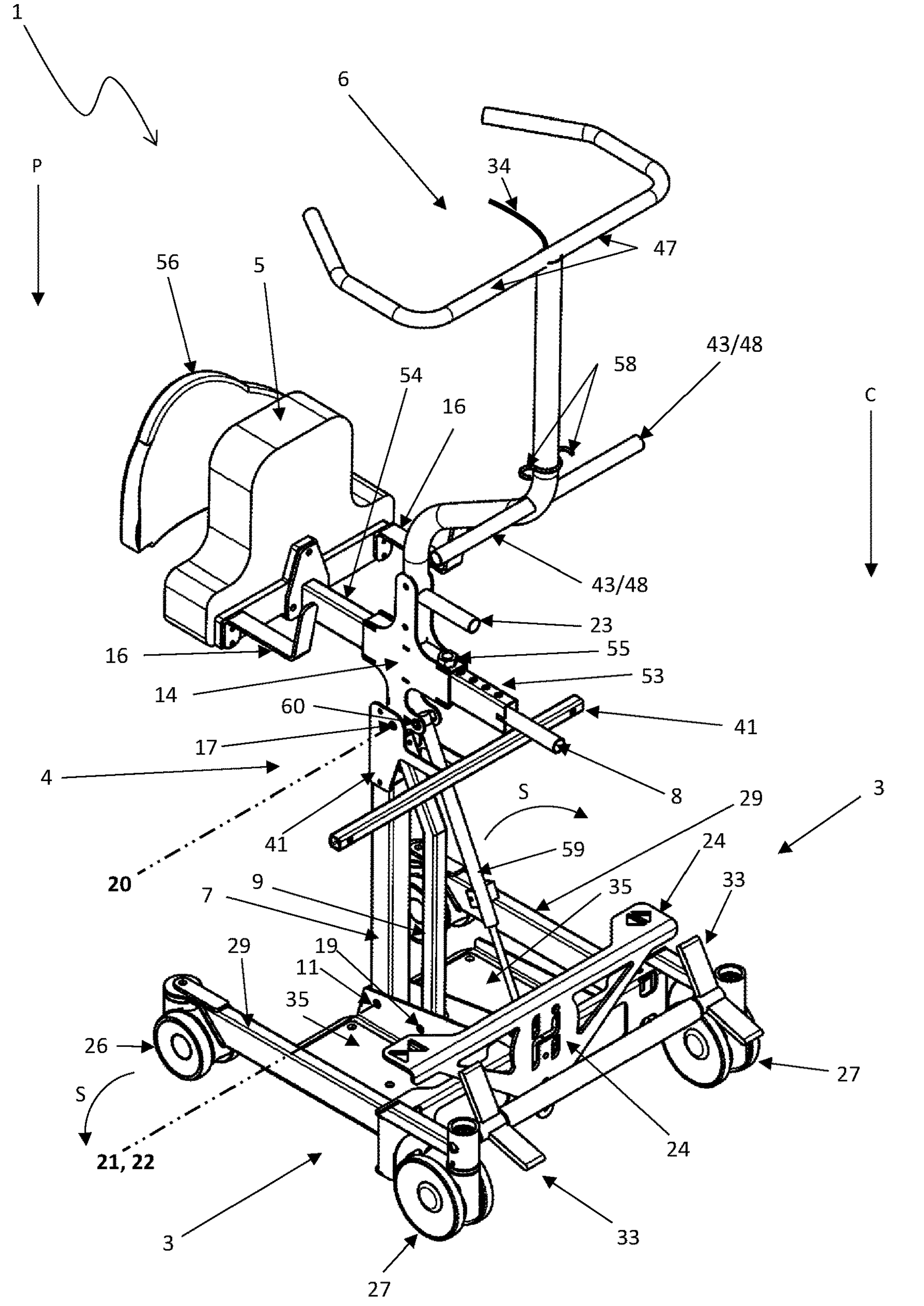
FIG. 3 is a front perspective view of the patient moving device of FIG. 2 with various components removed to show other components not visible in FIG. 2.
Figure 4:
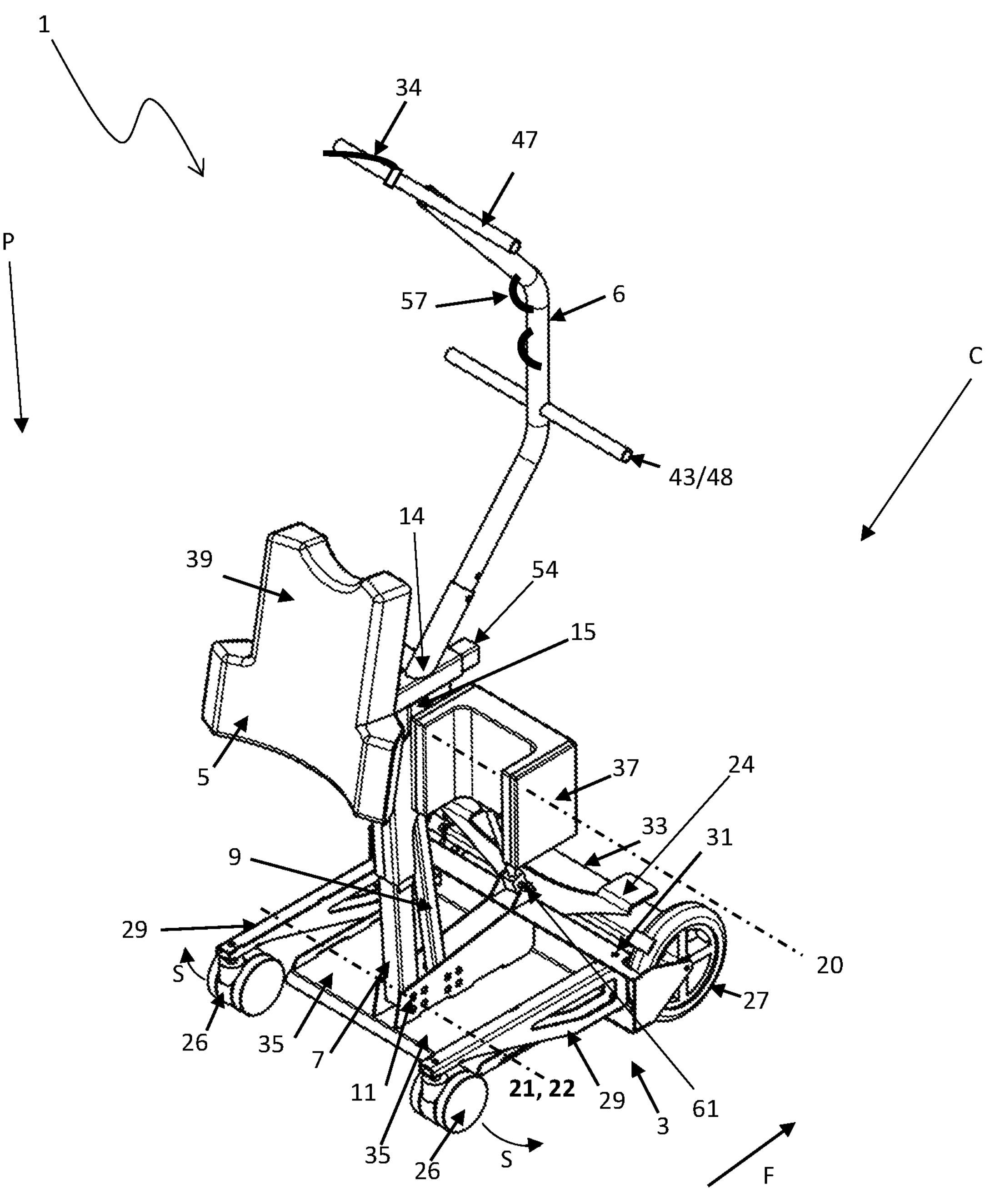
FIG. 4 is a rear perspective view of a patient moving device according to a second preferred embodiment.
Figure 5:
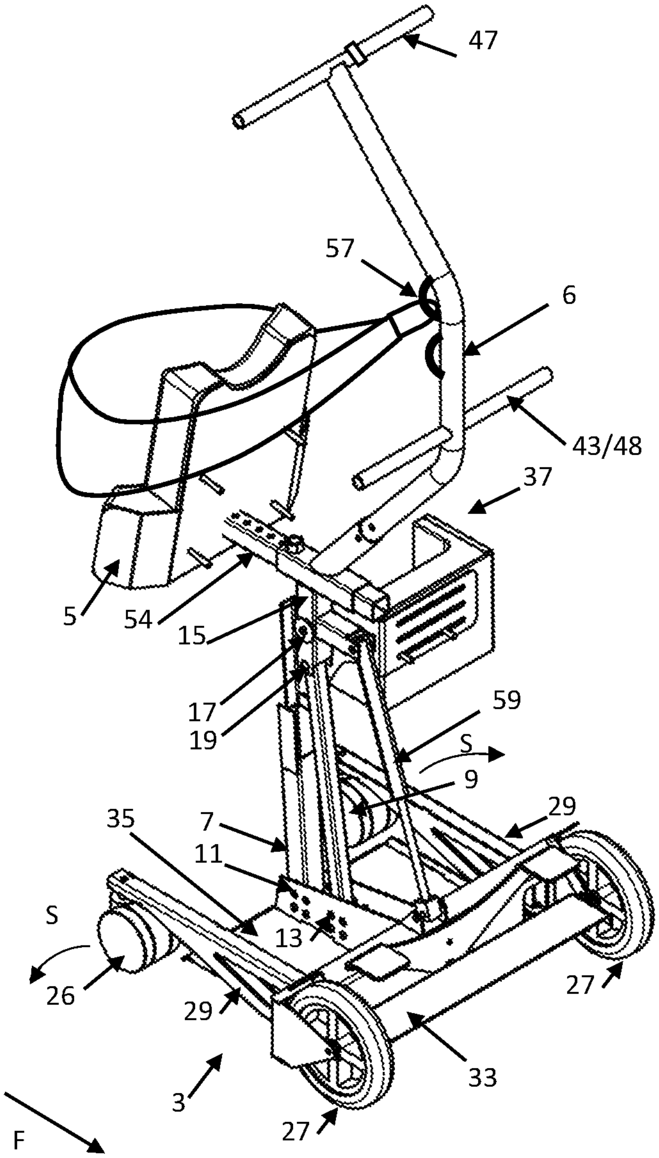
FIG. 5 is a front perspective view of the patient moving device of FIG. 4 with various components removed to show other components not visible in FIG. 4.
Figure 6B:
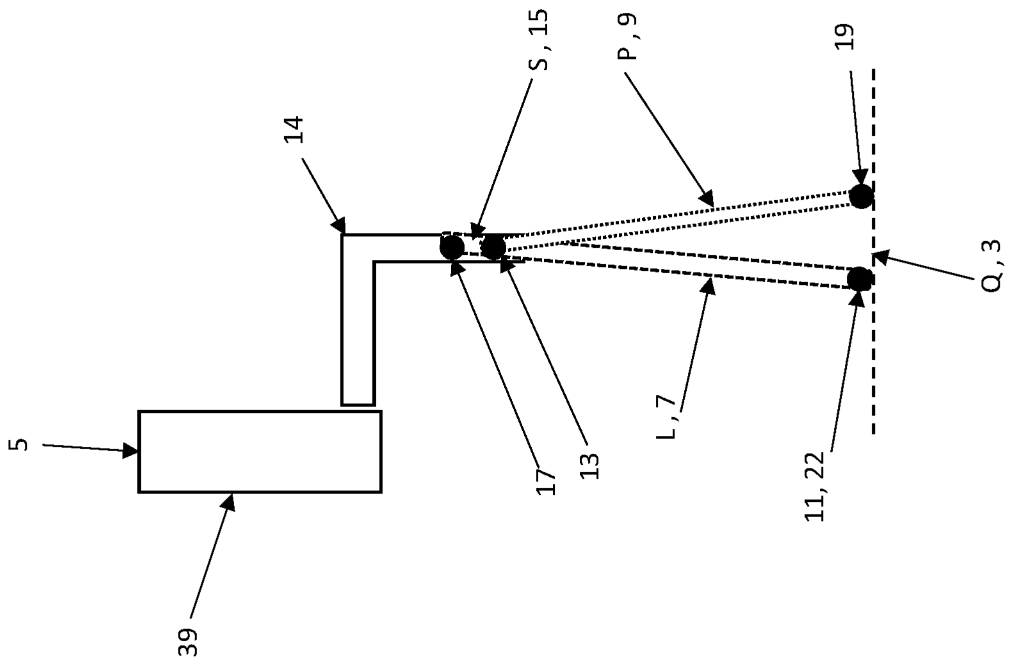
FIGS. 6A and 6B are partial side section views of the embodiment of FIGS. 2 and 3 in a patient loading/unloading configuration showing the effective links of a four-bar linkage, where
Figure 6A:
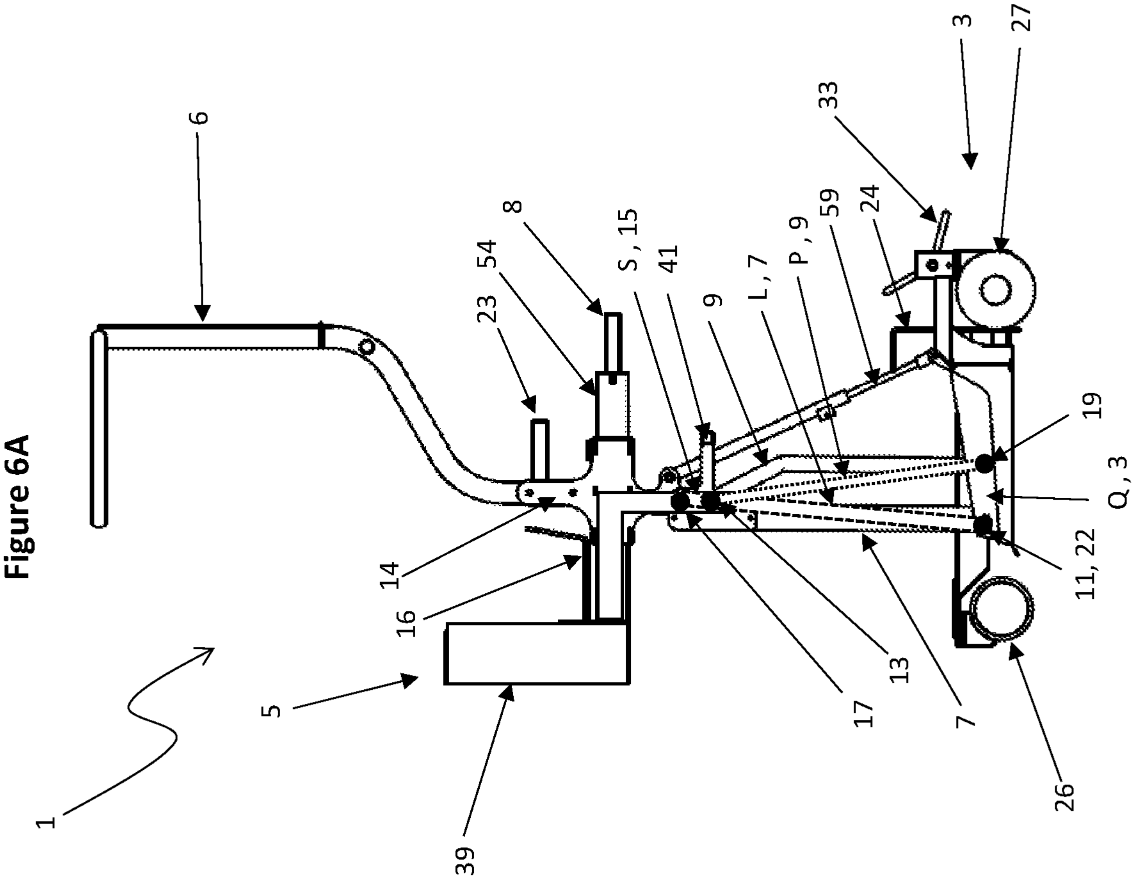
Figure 7B:
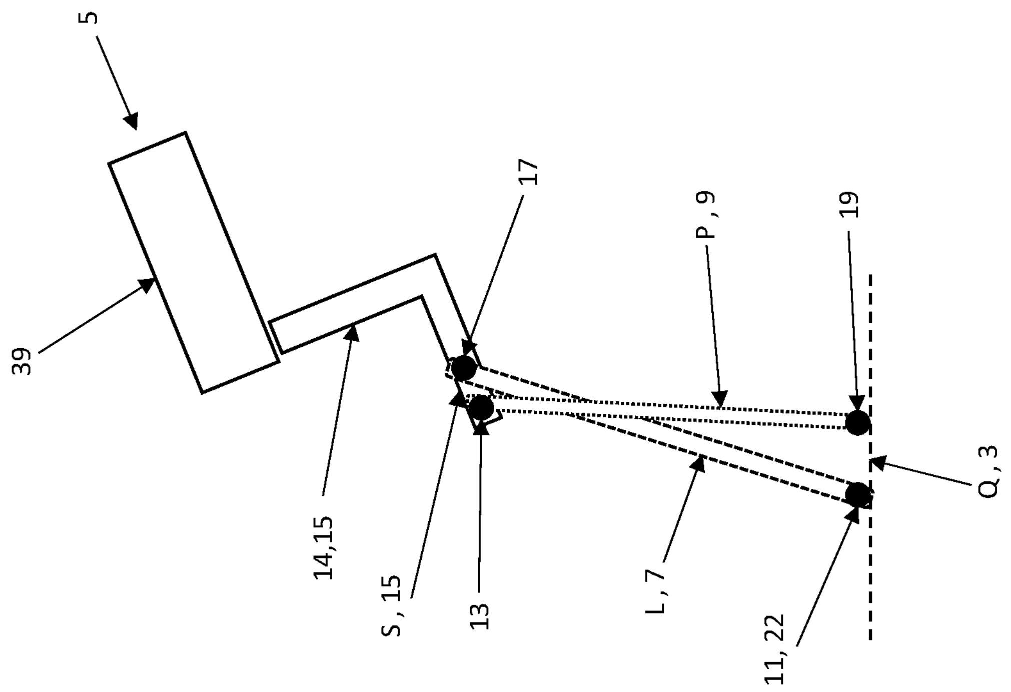
FIGS. 7A and 7B are partial side section views of the embodiment of FIGS. 2 and 3 in a patient-transport configuration showing the effective links of a four-bar linkage, where
Figure 7A:
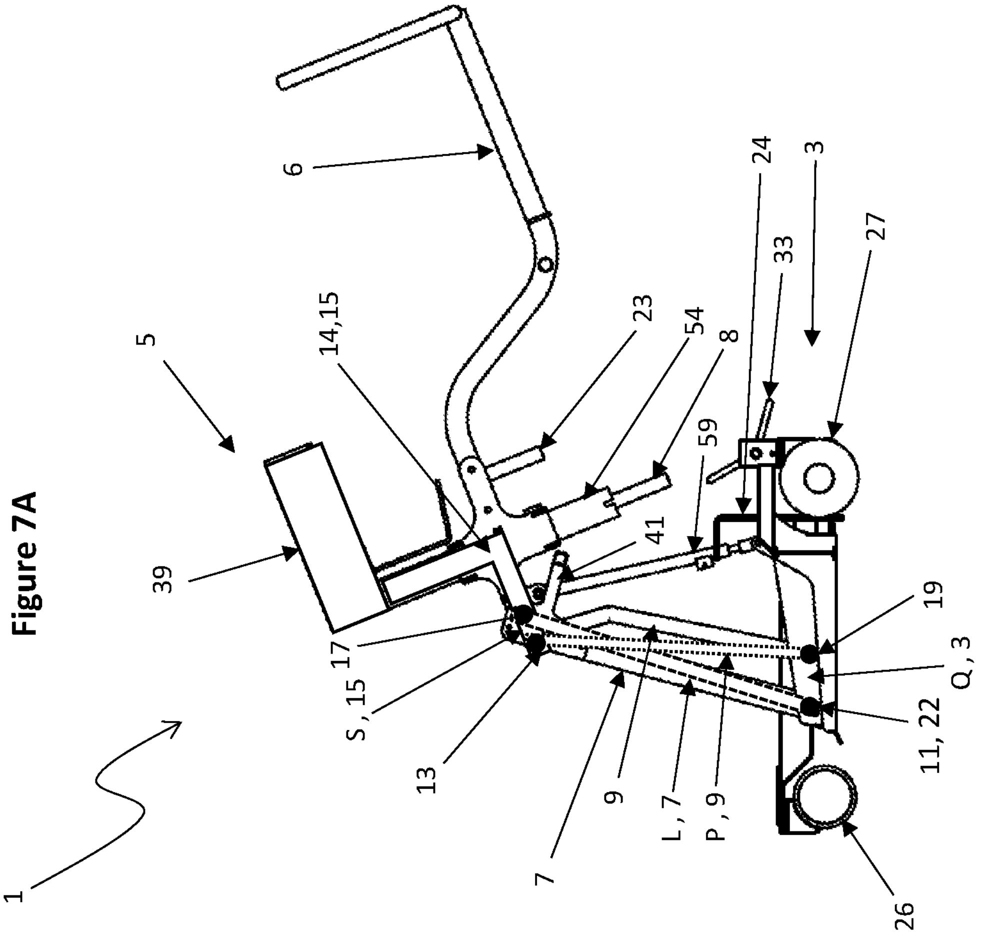

FIGS. 2-5 show perspective views of a patient moving device (1) according to two different embodiments. FIGS. 2-3 show a first embodiment and FIGS. 4-5 show a second embodiment. The first and second embodiments differ in dimensional and some aspects but otherwise include similar components and function similarly. Like parts are similarly numbered for both embodiments. The following description is thus made with respect to both embodiments.

The patient moving device (1) includes a terrain-engaging mobile chassis (3) with wheels (26, 27) attached thereto, facilitating movement of the entire PMD (1) over the terrain (2). The rear wheels (26) are rotating castors while the front wheels are larger and include a brake mechanism in the form of wheel locks (33).

Two footrests (35) are included on the chassis (3) for the patient (25) to position their feet thereon. The two footrests (35) may be provided by two separate platforms, or by left and right sides of a single platform and may optionally be adjustable.

A pair of knee rests (37) are included and formed to engage with, and at least partially support, a patient's anterior knee surfaces during patient handling. The knee rests (37) are movable relative to the chassis (3).

A moveable patient-support is provided in the form of chest pad (5) formed to engage with, and at least partially support, a patient's anterior torso (63) during patient handling.

Movement and operation of the patient moving device (1) during patient handling is performed by a carer (12) via an operating handle (6).

A reorientation mechanism (4) is coupled to the chest pad (5), operating handle (6) and chassis (3). The reorientation mechanism (4) includes a multi-bar linkage (10) pivotally connected to the chassis (3) and pivotally connected to the handle (6) and chest pad (5).

The chest pad (5) is connected to a primary pivot (17) via an upper frame (14) of the reorientation mechanism (4). The primary pivot (17) is rotatable about a primary pivot axis (20). The chest pad (5), upper frame (14) and connected operating handle (6) are thus all pivotable about the primary pivot axis (20). The reorientation mechanism (4) is thus coupled to the patient-support (5), primary pivot (17) and chassis (3). The handle (6) is configured to rotate about the primary pivot axis (20).

The chest pad (5) may be cushioned or compliant for comfort, and maybe contoured to cradle and aid in centring the patient's torso on the chest pad (5).

A patient securement strap (56) is provided in the form of a back strap which is connected to two straps (18) with strap hooks (57) that can be hooked onto strap securement points (58) on the handle (6). The patient securement strap (56) is configured to form a loop around at least the patient's posterior torso in use.

The multi-bar linkage (10) is a 4-bar linkage including coupler link (15), first support link (7), second support link (9) with the fourth bar formed by a portion of the chassis (3).

The chest pad (5) is rigidly connected to the coupler link (15) which forms part of the upper frame (14). The primary pivot (17) is formed at one end of the coupler link (15) to which one end of the first support link (7) is pivotably connected. The handle (6) may be coupled to the patient support (5) via the coupler link (15) or via upper frame (14).

The first support link (7) is connected to coupler link (15) at one end and to the chassis (3) at an opposing end which forms a second pivot (11) rotatable about a secondary pivot axis (21). The secondary pivot axis (21) is located eccentrically from the primary pivot axis (20).

The second support link (9) is connected at one end to the coupler link (15) at a fourth pivot (19) and at an opposing end to the chassis (3). The second support link (9) is rotatable relative to the chassis (3) via a third pivot (13). The second, third, first, and fourth pivots (11), (13), (17), (19) have parallel pivot axes.

The knee rests (37) are formed from two main parts, including a mounting bracket (41) and knee pads (28). The knee pads (28) are cushioned for comfort. The knee rests (37) are both attached to the first link (7) by bracket (41). The knee pads (28) each include a contact surface (40) and lateral knee restraints (42). The knee rests (37) are thus configured to cradle and locate the patient's knees, with the contact surfaces (40) and lateral knee restraints (42) constraining the knees on three sides. The knee rests (37) may also be provided with one or more straps (not shown) for securing a patient's knees or legs in place. This may be necessary for transporting a patient who, for example, experiences leg spasms.

The knee rests (37) are pivotable about a tertiary pivot axis (22) located on the chassis. In the embodiments shown in FIGS. 2-5 the tertiary axis is coaxial with the secondary pivot axis (21). The knee rests (37) are connected to the primary pivot (17) via first support link (7) and thus pivotable about the secondary (21) and tertiary (22) pivot axis to move with the first support link (7). The knee rests are thus movable (and pivotable) relative to the chassis (3). The at least one knee rests (37) are pivotable about the tertiary pivot axis (22) in conjunction with the primary pivot (17).

As shown in FIG. 5, the knee rests (37) are attached to the bracket (41) by two bolts (30) passing through one of three slots (32) on the bracket (41). The knee pads (28) may be moved laterally away or towards the 4-bar linkage (10) to respectively widen or narrow the gap between the knee pads (28). Once adjusted, nuts (not shown) can be tightened on the bolts (30) to maintain the knee pads (28) in position.

The knee pads (28) can be adjusted vertically by unbolting the pads (28) from brackets (41) and moving the knee pads (28) up/down such that the bolts (30) align with one of the other two slots (32) available. Thus, the knee pads (28) may be adjustable laterally and vertically in the loading/unloading position prior to patient handling.

Operation to reorientate the reorientation mechanism (4) during patient handling to raise or lower the seated patient (25) between an initial sitting position and a transport position re-orientates the patient support (5) between a patient loading/unloading configuration and a patient transport configuration.

The patient support (5) is movable relative to the chassis (3) by rotation of the primary pivot (17) and the secondary pivot (11). The reorientation mechanism (4) is also configured such that rotation of the operating handle (6) causes rotation of the patient support (5) relative to the knee rests (37).

Upper and lower, spaced-apart horizontal crossbars (47), (48) are provided on the carer handle (6), the bars (47), (48) being parallel to the axes of the pivots (11), (13), (17), (19) in the four-bar linkage. In the patient loading/unloading configuration, both upper and lower crossbars (47), (48) are positioned above the chassis (3), behind a front of the chassis (3), with at least the upper crossbar (47) being rear of the lower crossbar (48) and rear of the knee-rests (37).

The chest pad (5), the operating handle (6), frame (14) and the coupler link (15) are in fixed relation to each other such that movement of the operating handle (6) causes a corresponding movement of the coupler link (15), frame (14) and chest pad (5).

In the embodiment shown in FIGS. 2-5, the two footrests (35) are provided on either side of the four-bar linkage (10) such that when the patient's feet (36) are positioned on the footrests (35), the second and third pivots (11), (13) are adjacent the patient's feet (36) or ankles and the first and second support links (7), (9) are between their legs. That is, the first and second support links (7), (9) are located and move in a sagittal plane that is between the two footrests (35). This configuration provides a more compact device than an embodiment where the linkage (10) is provided laterally on the patient moving device (1).

The rear-facing (patient-facing) knee-rests (37) are provided towards the middle of the chassis (3), substantially above the second pivot (11) and are attached to the first support link (7). The knee-rests (37) may contact and support a patient's knees while the patient is positioned in the patient moving device (1). The patient's knee joint pivot axis (38) may be directly above their ankle joint in the loading position. The knee-rests 37 may be cushioned for comfort and maybe contoured to cradle and locate the knees. Optionally the knee-rests may be provided with one or more straps for securing a patient's knees or legs in place. This may be necessary for transporting a patient who, for example, experiences leg spasms.

Patient handles (43) are provided for a patient (25) to hold during the transportation/transfer process. The patient handle (43) is rigidly connected to the carer handle (6) such that it moves with the carer handle (6) and chest pad (5) and is positioned to enable the patient (25) to reach it and grip it with slightly bent elbows.

A patient-support sliding adjustment member (54) is attached to the moveable patient-support (5) and can slide back and forth in the horizontal (when in the load/unload position) through a corresponding mounting aperture in upper frame (14). The adjustment member (54) is fixed/locked prior to patient reorientation of the device by the coupler link locking pin (55), is located through an aperture in the upper frame (14) and into a locking pin hole (53) in the patient-support sliding adjustment member (54). The chest pad (5) is thus horizontally adjustable to accommodate patients of varying dimensions.

The operating handle (6) is rigidly mounted to the upper frame (14) and thus as the handle (6) rotates about the primary pivot axis (20) the chest pad (5) also rotates about the primary pivot axis (20).

The rear wheels (26) are connected to the chassis (3) via two legs (29) that can be splayed apart (as indicated by arrows "S"), about front pivots (31), to increase the wheel-base of the chassis (3) or accommodate chair legs where necessary.

A foot-activated rocker lever (24) is provided adjacent the front wheels (27). The carer (12) may push down on one side of the lever (24) which acts to force the legs (29) to rotate about front pivots (31) to splay the rear wheels (26) apart. Pressing down on the opposing side of the lever (24) forces the legs (29) to rotate in the opposite direction about front pivots (31) to return the rear wheels (26) and legs (29) to the 'un-splayed' original position. The carer (12) may thus quickly and easily splay or un-splay the wheels as required merely by pressing their foot on one side or the other of the lever (24).

The device 1 includes a position locking means (59) to fix the coupling link (15) in position at any desirable angle. In this embodiment, the position locking means (59) is shown in the form of a telescoping strut that is connected at a pivot (60) on the coupler link (15) and a pivot (61) on the chassis (3). The position locking means (59) is unlocked by compressing the locking lever (62) mounted on the crossbar (47). Unlocking the position locking means (59) allows the linkage system to move. When the locking lever (62) is released the four-bar linkage system is locked in its current position. This allows the position of the movable chest pad (5) to be held constant during the loading procedure, as well as, the patient's (25) preferred transfer position to be selected.

The position locking means (59) may be of mechanical, pneumatic, hydraulic or electrical type.

It should be noted that FIG. 3 shows an alternate perspective view of the patient moving device (1) with the knee-rests (37) removed to show the 4-bar linkage (10) more clearly.

It will be appreciated that the patient (25) may not have the strength or mobility to place their hands and arms in a comfortable position and avoid their arms interfering with patient handling. Thus, the embodiment of FIGS. 2-3 includes a pair of armrest brackets (16) upon which an armrest (not shown) is attached. The armrest is for the patient (25) to rest their arms upon in an overlapping or folded arrangement during patient handling, thereby keeping their arms comfortably and safely constrained.

The patient reorientation movement will now be described with respect to FIG. 8, which shows the reorientation of the reorientation mechanism during patient handling to raise or lower a seated patient between an initial sitting position and a transport position to thus re-orientate the patient support between a patient loading/unloading configuration and a patient transport configuration.

Figure 8C:
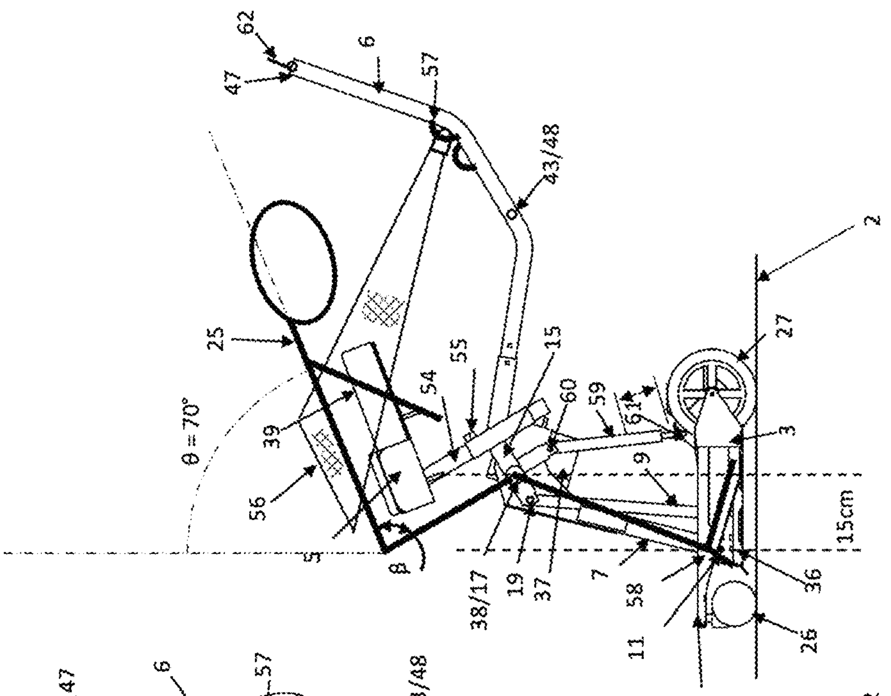
FIGS. 8A to 8C are side views of the device of FIGS. 4 and 5 schematically showing a carer operating the device to move a person onto the device for transport, where
Figure 8B:
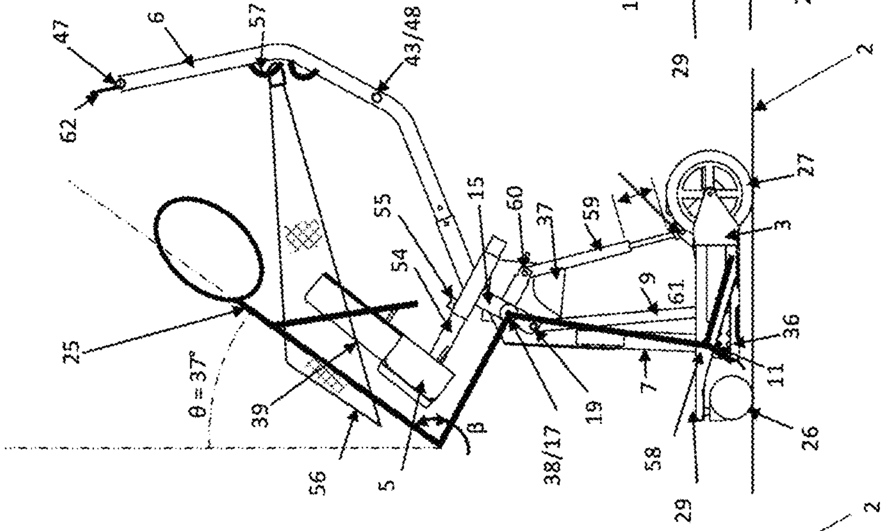
Figure 8A:
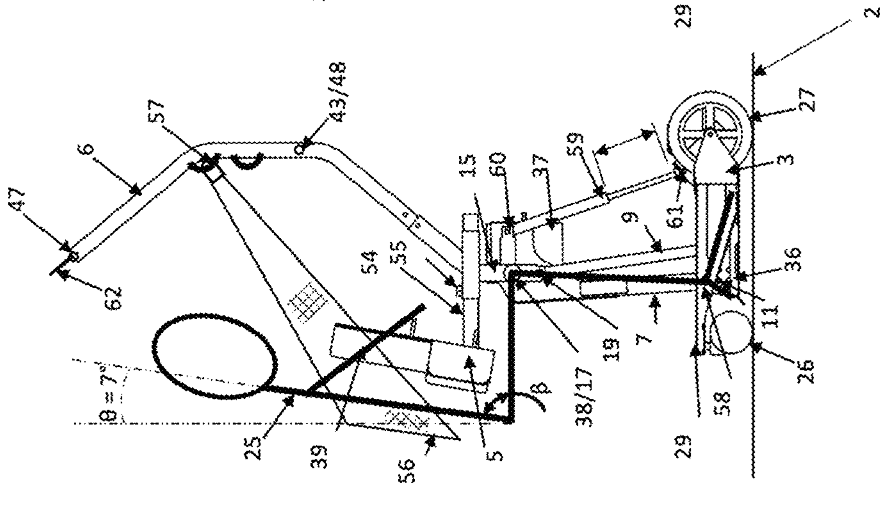

With reference to FIGS. 8*a*, 8*b* and 8*c*, the patient moving device (1) is movable from a patient loading/unloading configuration (FIG. 8*a*) to a patient transport configuration (FIG. 8*c*), via an intermediate position (FIG. 8*b*) by pulling the operating handle (6) forward and down.

The patient moving device (1) is movable in reverse from the patient transport configuration (FIG. 8*c*) back to the patient loading/unloading configuration (FIG. 8*a*) by lifting the operating handle (6) up and rearwards.

The patient moving device (1) is initially placed directly in front of the patient (25) to be transported in the patient load/unload configuration (FIG. 8*a*).

As the patient moving device (1) is placed directly in front of the patient (25) to be transported, the chest pad (5) is directly in front of the patient's torso or chest. The chest pad (5) can be adjusted on a horizontal plane by the carer (12) unlocking the coupler link locking pin (55) and sliding the patient-support sliding adjustment member (54) by pushing using handle (8) with one hand while the other hand holds bracing handle (23). The adjustment handle (8) is pushed toward the patient until the patient-support surface (39) contacts the front of the torso of the patient (25). As shown in FIG. 8*a*, a patient does not need to lean forward significantly to contact the patient-support surface (39) of the chest pad (5) allowing the patient (25) to be loaded and unloaded into their original sitting position without requiring the patient (25) to lean or to be moved. The form of the movable patient-support may be customised for people of varying sizes, or with differing physical conditions.

The patient securement strap (56) may be fitted around the rear of the patient in order to secure the patient against the patient-support (5) and to provide security against the patient falling. The patient securement strap (56) has an adjustable length and thus can be tightened or loosened about the patient (25) to ensure an optimum fit.

The patient securement strap (56) is fitted around the back of the patient (25) and the strap hooks (57) are connected to the strap securement points (58) on the operating handle (6). The patient securement strap (56) has the capability to be tightened about the patient (25) to ensure a snug fit.

As shown in FIG. 8, during use, as the carer rotates the operating handle (6) forward, the patient (25) is lifted from their seat and 'rolls' forward, their weight being progressively transferred forward to the patient moving device (1) and the patient's knee joints (38) acting as a pivot point.

The carer (not shown) continues to push the operating handle (6) down until the device (1) reaches the transport configuration shown in FIG. 8*c*. In the embodiment shown in FIG. 8, from the patient loading/unloading position, the first support link (7) moves through an angle of 25 degrees relative to the chassis, and the coupler link (15) moves through an angle of 65 degrees relative to the first link (7). The coupler link (15) (and thereby, the frame (14) and movable patient-support (5)) moves through an angle of about 90 degrees relative to the chassis (3), from the patient loading/unloading configuration to the patient transport configuration. Therefore, in the transport configuration (FIG. 8*c*), the torso (63) of the patient (25) is rotated forward about 90 degrees from vertical to be approximately horizontal in the transport position with most of the patient's weight carried through the patient-support (5).

Some patients may prefer a slightly inclined position, therefore, in other embodiments, the movable chest pad (5) may move through a larger or smaller angular range. However, for comfort reasons, it is desirable that the patient's torso is rotated forward at an angle of about 60 to about 80 degrees, nominally 70 degrees from vertical. However, the patient's torso may be rotated more than 80 degrees or less than 60 degrees, depending on the preferences of the patient.

In the transport configuration, both crossbars (47), (48) on the operating handle (6) are forward of the chassis (3). The patient moving device (1) may be lockable in the transport configuration and/or the patient loading/unloading configuration using the position locking means (59).

Once in the transport configuration shown in FIG. 8*c*, the patient can then be transported by the carer (12). To transport the patient (25), the carer (12) unlocks the front wheels (27) and when appropriate, retracts the splayed legs (29) by pressing on lever (24).

The wheels (26), (27) on the chassis (3) then allow the carer (12) to manoeuvre the device along the floor to the destination. In the transport position, if correctly loaded, the patient's centre of mass should not be forward of the front of the chassis (3) to avoid causing the device (1) to tip forward.

To unload a patient (25) from the patient moving device (1), the above-described steps are reversed. The chassis legs (29) are optionally splayed during approach, to avoid clashing with the target seating surface, the chassis (3) is secured relative to the floor by locking the front wheels (27), or otherwise securing the chassis (3). The carer (12) then pulls the operating handle (6) upwards and towards his or herself, and then rearwards and upwards, using either or both of the cross bars (47), (48), as needed. A stop may limit rearward rotation once the patient loading/unloading position is reached, the stops optionally being adjustable to alter the load/unload position (FIG. 8*a*) of the patient moving device (1).

The patient (25) is subsequently moved back into contact with the new seating surface and into a seated position. The patient moving device (1) may be optionally rotated further rearwards than shown to push the patient (25) into an upright seated position so that they do not need to use their own strength to disengage from the patient moving device (1).

The patient moving device (1) is suitable for numerous applications such as moving a physically impaired patient between a chair, a bed, a toilet, a wheelchair, car and the like. The compact design of the patient moving device (1), with the four-bar mechanism being centrally located and rear of the knee rests (37), and the operating handle (6) being over the wheelbase of the device in the patient load/unload position, enables the device to be suitable for use in a range of locations where larger devices may be impractical.

As the knee-rests (37) are connected to the first support link (7) which is in turn pivotable about the first (20) and second pivot axes (21), the patient's knee joints (38) move forward during the transfer process. The patient's knee should move approximately vertically above the front of the patient's foot (36) with the knee joints (38) approximately 60 mm rearwards. This feature ensures that the hip angle, β, is held relatively constant throughout the transfer process, thus avoiding extra hip flexion from the body position of the initial loading arrangement in FIG. 8*a*.

In the embodiment shown in FIG. 8*a*, the patient loading/unloading position, the first pivot (17) is above and substantially vertically aligned with the fourth pivot (19), such that the coupler link (15) of the four-bar linkage (10) is substantially vertical. As the device transitions to the transport position (FIG. 8*c*), the first pivot (17) moves forward and down along an arc, until the first pivot (17) is forward of, and generally horizontally aligned with, the fourth pivot (19).

The relative positions of the first (17) and fourth (19) pivots will change if different patient loading/unloading positions or patient transport positions are desired. For example, for a transport position where the patient's torso is slightly inclined, the coupler link (15) may form an angle with respect to horizontal of about 10 degrees to about 20 degrees, preferably about 10 degrees to about 15 degrees. In an alternative embodiment, the coupler link (15) may form an angle, with respect to horizontal, of about 17.5-22.5 degrees, preferably about 20 degrees.

The geometry of the first and second support links (7), (9) and the coupler link (15) are selected such that the resultant movement of the moveable patient-support is along a curvilinear path which approximately optimises vertical movement of the centre of mass of the patient being transported between the transport position to minimise the mechanical work required to move the device between the two positions while maximising patient comfort. The centre of mass (not shown) of the patient (25) follows a shallow non-circular arc between the loading/unloading position and the transport position, with the highest point of the centre of mass being between the patient loading/unloading position and the patient transport position.

The device utilises mechanical advantage to enable a carer to transition a patient on and off the device and therefore transfer them between two locations using a level of force that is acceptable by workplace safety standards.

It will be apparent that patients of different heights will have different centres of mass. The patient moving device (1) may be optimised for patients of a specified height range, and/or may come in various sizes.

The length of the distance between the movable chest pad (5) and the first pivot (17) will be a function of the height of the patient and this distance may be adjustable. For example, the moveable chest pad (5) may be slidable relative to the coupler link (15), or along the handle lever (41), or adjustable in height.

The movement path of the chest pad (5), handle (6) and knee-rests (37) is therefore determined by the geometry of the four-bar mechanism and the position of the chest pad (5) and handle (6) on the coupler link (15).

In the embodiments shown in FIGS. 2-5, the second and third pivots (11), (13) are provided on the chassis (3) at the same height, with the second pivot (11) being about 80 millimetres to the rear of the third pivot (13). However, alternatively the second and third pivots (11), (13) may be at different heights. The first and fourth pivots (17), (19) are provided on the coupler link (15), with the fourth pivot (19) provided adjacent to a first end of the coupler link (15) and the first pivot (17) spaced about 65 millimetres from the fourth pivot (19).

The first and second support links (7), (9) may be straight links or may be otherwise shaped, for example, to improve the ergonomics, compactness, or safety of the patient moving device (1).

In the embodiment shown in FIGS. 4-5 and 8, the first link has a straight portion joined to the secondary pivot (11) and an angled upper portion connected to the primary pivot (17). The first link (7) may thus be considered 'L-shaped'. The first link (7) straight portion is rear of the second link (9). A rigidly connected angled bracket at an upper end of the first link (7) facilitates the connection to the coupler link (15). This angled link shape moves the first link (7) away from the patient while accommodating movement of the second link (9).

In the embodiment shown in FIGS. 2-5, the chest pad (5) is mounted on a patient-support sliding adjustment member (54) that is telescopically adjustable relative to the coupler link (15) to adjust the position of the movable patient-support (5) relative to the first pivot (17).

Alternatively one or more of the links (7), (9), (15) or the positions of one or more of the pivots (11), (13), (17), (19), and/or the position of the movable chest pad (5) on the coupler link (15) may be adjustable to better fit the patient moving device (1) to a range of people.

The mechanical advantage that the device provides for a patient of a given height can be tuned by relative movement of the second pivot (11) forwards or away from the knee-rests (37), or fore-aft adjustment of the knee-rests (37).

Some embodiments of the device may be made from light-weight metal alloys and/or composite materials to improve the portability of the device. Optionally, the device may be foldable or able to be disassembled easily into smaller components for transport.

Figure 9:
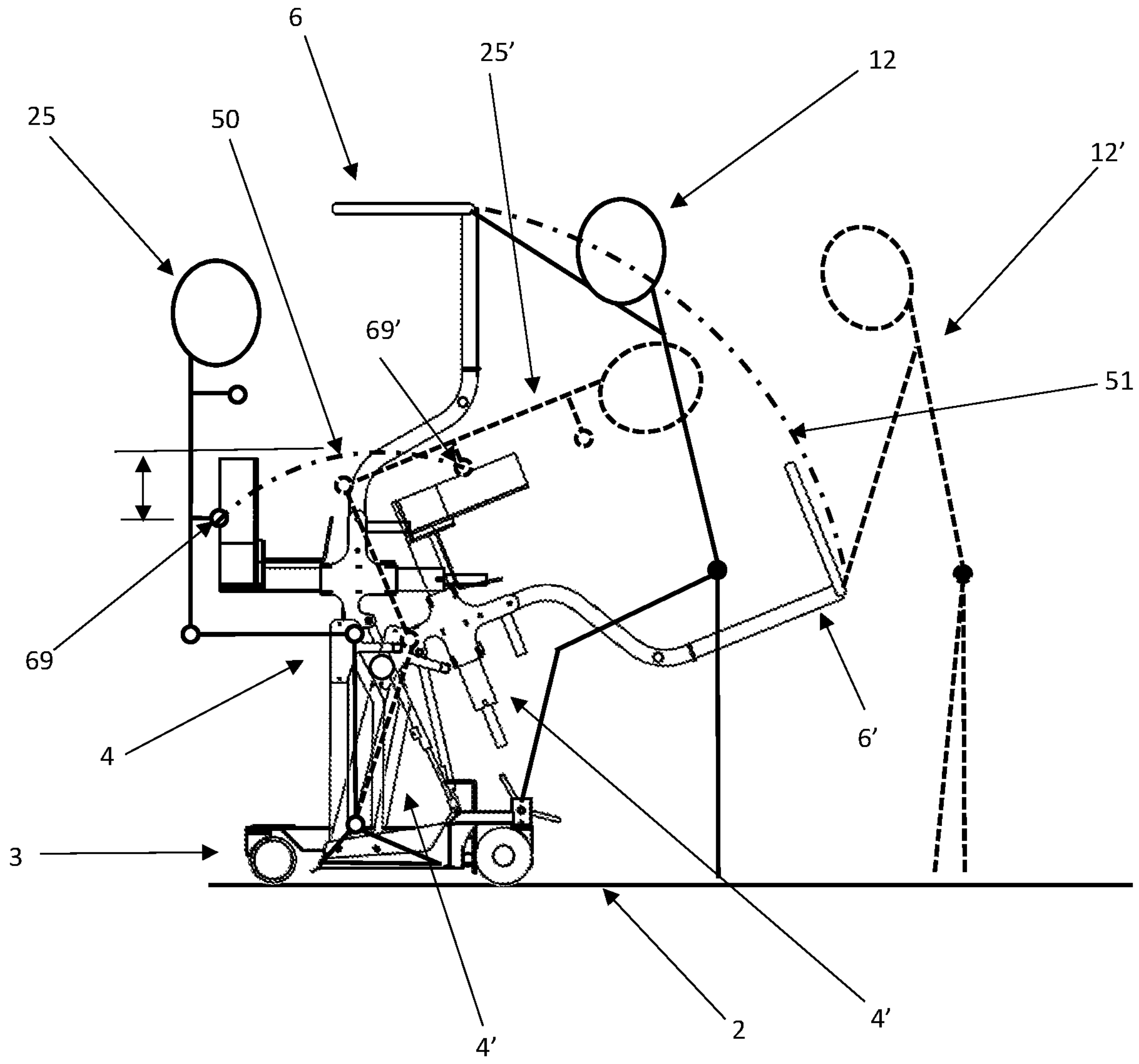
FIG. 9 shows a schematic diagram of use of the device of FIGS. 2-3 during the patient reorientation between an initial sitting position (patient carer indicated in solid lines) and a transport position (patient carer indicated in dashed lines)

FIG. 9 shows a schematic diagram of the patient reorientation between an initial sitting position (patient (25) and carer (12) indicated in solid lines) and a transport position (patient (25') carer (12') indicated in dashed lines). Components shown in the transport position are denoted by the same reference numeral with an appended apostrophe "'" indicated having moved position from the initial sitting position.

The curvilinear path travelled by the patient CoM (69) is represented by arc (50). Similarly, the curvilinear path travelled by the handle (6) is represented by arc (51).

Figure 10:
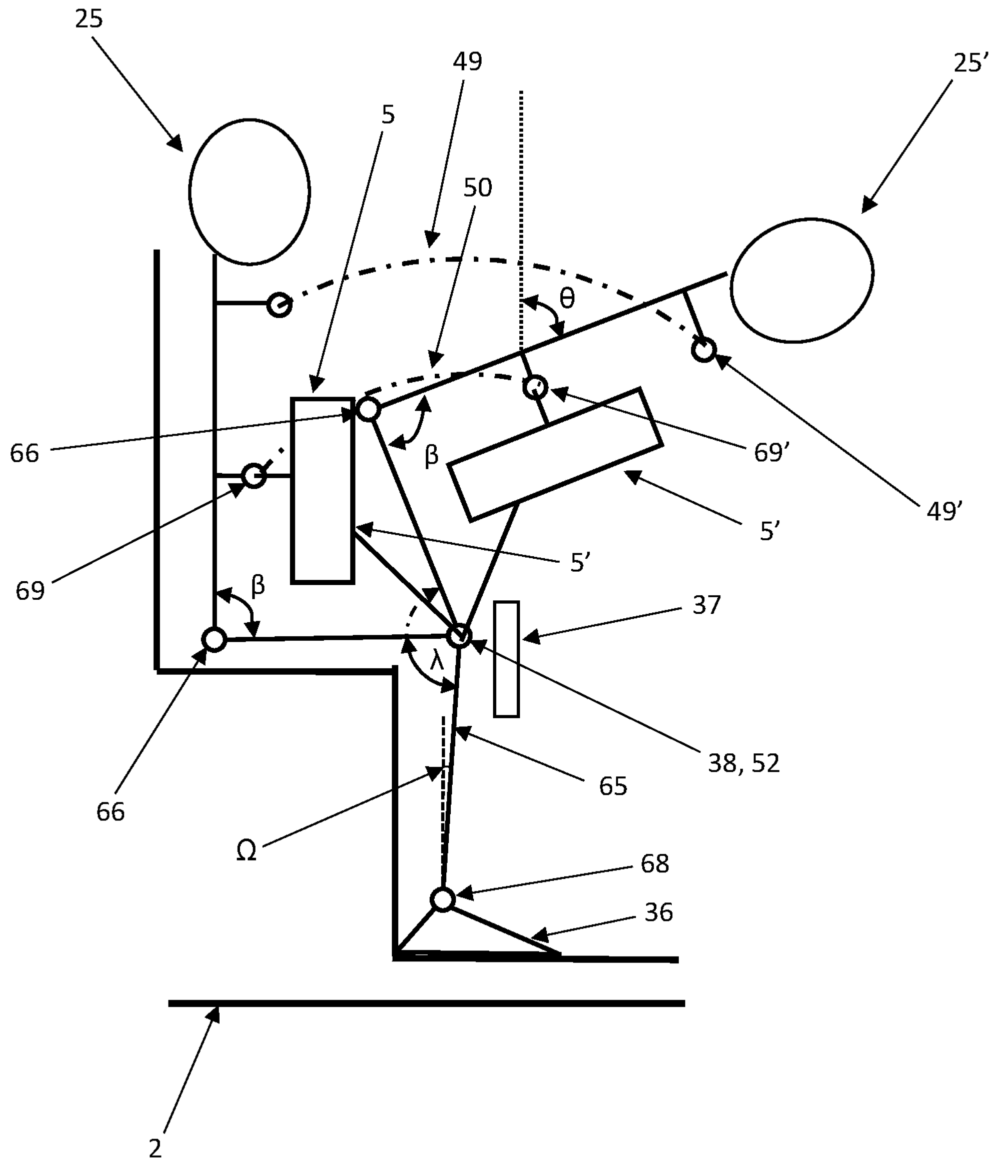
Figure 10 (Prior Art)
FIG. 10 shows a schematic diagram of the patient movement in a prior art device with static knee-rests.

FIG. 10 shows a schematic representation of the mechanics of a seated patient being moved by the prior art device of U.S. Pat. No. 8,832,874 by Alexander with a single pivot axis (52) approximately through the knee joint (38). Knee rests (67) are provided but are fixed to the chassis (3), in contrast to the movable knee-rests (37) of preferred embodiments of the present invention, e.g. as shown in FIGS. 2-9.

The patient (25) is shown being tipped forward to position 25' by rotating about the pivot axis (52). The hip flexion angle (β) is maintained at about a constant 87-90° during the reorientation and results in the knee angle changing from about λ~90° to about 155°. However, a potentially adverse impact for many patients by such a configuration is a deleterious stretching of their hamstrings as their knee joint angle λ increases during lifting/rotation in order to reach the torso inclination θ of around 70°. It has been found that a λ~155° is a difficult or uncomfortable knee angle for many elderly or infirmed patients, when their torso is orientated around 70°, due to the hamstring stretching involved.

Thus, as described above, preferred embodiments of the present invention, such as shown in FIGS. 2-9 aim to address this problem by utilising moving knee rests (37). The knee rests (37) move in correlation with, or at least move proximal to, the movement of the primary pivot (17). In the embodiments of FIGS. 1-9 this movement is achieved by connecting the knee rests (37) to the primary pivot for common rotation about the secondary pivot (11).

In the above described embodiments, the knee-rest (37) is directly attached to the reorientation mechanism (4) at the primary pivot (17) at the distal end of the first support link (7). However, the knee-rests (37) may be attached to the chassis (3) (or other convenient portions of the patient moving device (1)) by any convenient means including spring-biased levers, linear and/or curved tracks, cushioned/semi-elastic pads and so forth.

Figure 11B:
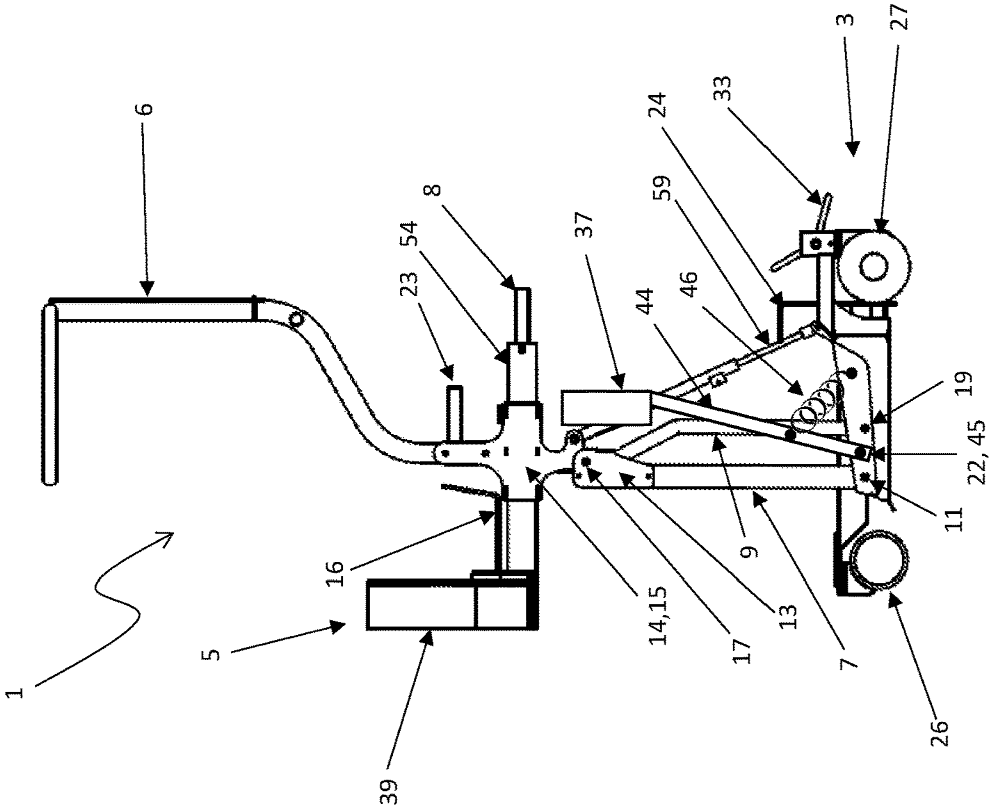
FIG. 11B is a schematic side elevation of a patient moving device according to a third embodiment.
Figure 11A:
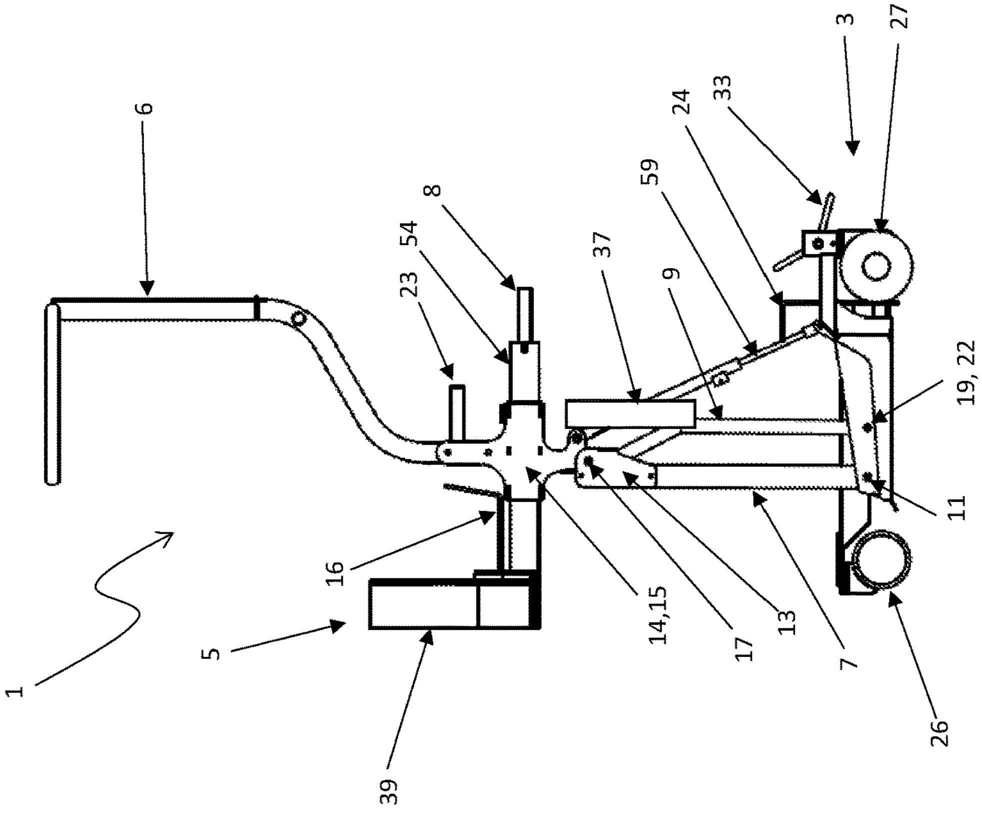
FIG. 11A is a schematic side elevation of a patient moving device according to a third embodiment.

FIGS. 11A and 11B thus show two alternative configurations for attaching the knee-rests (37) to the chassis (3).

FIG. 11A shows a configuration with the knee-rests (37) attached near to the distal end of the second support link (9). FIG. 11B shows a configuration with the knee-rests (37) attached to a distal end of a knee-pad mounting link (44), and pivotally attached at the other end to the chassis (3) at pivot (45) to pivot about tertiary pivot axis (22) located proximal or adjacent to the secondary pivot axis (21). A resilient means in the form of spring (46) attached between the knee-rest mounting link (44) and the chassis (3) acts to provide a restorative resistance force against the force applied by a patient's knees during patient handling. In both the configurations shown in FIGS. 11A and 11B, the knee rests (37) travel in a path that substantially correlates, is similar, or is proximal to the path travelled by the primary pivot (17).

It can be thus seen that each of the preceding embodiments, as shown in FIGS. 1-9 and 11 provide an advantageous means of addressing the prior art issue of excessive hamstring extension (as shown in FIG. 10), by the incorporation of moving knee rests (37). In the embodiments shown in FIGS. 1-9, 11 this movability is achieved by attaching the knee rests (37) to the chassis (3) for rotation about a tertiary pivot axis (22) (located eccentrically from said primary pivot axis (20)) allowing differential movement between different bodily portions of the patient (25) during patient handling. In FIGS. 1-9 the tertiary pivot axis (22) is coaxial with the second pivot axis (21) while in FIG. 11A the tertiary pivot axis (22) is located at fourth pivot (19) and in FIG. 11B is located between second (11) and (fourth (19) pivots.

Moreover, although it is highly convenient and effective to attach the knee rests (37) directly to the primary pivot (17), if can be seen that the alternative exemplary embodiments in FIGS. 11A and 11B allow alternative knee rest (37) attachments configuration to provide similar patient handling movements.

The effect of including a pivot axis (22) for the knee-rests (37) to move/pivot about is to allow the connected reorientation mechanism (4) and attached chest pad (5) to pivot together about the connection with the chassis (3). Consequently, this allows the patient's knees, that are contacting the knee-rest (37), to also pivot forwards towards the carer (12) about the tertiary pivot axis (22) as the patient (25) is lifted from the initial sitting position during patient handling. This motion mimics the natural, uncompromised movements performed by able-bodied humans rising from a sitting position.

As discussed, the use of a primary pivot (17) by which the patient-support (5) pivots about the primary pivot axis (20) enables the use of a patient-support (5) such as the chest pad (5) to be secured rigidly to the reorientation mechanism (4). The patient torso (63) and patient-support (5) are thus maintained in a generally constant spatial-positioning relative to each other as the torso (63) of the patient (25) engaged with the fixed patient-support (5) also pivots about the primary pivot axis (20).

Figure 12:
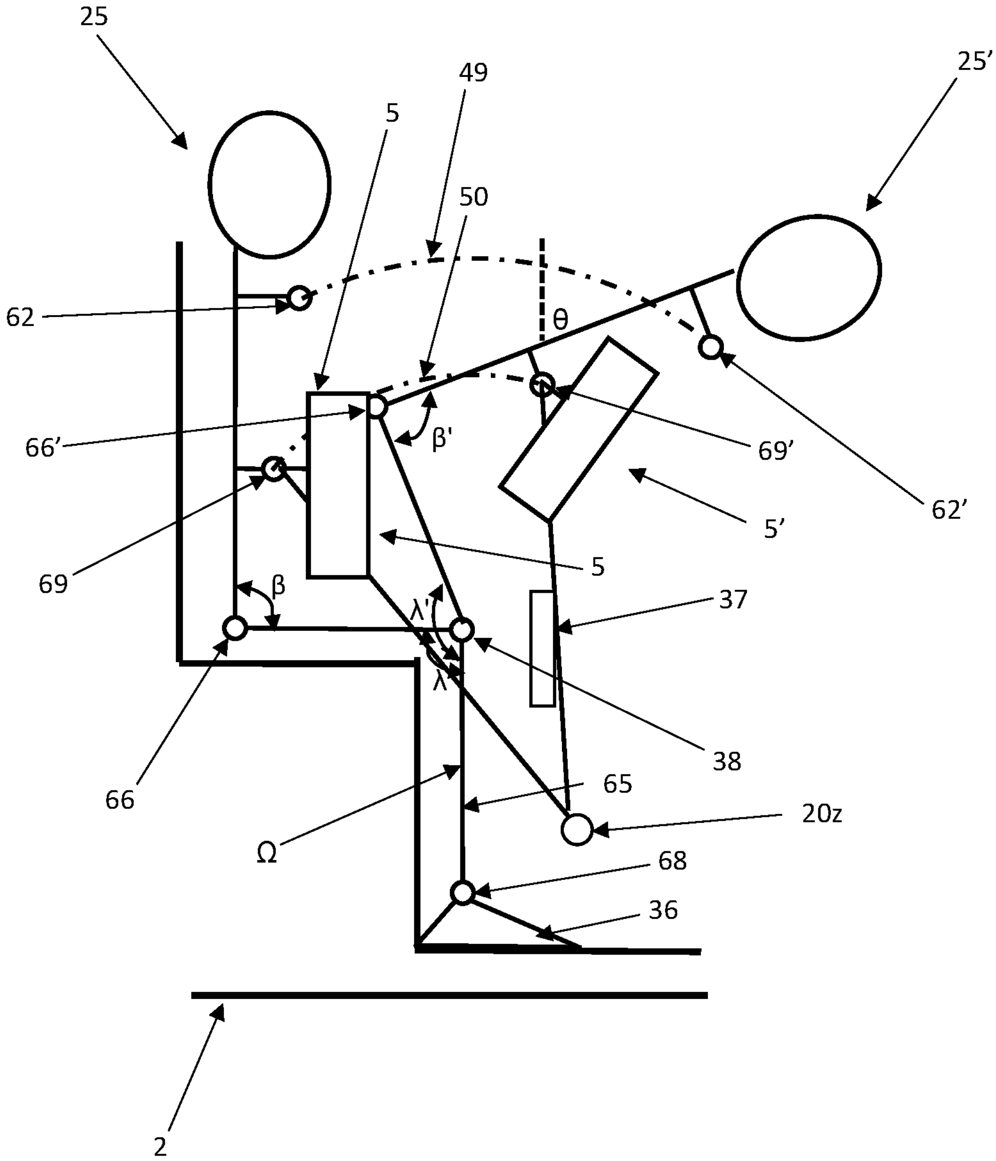
FIG. 12 shows a schematic diagram of patient movement using a device with a primary pivot axis in a different location to preceding embodiments.

As shown in FIG. 12, it will be apparent however, that if the chest pad (5) were configured to pivot solely about a single primary pivot axis (20) positioned eccentrically from the knee joint pivot axis (38), different bodily parts of the patient (25) would experience a differential movement during patient handling as the patient (25) also pivots about their knee joint (38). The differential movement will vary with the magnitude and direction of eccentricity and may lead to the adverse consequence shown in FIG. 12 of the insecurity of the patient (25) losing intimate engagement with the chest pad (25) and the associated discomfort.

It is helpful in the analysis of dynamic mechanic systems to resolve the various movements and elements to their basic effective components. To this end, it will be understood the mass of the patient being supported by the patient support can be considered mechanically equivalent to the same mass concentrated at a single point, i.e. the patient's centre of mass.

It has been determined that the variations in position of the centre of mass, in the sagittal plane, from the full size and weight spectrum of patients (25) able to use the patient moving device (1) lie within the area of a 200 mm sided square (a centre of mass aggregation region (70)), i.e. +/−100 mm from a centre-point (69) of the square. Moreover, it has further been determined that said a centre of mass aggregation region geometric centre-point (69) would be positioned 340 mm horizontally and 270 mm vertically above (or a distance r=434 mm at an angle of 0=38.5° from) said primary pivot (17) for a given patient (25) using the patient moving device (1). As previously referenced, the nomenclature used herein designates the term 'centre-of-mass', 'Centre-of-Mass', as referring to, or relating to the centre of mass of any given patient, while the part-capitalized abbreviation 'CoM' specifically relates to said centre of mass aggregation region geometric centre-point.

It can also be seen that the movement of any notional point on the patient support (5), in direct contact with the torso (63) of a patient (25), will trace the same path during patient handling as an adjacent point on a patient (25) in contact with that notional point on the patient support (15). Given the distance of the patient support (5) from the primary pivot (17) may be adjusted to accommodate different-sized patients (25), it follows the reorientation mechanism (4) could be adjusted to position the contact surface (39) of patient support (5) at the same position of the centre-point (69).

Figure 14:
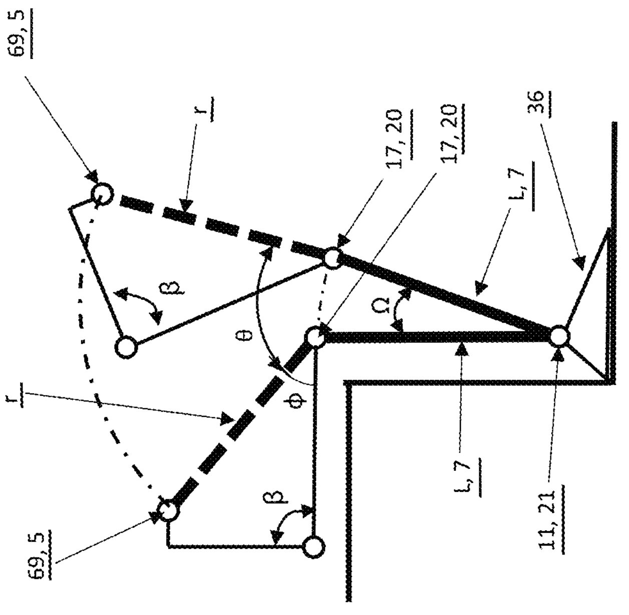
FIG. 14 shows an enlarged part view of FIG. 13, additionally showing patient center of mass and knee movement.
Figure 13:
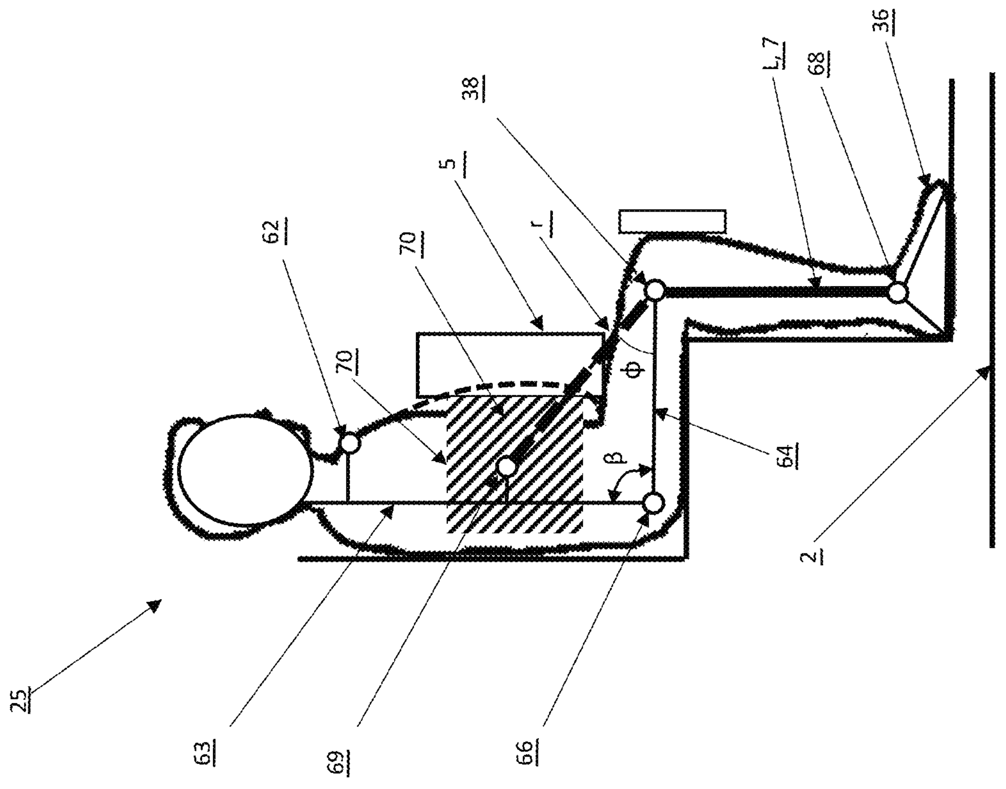
FIG. 13 is a schematic of a person showing their body position in a seated position for engaging with a patient moving device according to preferred embodiments.

Thus, (as represented in FIG. 14) given the patient support (5) is rigidly coupled to the primary pivot (17), and is engaged with a patient's anterior torso throughout patient handling, it follows that said centre-point (69) is:

a representative Centre of Mass (CoM) (69) of any patient, and functionally equivalent to being rigidly connected by said reorientation mechanism (4) to said primary pivot (17) by a linkage of 434 mm orientated at 38.5° above horizontal for a seated patient (25) with an upright, substantially vertical torso (63) with an inclination angle θ~0° and knees engaged with knee rests (37) such that the patient's knee-joint pivot axis (38) is co-axial with the primary pivot (17).

This allows the trajectory path (50) of the CoM (69) to provide a reliable and accurate representative, proxy or surrogate for the trajectory path of all patients (25) during patient handling.

FIGS. 15-18 illustrate the functionality of a patient securement strap (56) used to hold the anterior surface of a patient's torso (63) in close engagement with the chest-pad (5) during the patient handling. The patient securement strap (56) assists in ensuring intimate engagement of the patients' hips and torso (63) with the chest pad (5) during patient handling between the initial sitting position and the transport position.

The patient securement strap (56) enables the patient moving device (1) to be used for patients with insufficient upper body strength or who are otherwise unable to maintain a grasp of the patient moving device (1) during patient handling, in contrast to prior art devices.

The patient securement strap (56) includes an adjustable loop extending from the patient moving device (1), around the patient's posterior torso. The patient securement strap (56) includes two adjustable-length link straps (18) with hooks (57) for connecting the strap (56) to the strap securement points (58) on the handle (6). The link straps (18) include force adjustment means (not shown) to adjust the length thereof. The patient securement strap (56) can thus be tightened about the patient (25) to ensure a snug fit. The adjustable-length link straps (18) also enable the patient securement strap (56) to accommodate different sized patients.

In use, prior to patient handling, the patient securement strap (56) is fitted around the rear of the patient (25). This position is shown in FIGS. 15A, 17A and 18A. The straps (18) are then tightened by reducing their length in order to secure the patient (25) against the patient-support (5) to prevent, or at least minimise, movement of the patient (25) relative to the patient support (5), thus providing security against the patient (25) falling during the reorientation.

Figure 15B:
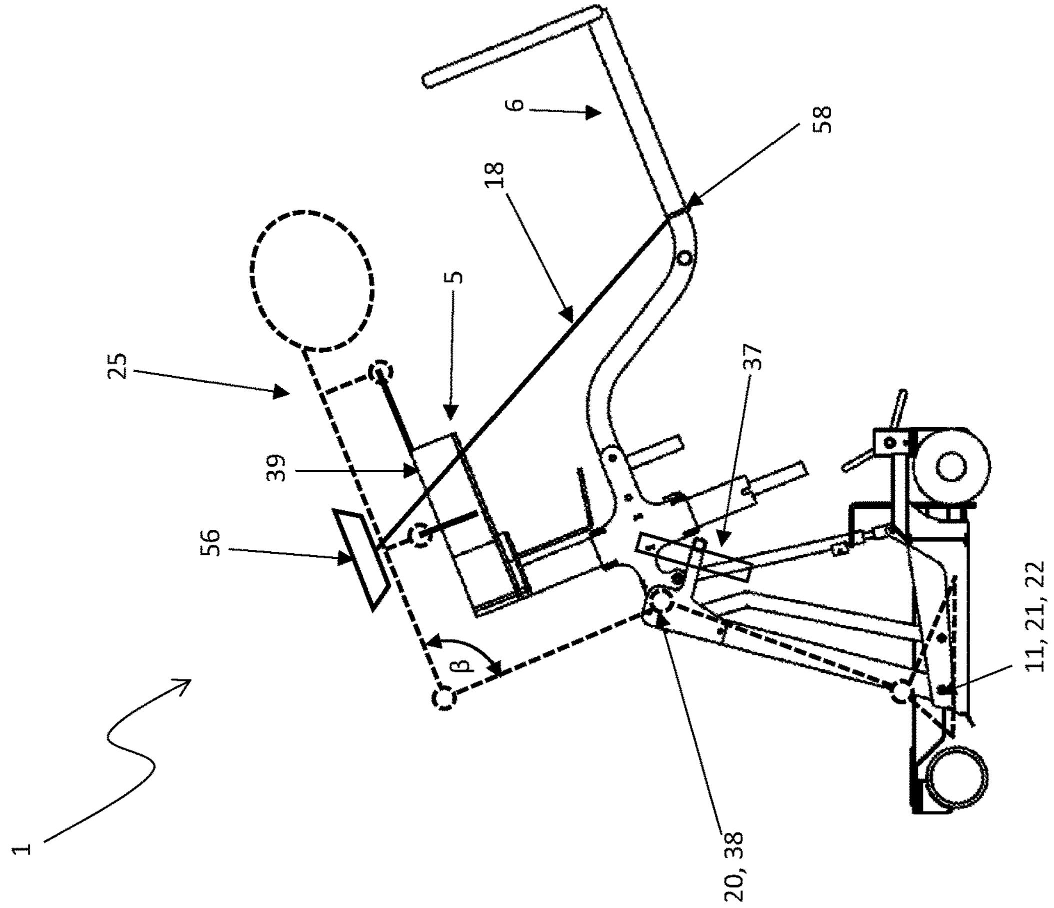
FIGS. 15A and 15B show schematic diagrams of patient movement using the patient movement device of FIGS. 2-3 in a loading/unloading configuration (FIG. 15A) and a transport configuration (FIG. 15B)
Figure 15A:
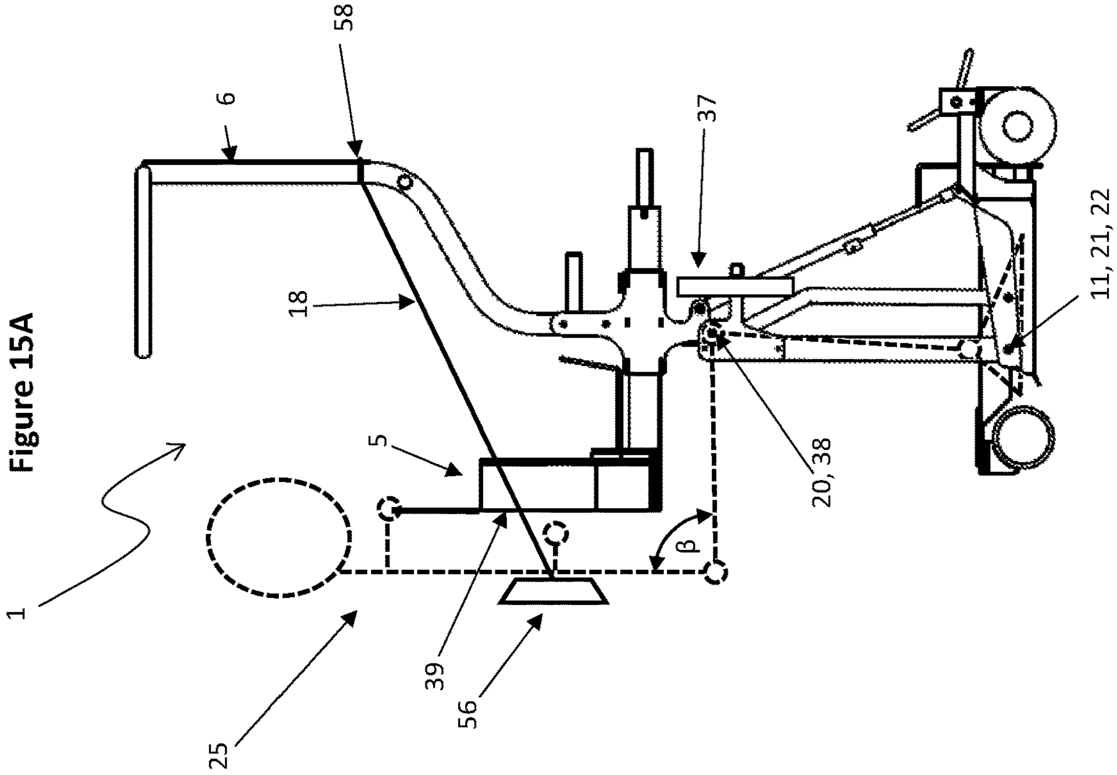
Figure 17B:
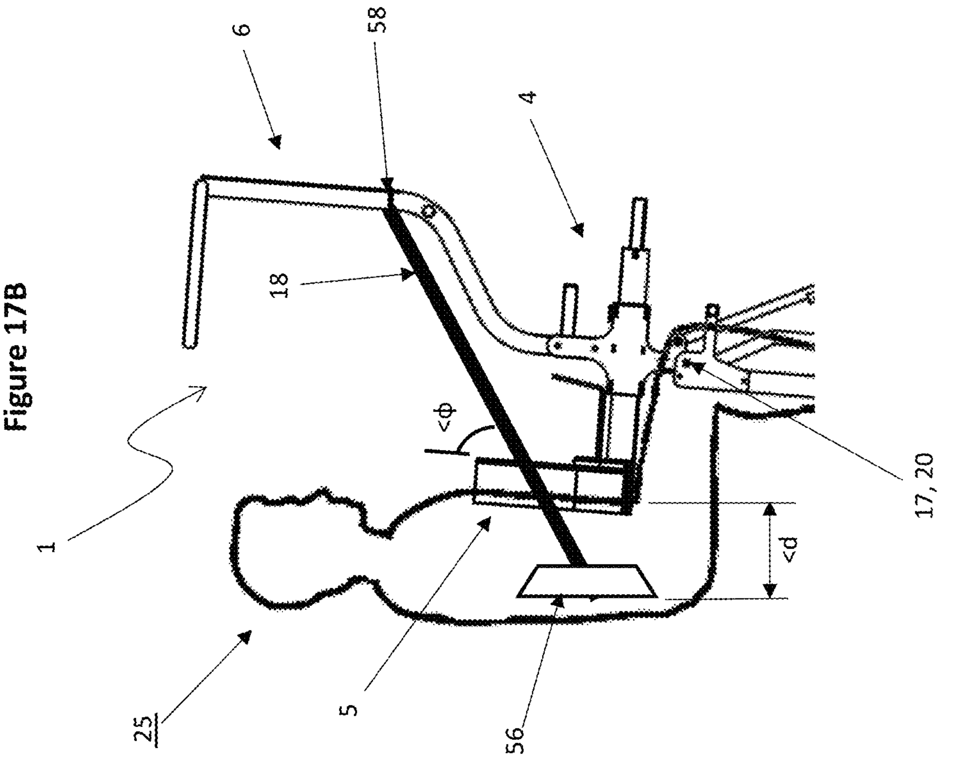
FIG. 17B shows a schematic diagram of the patient movement device of FIGS. 2-3 in a loading/unloading configuration showing the securement strap as the handle is rotated.
Figure 17A:
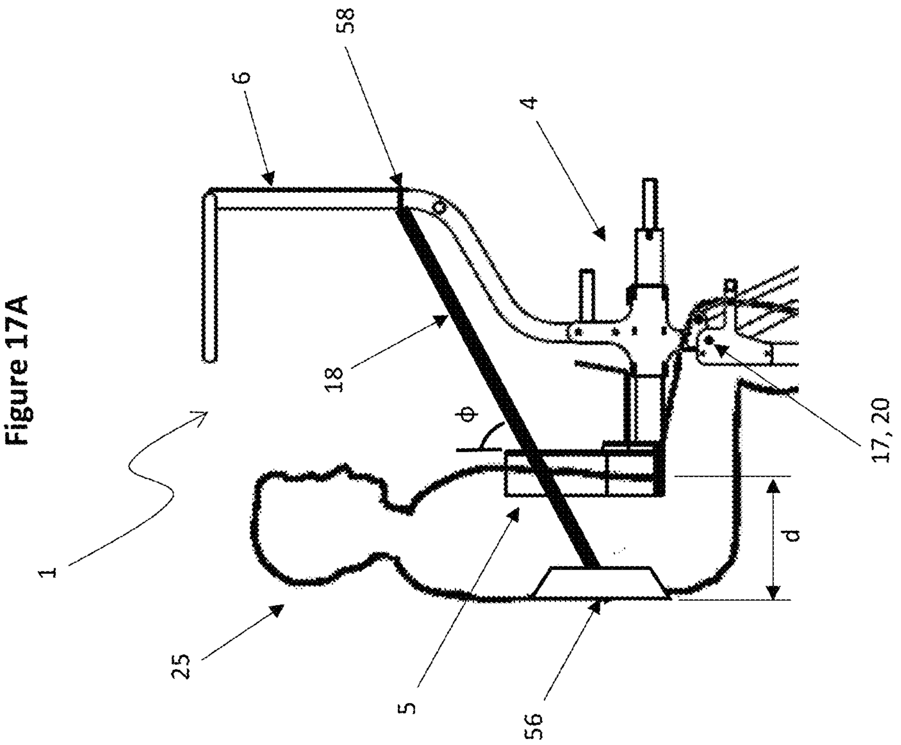
FIG. 17A shows a schematic diagram of the patient movement device of FIGS. 2-3 in a loading/unloading configuration using a securement strap.
Figure 18B:
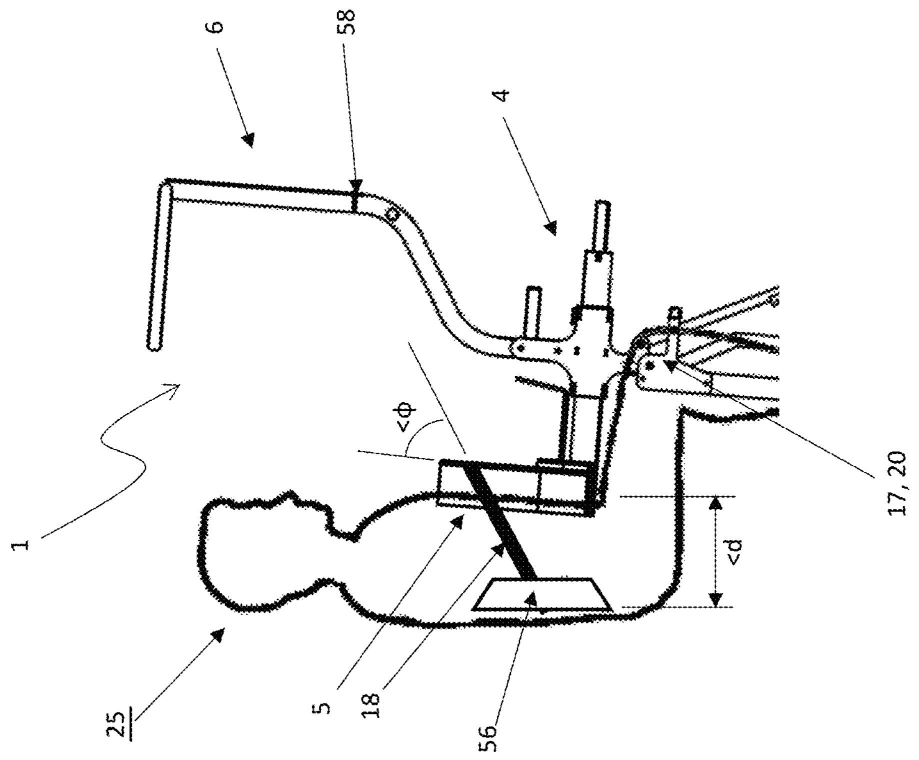
FIG. 18B shows a schematic diagram of the patient movement device of FIGS. 2-3 in a loading/unloading configuration showing the securement strap as the handle is rotated.
Figure 18A:
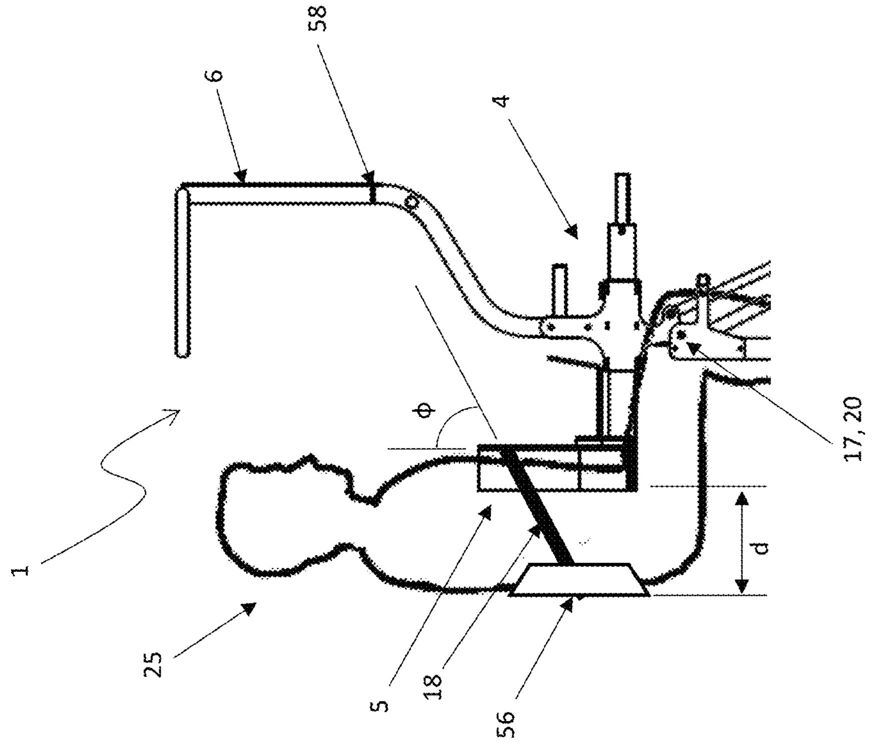
FIG. 18A shows a schematic diagram of the patient movement device of FIGS. 2-3 in a loading/unloading configuration using an alternative securement strap.

FIGS. 15B, 17B and 18B show the patient moving device (1) in the transport position with the patient (25) rotated through 70°. The patient securement strap (56) maintains the patient (25) in a stable position against the chest pad (5) and thus maintains a constant patient hip angle R throughout the reorientation movement.

Figure 16:
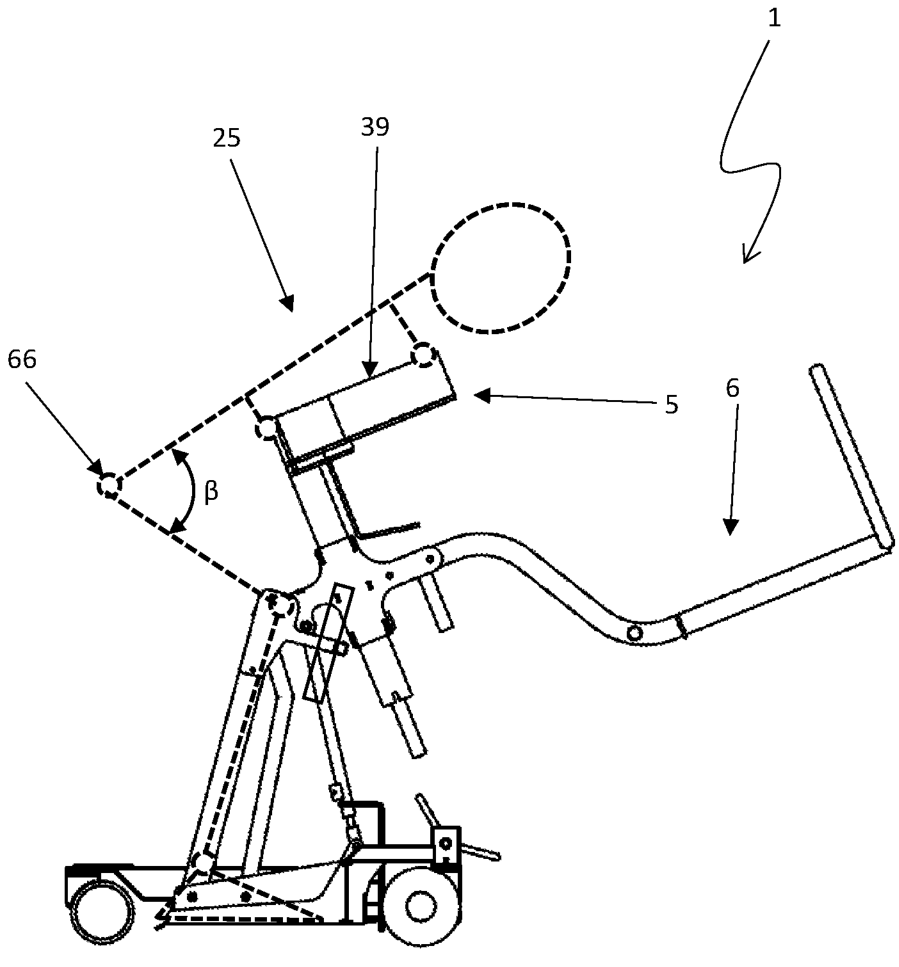
FIG. 16 shows a schematic diagram of patient movement using the patient movement device of FIGS. 2-3 in a transport configuration without using a securement strap.

FIG. 16, in contrast to the embodiment of FIGS. 15, 17 and 18, shows the result of attempting to reorientate the patient (25) without utilising such a securement strap (56). The patient (25) may slip after lifting commences or fail to maintain a sufficiently secure engagement to retain contact with the patient support (5) as it begins moving upwards from the initial sitting position towards the transport position. As the patient increasingly slouches away from the moving patient support (5) the hips (and the hip joint axis (66)) of the patient (25) becomes increasingly disengaged from the patient support (5). Moreover, this results in the hip angle R being reduced, causing discomfort for the patient (25) and reducing stability of the patient (25) during transport.

In the embodiment shown in FIGS. 17A and 17B, the securement strap (56) has a securement point (58) located on the operating handle (6) at a position such that the link straps (18) subtend an angle of ϕ~60° (+/−7.5°) from vertically upright with the patient support (5) orientated in the patient loading configuration.

An alternative embodiment is shown in FIGS. 18A and 18B with the securement strap (56) connected to a securement point (58) located on the chest pad (5) at a position such that the link straps (18) subtend an angle of ϕ~60° (+/−7.5°) from vertically upright with the patient support (5) orientated in the patient loading configuration.

In both embodiments the strap (56) in use acts to ensure the patient's torso (63) is maintained in engagement with the chest pad (5) as the handle (6) is rotated.

During the patient handling procedure shown in FIG. 8A to FIG. 8B, the geometry of the relative movement between the patient securement strap (56), the strap securement points (58) and the chest pad (5) causes the patient securement strap (56) to further tighten as the patient's weight is transferred on to chest pad (5) and hence better secure the patient (25).

The relative geometry between the patient securement strap (56), strap securement points (58) and the moveable patient-support (5) can be selected to cause the patient securement strap (56) to further tighten about the patient (25) relative to the chest pad (5) due to the process of lifting the patient (25) as follows.

After the patient is secured and patient handling is commenced, the reorientation mechanism (4) rotates through a small angle until the patient (25) starts to be raised from their initial sitting position. During this initial rotation, while the patient (25) remains seated, the innate elasticity of the human torso causes the lower portion of the rotating patient support (5) to further compress the patient's abdomen region below the ribs, whilst the greater rigidity of the ribs and sternum region resists such deformation to a greater extent. Thus, the patient support (5) effectively becomes partially dovetailed or 'keyed' into the region under the ribs and thus further ameliorates the propensity for the patient to slip between patient securement strap (56) and patient support (25) as patient handling commences.

This tightening of the strap and pressing of the patient toward the chest pad (5) is represented in FIGS. 17B and 18B which show the reduction in the distance (d) between the chest pad and strap (56) as the handle (6) is rotated. Similarly, this movement causes the angle $\phi$ of the link straps (18) with respect to vertical to decrease as shown by the difference in $\phi$ between FIGS. 17A and 17B and between FIGS. 18A and 18B.

Thus, the configuration of the patient securement strap (56) ensures the patient's hip angle $\beta$ is maintained between 80-110°, and preferably between 87-90° during patient handling. Preventing the hip angle $\beta$ from reducing has been found to be important for patient comfort during handling.

As shown more clearly in FIGS. 15, 17 and 18, the patient securement strap (56) also provides the ability to assist a slumped seated patient in raising their torso upright. It will also be readily apparent that by appropriately tightening the patient securement strap to securely restrain the patient (25) against the patient-support (5) during patient handling, any risk of the patient slipping downwards or laterally during patient handling is greatly minimised.

Simple prior art straps or slings used to assist in patient handling also typically pass around a patient's posterior torso and, in some cases, pass under the seated patient's hips/thighs. Notwithstanding the difficulty for both a carer and a non-weight-bearing patient in positioning a strap underneath the patient (as discussed previously), it is recognised that such straps/slings typically provide only limited ability to maneuverer a patient in directions non-aligned with the direction of the applied force in the strap/sling without slippage.

In contrast, the combination of the patient support (5) and the patient securement strap (56) allows the patient's torso (63) to be secured therebetween, with the compressive forces being distributed between the opposing sides of the torso (63). This configuration allows a higher force to be applied to a greater area of the torso (63) with increased frictional resistance to slippage of the patient securement strap (56) upwards towards the patient's armpits during lifting.

Figure 19B:
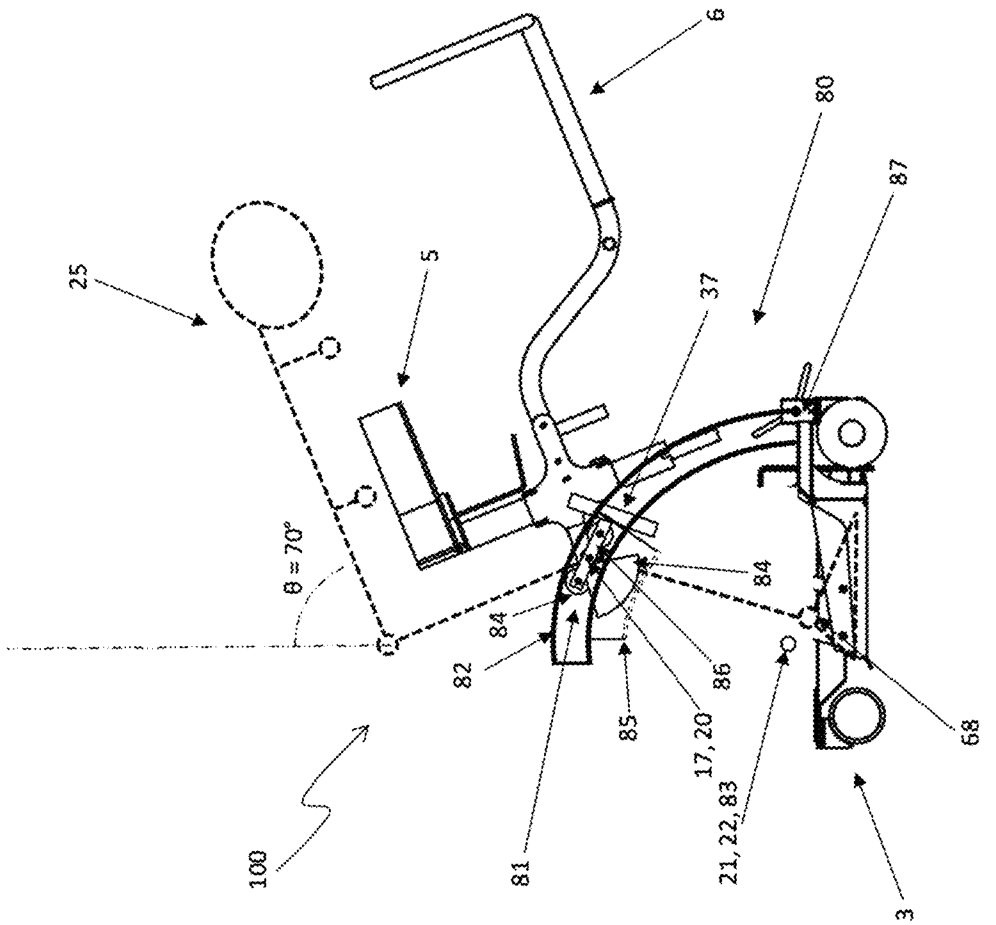
FIGS. 19A and 19B show schematic diagrams of patient movement using a patient movement device according to a fifth embodiment, in a loading/unloading configuration (FIG. 19A) and a transport configuration (FIG. 19B)
Figure 19A:
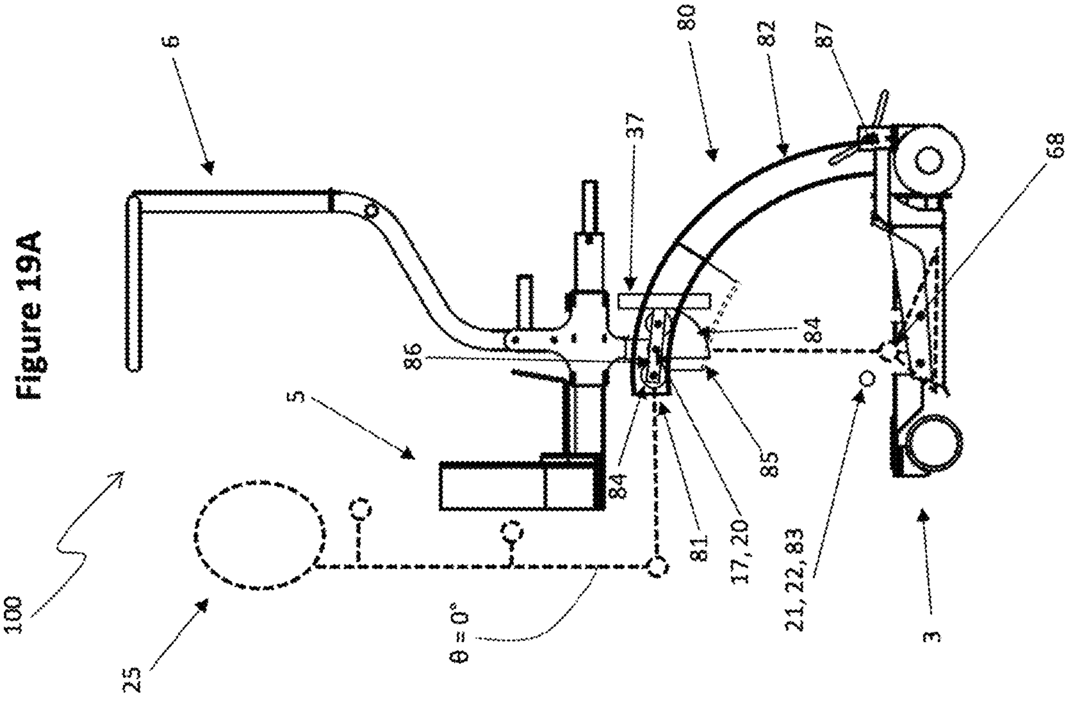

A person moving device (100) according to an alternative embodiment is shown in FIG. 19. The person moving device (100) has an alternative reorientation mechanism (80) to the reorientation mechanism (4) shown in the preceding embodiments. FIG. 19A depicts the patient moving device (100) in the patient loading/unloading configuration at the start or end of patient handling, while FIG. 19B shows the same patient moving device (100) in the transport position.

In contrast to the use of a 4-bar linkage reorientation mechanism (4) of the embodiments of FIGS. 2-9, the embodiment of FIG. 19 incorporates a geared reorientation mechanism (80) including a slidable carriage (81) coupled to a curved track (82). The primary pivot (17) is coupled to carriage (81) and configured to slide along the curved track (82).

It can be seen that despite the visual disparity between the reorientation mechanisms (4, 80) in the person moving devices (1, 100), there is a high degree of equivalence between the functional role of the individual linkages L (7), P (9), S (15) and Q (3) of the 4-bar linkage reorientation mechanism (4) and that of the geared reorientation mechanism (80). The linkages L (7), P (9), S (15) and Q (3) of the 4-bar linkage reorientation mechanism (4) will now be compared with the alternative reorientation mechanism (80).

The equivalent of first support linkage L is provided by the curved track (82). The curved track (82) is attached at one end to the chassis (3) and shaped to correspond to the arc sector swept by the rotation of linkage L about the secondary axis (21) of the preceding embodiments. In the embodiment, the secondary pivot axis (21) is a virtual pivot, located adjacent the location of the patient's ankles (68) on the chassis (3) at the geometric centre (83) of the curved track;

The second support linkage P equivalent is provided by the geared mechanism (80) which includes quadrant gears (84) engaging with a toothed gear track (85) on a complimentary portion of the curved track (82), providing the relative rotational input equivalent to the effect of the second support linkage P.

The equivalent of coupler link S is provided by the carriage (81) slidably mounted on the track (82) with a pivotable 'coupler' portion (86) rotatably attached to the gears (84) and pivotable about a primary pivot (17). The coupler portion thus forms a functional equivalent to the primary pivot (17) (and primary pivot axis (20)) and coupler link S. The patient support (5) is coupled directly (or indirectly via a suitable mounting, housing or the like) to the pivotable coupler portion (86) and, for example, may be manually rotatable for patient handling by a carer (not shown) via an attached operating handle (6).

A ground link Q equivalent is provided by the chassis (3) as a ground link between the virtual secondary pivot axis (21) and the attachment point (87) of the curved track to the chassis (3).

Figure 20B:
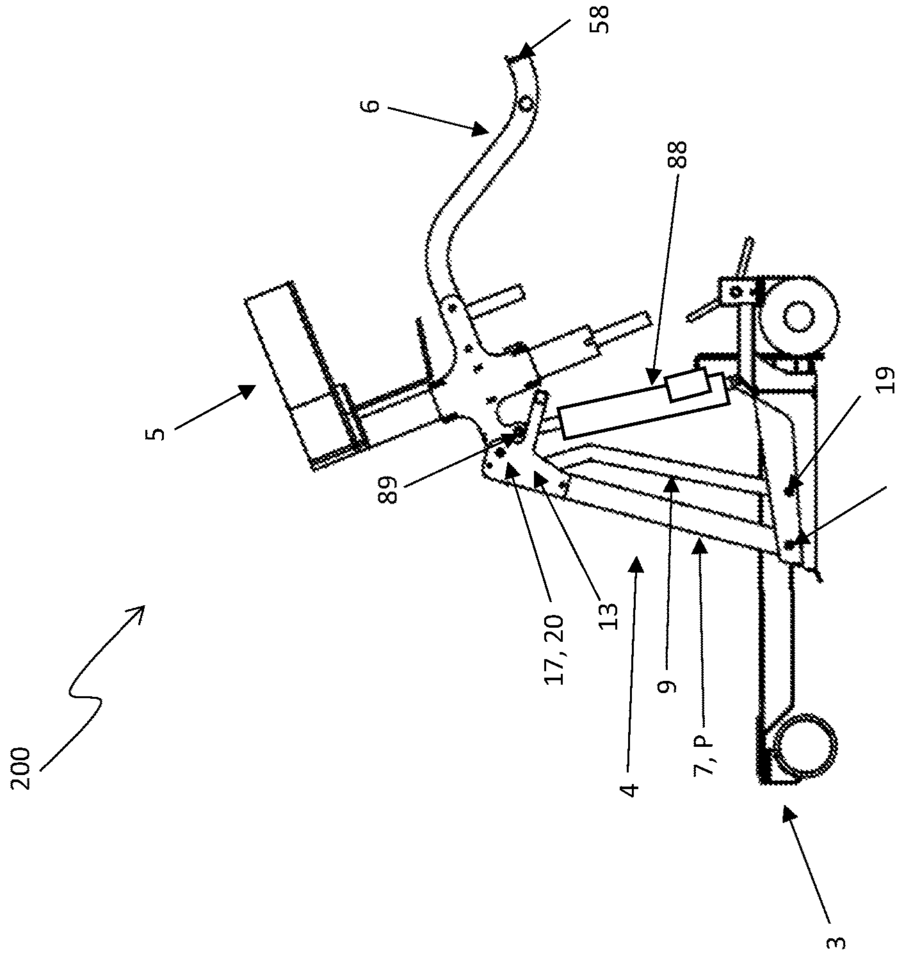
FIGS. 20A and 20B show schematic diagrams of patient movement using a patient movement device according to a sixth embodiment, in a loading/unloading configuration (FIG. 16A) and a transport configuration (FIG. 161B)
Figure 20A:
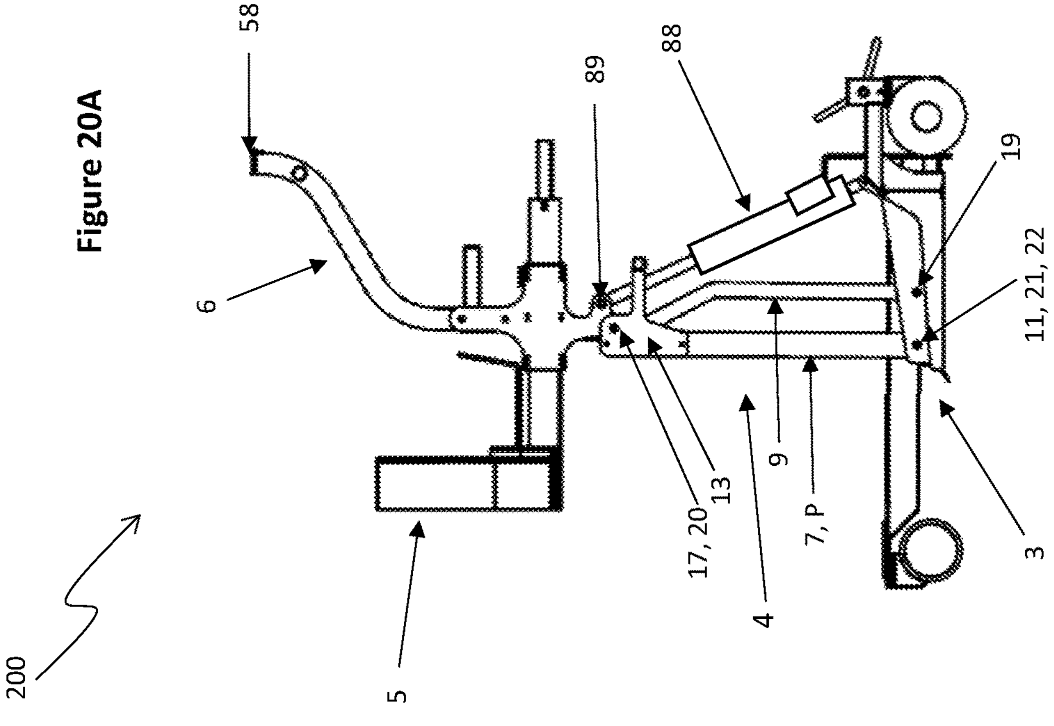

A further alternative embodiment is shown in FIG. 20 including a person moving device (200) with a modified reorientation mechanism (4). FIG. 20 depicts a patient moving device (200) in the patient loading/unloading configuration at the start or end of patient handling, while FIG. 20B shows the same patient moving device (200) in the transport position.

In this embodiment, instead of replacing the purely mechanical 4-bar linkage reorientation mechanism (4) with a different design, an electrical drive (88) is used as an additional part of the reorientation mechanism (4) to substitute (or supplement) for the manually input motive power provided in the prior embodiments by the carer (12) rotating handle (6).

The electrical drive (88) is provided in the form of a linear drive attached between the chassis (3) and a portion of upper frame (14) which includes the coupler link S. The electrical drive (88) is attached via a drive pivot (89) to the frame (14) and is thus constrained to operate eccentrically to the primary pivot axis (20) and the secondary pivot axis (21), causing the patient support (5) to rotate about the primary pivot axis (20). The electrical drive (88) may be operated by the carer (12). In some embodiments, the carer (12) or the patient (25) may control the drive (88) via remote or wireless control or directly by controls (not shown) mounted on the patient moving device (200).

The person moving device (200) is shown with a shortened handle (6) (omitting the crossbars (47)) in comparison to the handle (6) of preceding embodiments. The handle (6) may no longer be required to operate as a 'handle' as such, for rotating reorientation mechanism (4) but may still be required as it includes the securement points (58) for the patient securement strap (56).

Another alternative embodiment (not shown) may include a reorientation mechanism (4) with a rotational electrical drive replacing or coupled to one or more of the pivotal connections (11, 13, 17, 19) of the 4-bar linkage (10) to provide rotational motive power. This motive power may supplement or completely replace the need for manual input from a carer to move the patient from the initial sitting position to the transport position.

As illustrated by these exemplary configurations, there are numerous possible reorientation mechanisms, of which these are just a few illustrations.

As discussed previously, the position of the effective pivot point of the movement of the patient (25) during patient handling is highly influential on:

- the input force required by the carer (12) to raise the patient (25) through the vertical component of its movement trajectory;
- the comfort and ergonomic compatibility of the movement on the patient (25), and
- the ability of the relative movements imposed by the patient moving device (1, 100, 200) by any rotations about a pivot point are compatible and sympathetic to the natural movements of a human body. The inclusion of pivot points (17, 11) respectively at both the patient's knee pivot axis (38) and ankle joint axis (68) enables the reorientation mechanism (4, 80) to at least partially mimic the ankle and knee bending motion performed by a human standing from a seated position.

Thus, optimising the positions of the pivot axes (20, 21, 22) is a key design criterion for a patient moving device (3). Despite the above-discussed efficacy of using a plurality of pivots, an inherent consequence is that the resultant path traversed by the patient support (5) is not a constant radius circular arc section, but instead is curvilinear, compounded by the effects of both rotations.

Thus, to effectively analyse, define and compare the attributes of different reorientation mechanism configurations, it is necessary to utilise some alternative representations for the rotational behaviour of a body such as the kinematic concept of an instant centre of rotation. Also known as the instant velocity centre, the instant centre of rotation is a point fixed to (or, relative to) a body undergoing planar movement that has zero velocity at a particular instant of time while the velocity vectors of the trajectories of other points in the body generate a circular field around this point.

Performing repeated or multiple instant centre of rotation calculations enables the generation of:

- an averaged centre-of-rotation; i.e., the average of multiple instant centre of rotation measurements, and
- a centroid; i.e., the path traced by the instantaneous centre of rotation.

Figure 21B:
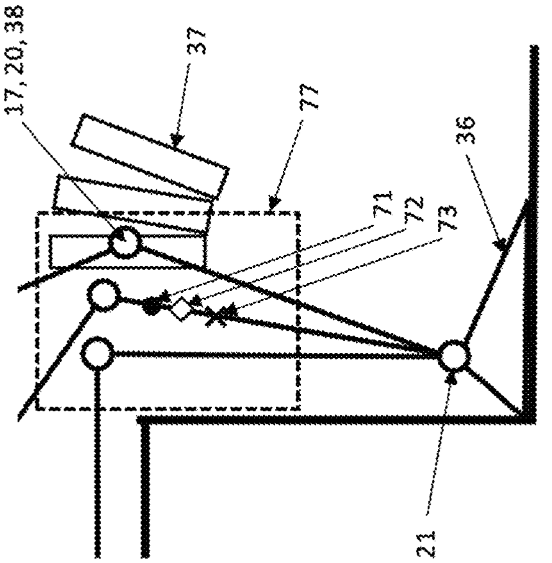
FIG. 21B shows an enlarged view of the review of FIG. 21A adjacent the primary pivot axis/knee joint axis.
Figure 21A:
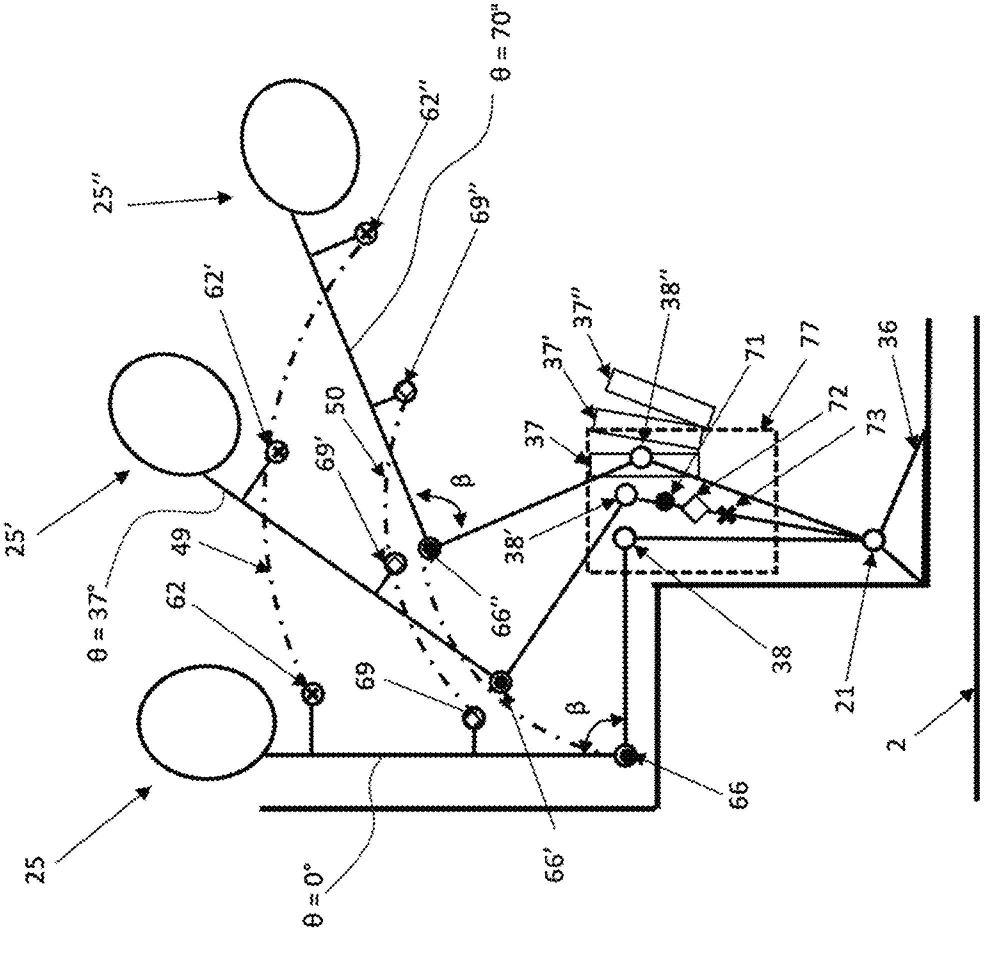
FIG. 21A shows a schematic diagram of the movement trajectories of averaged centre of rotations of patient components during patient handling.

FIG. 21A shows an exemplary schematic representation of the movement trajectories of a patient (25) during patient handling movement through a torso inclination angle θ of 70°, with an interior hip angle β of 135°, and an ankle/tibia joint rotation about the secondary pivot of Ω around 15°. The respective paths traced by the patient's hips (66), CoM (69), and Jugular notch (62) depicted between the start, midpoint and end position are also shown, together with the averaged centre-of-rotation (CoR) positions (i.e., hip CoR (71), CoM CoR (72), Jugular notch CoR (73)) respectively, calculated from the start, midpoint and end position for each of the hips (66), CoM (69) and Jugular notch (62) respectively. FIG. 21B shows an enlarged view of the review of FIG. 21A adjacent the primary pivot axis (20)/knee joint axis (38). It will be appreciated that while convenient, the illustration of the midpoint CoR positions is not limiting and any point other point along the trajectory path may be calculated and displayed.

Figure 22B:
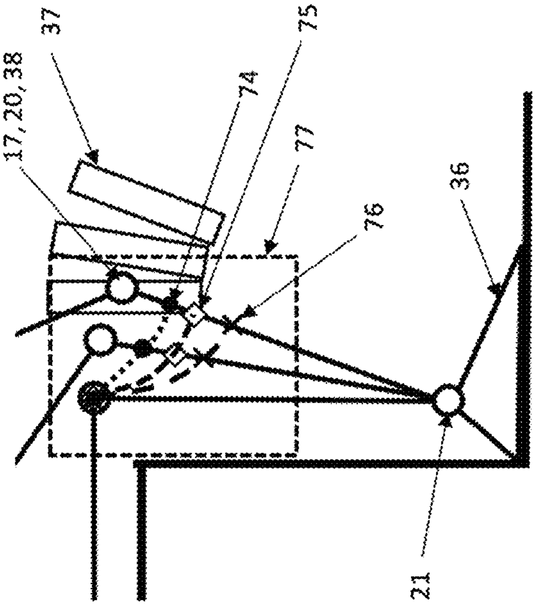
FIG. 22B shows an enlarged view of the review of FIG. 22A adjacent the primary pivot axis/knee joint axis.
Figure 22A:
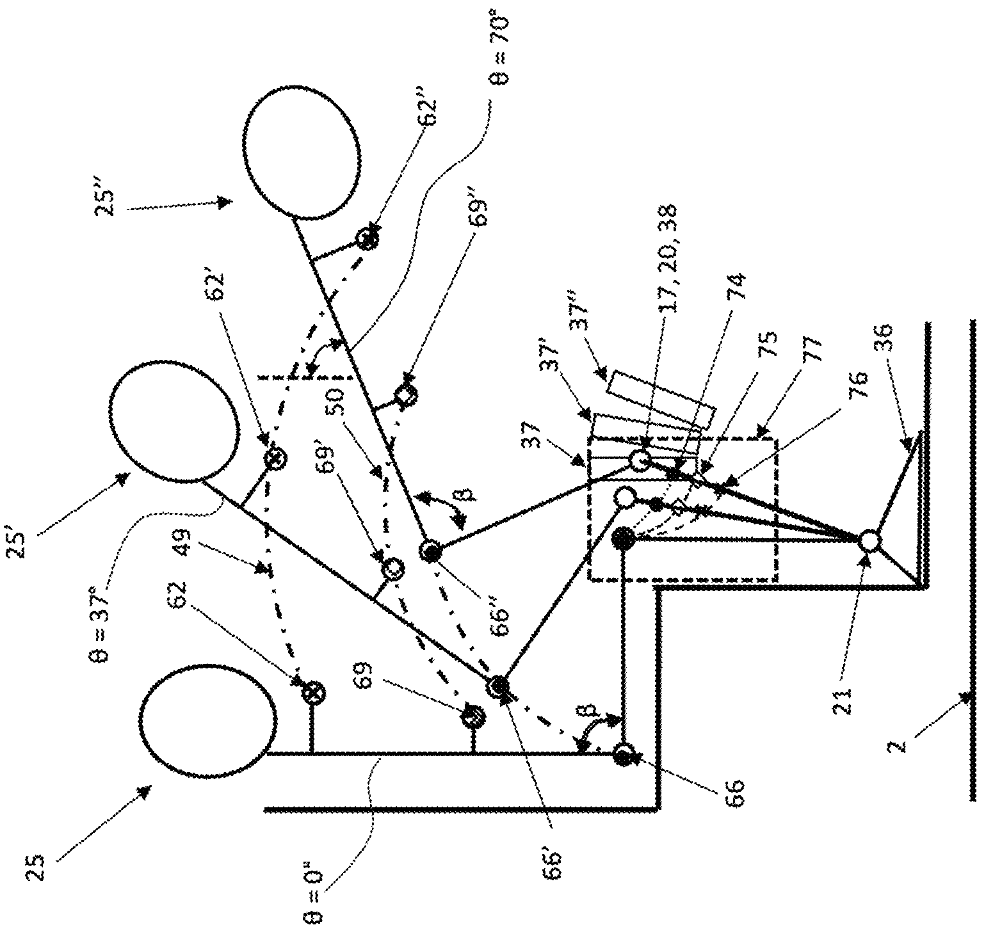
FIG. 22A shows a schematic diagram of the movement trajectories of centroid positions of patient components during patient handling.

FIG. 22A shows a schematic representation corresponding to FIG. 21, of the movement trajectories of a patient (25) during patient handling movement through a torso inclination angle θ of 70°, with an interior hip angle R of 135°, and an ankle/tibia joint rotation at the secondary pivot of Ω around 15°. The respective paths traced by the patient's hips (66) CoM (69) and Jugular notch (62) depicted between the start, midpoint and end position are also shown, together with corresponding centroid positions (i.e., hip centroid (74), CoM centroid (75), Jugular notch centroid (76)), respectively calculated continuously from the start, via the midpoint and to an end position for each of the hips (66), CoM (69) and Jugular notch (62) respectively. To aid clarity, FIG. 22B shows an enlarged view of the view of FIG. 22A adjacent the primary pivot axis (20)/knee joint axis (38).

As shown in FIGS. 21 and 22, both the averaged centre-of-rotations (71, 72, 73) and centroid representations (74, 75, 76) are adjacently clustered in an 'effective' pivot' region (77) located in front of the patient's knee joint axis (38) in the horizontal plane and substantially at or below the knee joint axis (38) and above the ankle/secondary pivot axis (21) in the vertical plane.

This configuration provides the aforementioned desired effects of an 'effective', 'virtual' or 'equivalent' pivot position during patient handling which allows the patient (25) to be tilted forwards without excessive vertical movements, whilst minimising undesirable hamstring stretching. It will be also understood that as the patient's knee contact surface (40) (not shown in FIGS. 21-22) is in contact with the knee-rests (28), located co-axially with the primary pivot axis (20), the position of an averaged centre-of-rotation (71, 72, 73) and centroid representations (74, 75, 76) may be readily defined with respect to the primary pivot axis (20).

Thus, the averaged hip, CoM and/or Jugular notch centre-of-rotation (71, 72, 73) during patient handling is located within at least one of:

- a rectangular region dimensioned 250 mm×450 mm horizontally and vertically respectively, and positioned 50 mm horizontally towards the patient side (25) and 400 mm vertically downwards from the primary pivot axis (20);
- a rectangular region 175 mm×325 mm horizontally and vertically respectively, and positioned 50 mm horizontally towards the patient side (25) and 400 mm vertically downwards from the primary pivot axis (20);
- a rectangular region extending 150 mm horizontally towards the patient side (25) and 300 mm vertically from the primary pivot axis (20).

The hip, CoM and/or Jugular notch centroid (74, 75, 76) is located within at least one of:

- a rectangular region dimensioned 250 mm×450 mm horizontally and vertically respectively, and positioned 50 mm horizontally towards the patient side (25) and 400 mm vertically downwards from the primary pivot axis (20);
- a rectangular region 175 mm×325 mm horizontally and vertically respectively, and positioned 50 mm horizontally towards the patient side (25) and 400 mm vertically downwards from the primary pivot axis (20);
- a rectangular region extending 150 mm horizontally towards the patient side (25) and 300 mm vertically from the primary pivot axis (20).

Therefore, the present invention may, at least in part, be distinguished from the prior art by the identifying characteristic that an averaged centre-of-rotation (72) or centroid (75) of the path of the CoM during patient handling is located within said effective pivot region (77).

Changing an observer's frame-of-reference origin to be positioned at a specific part of the patient moving device (1) provides a powerful simplification tool to depict, compare and analyse the relative movements of the patient moving device (1) and its components.

As shown and discussed above, the rotational movement of the primary pivot (17) about the primary pivot axis (20) causes the reorientation mechanism (4) and, thus, the attached patient support (5)) to circumscribe a constant-radius circular arc. This circular arc movement of the reorientation mechanism/patient support (4, 5), is superimposed/compounded with the separate circular arc path circumscribed by rotational movement of the secondary pivot (11) (at, or adjacent the patient's ankles (68) about the secondary pivot axis (21). The resultant composite movement is a curvilinear path and is inherently more difficult to compare directly with the movement produced by other patient moving devices. This composite movement does allow the patient's knees contact surfaces (40) (in contact with the knee-rests (37) at the primary pivot (17)) to move forwards concurrently with their torso (63) being rotated forwards in conjunction with the rotational movement of the patient support (5).

As identified previously, it is this very composite movement that provides key advantages over prior art alternatives with fixed position knee-rests (37), or those without knee rests (37) altogether.

Redefining the observer's frame of reference origin to be the primary pivot axis, allows the movement of both the secondary pivot and the reorientation mechanism/patient support about the primary pivot axis to be represented by simple, constant-radius, circular arcs.

Figure 23:
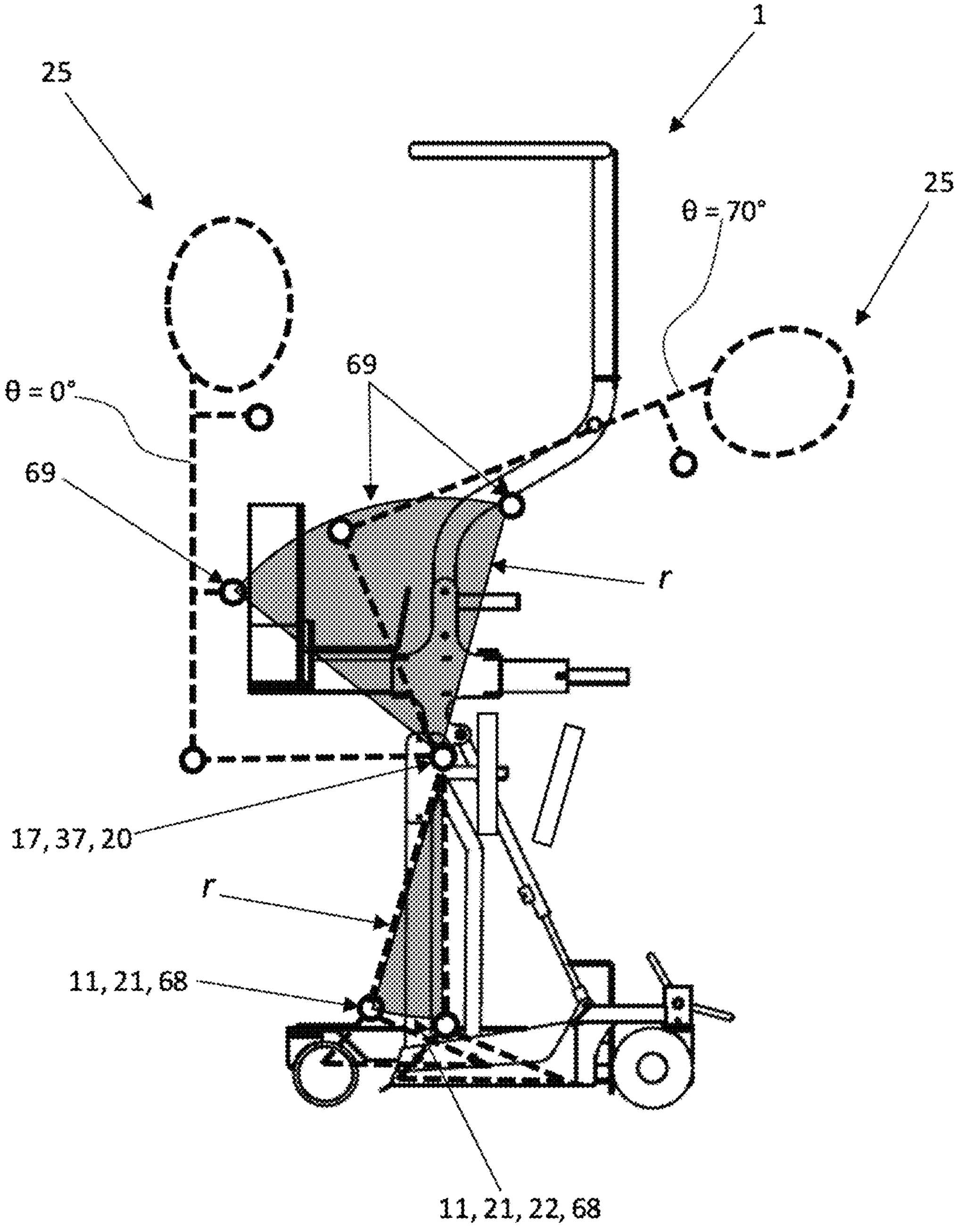
FIG. 23 shows a schematic diagram of the movement trajectories of device components during patient handling.
Figure 24:
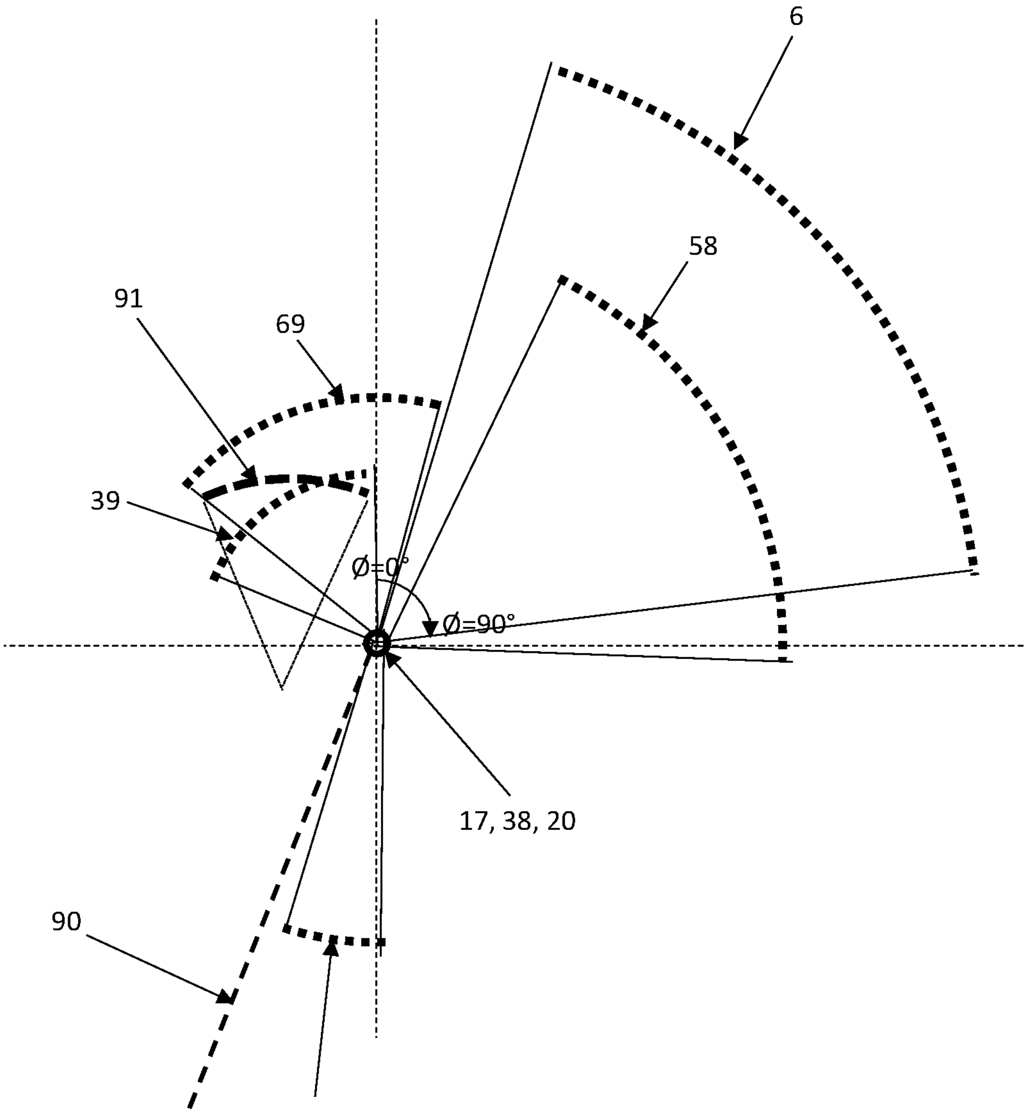
FIG. 24 shows a graphical plot representation of the movement trajectories shown in FIG. 23, with respect to the primary pivot axis at the plot origin.
Figure 25:
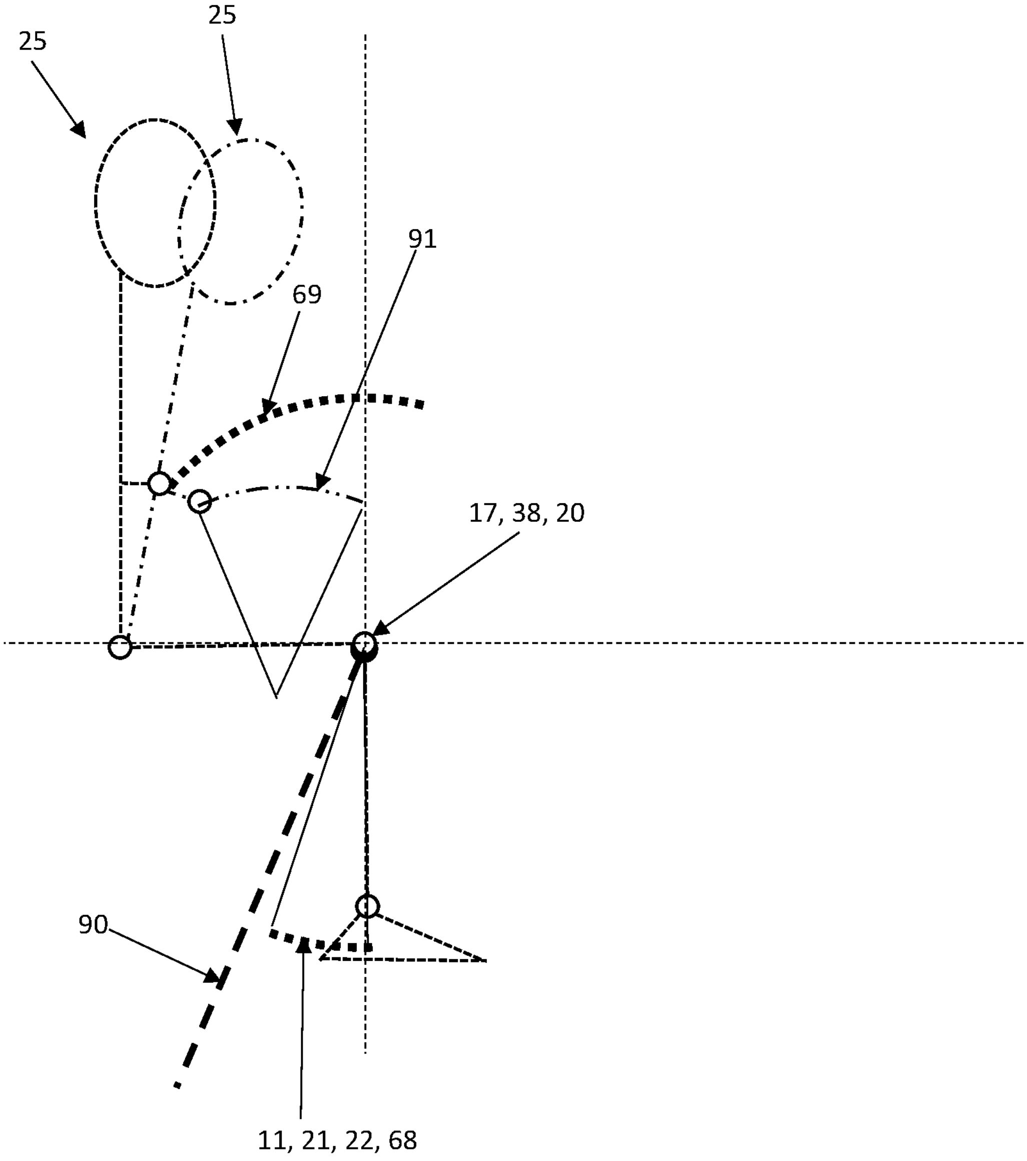
FIG. 25 shows a similar graphical plot representation as FIG. 24 but of the movement trajectories of exemplary prior art devices.

FIGS. 23-25 provide an alternative interpretation, explanation and analysis means to visualise, conceptualise and/or represent the spatial, dynamic and geometric inter-relationships of the components of the patient moving device (1) during patient handling entirely with respect to said primary pivot axis (17), whereby any relative rotational movement of any part or point on the patient-moving device (1) is defined by a predetermined angular range Ø (where Ø is measured clockwise and where 0° is vertical).

In instances where the value is known, the linear separation between the primary pivot axis (20) and any other part, or point, of the patient moving device (1) may be represented in conjunction with the angular value Ø, by a radius value r. Such notation or nomenclature is also widely referred to as a polar co-ordinate system, i.e. with a reference point/origin referred to as the pole, where the angular value Ø is also referred to as the angular coordinate, polar angle, or azimuth and the radius value r as the radial coordinate, radial distance or just radius from the pole.

In FIG. 23, the movement of the patient movement device (1) is depicted between the patient loading and unloading positions. As representative metrics, the path travelled by the CoM (69) and the tertiary pivot (22), with respect to the primary pivot/primary pivot axis/knee rests (17, 20, 37) are shown with respective predetermined angular range Ø and radius r. Both the CoM (69) and tertiary axis (22) paths are also transposed onto a polar diagram shown in FIG. 24, together with several other relative rotations.

In addition to the CoM (69) and tertiary pivot (22), plots of the relative movement of any point or region of interest may be easily created using the polar co-ordinates showing the relative rotational movement of any other part or position of the patient moving device (1) during said patient handling, including the:

- secondary pivot (21)
- chassis (3);
- patient-support (5);
- reorientation mechanism (4),
- operating handle (6),
- patient securement strap (56)
- any part of same, and/or
- any other point on said patient-moving device,
- defined by a corresponding annulus sector or arc, each annulus sector or arc individually defined by a predetermined angular range and radius range Ø, r.

Solely for comparative value, FIG. 24 also shows the patient handling paths travelled by;

- the distal end of the operating handle (6),
- the securement point (58) of the patient securement strap (56) to the handle (6) with Ø=24-94.5° (for θ=70°) and r=560 mm,
- lowermost point of a patient-engaging outer surface (39) of the patient-support (5) with Ø=280-350° (for θ=70°) and r=310 mm,
- together with the
- CoM (69) arc with Ø=208.5-278.5° (for θ=70°) and r=434 mm, and
- Tertiary pivot (22) arc with Ø=180°-198.5° (for θ=70° and Ω=15°) and r=41 mm It will be noted that any part, or point, of the patient moving device (1) not undergoing any relative rotational movement with respect to said primary pivot axis (17) will be represented by a fixed angular point, i.e., not an arc.

It should be further noted that any prior art patient moving devices with fixed position knee-rests (relative to the chassis/patient's ankles) will produce non-constant radius arcs for its CoM path relative to the knee joint axis and are thus easily distinguishable from the preferred embodiments described herein.

FIG. 25 shows, by way of comparison with the present embodiment, the prior art device shown in FIG. 10 with fixed position knee rests (37) (with respect to the chassis (2)). The relative movement of the prior art device of its CoM arc (91) is not at a fixed radius to the primary pivot axis (20) and the fixed angular value (90) (with Ø=195°) of its secondary pivot (11) contrasts starkly with the angular arc of Ø=180°-198.5° for the present embodiment.

Figure 26:
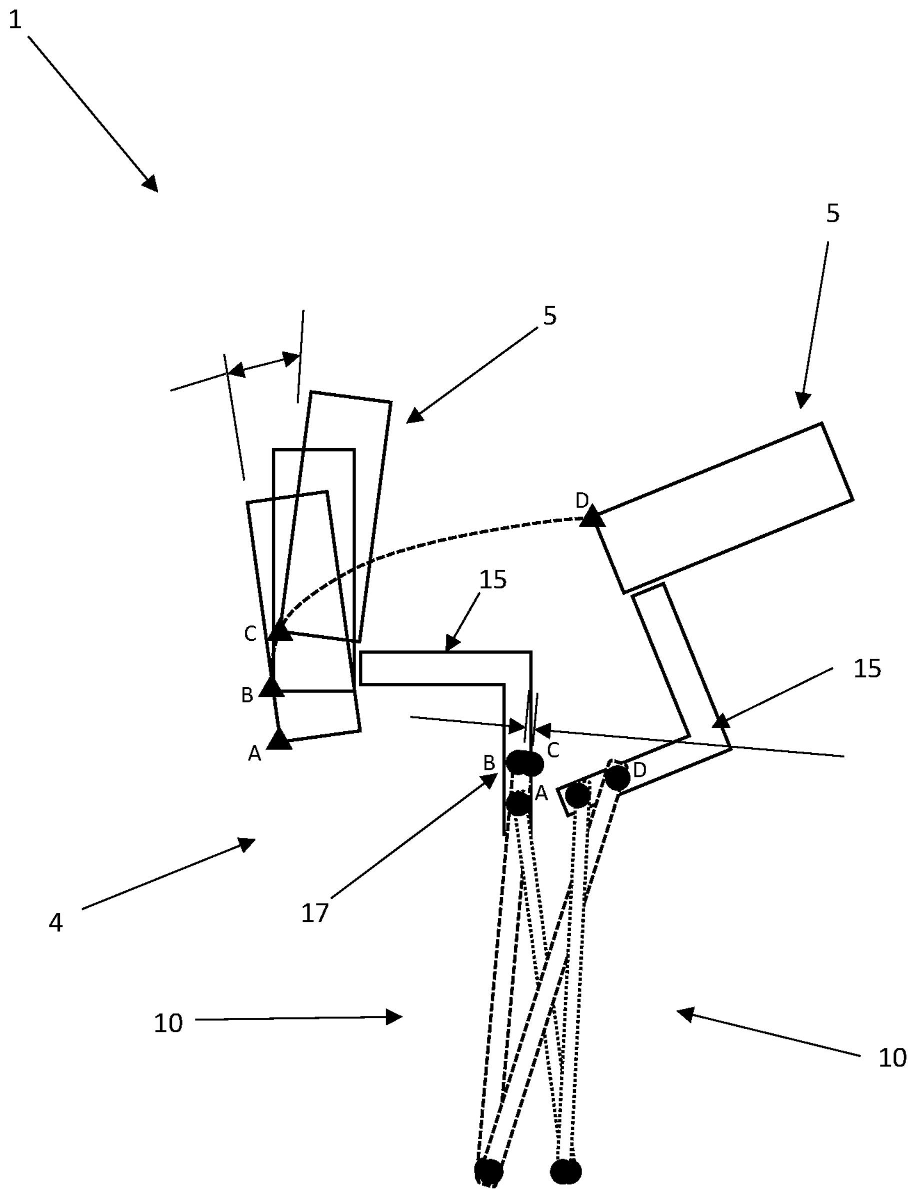
FIG. 26 shows a similar graphical plot representation as FIG. 24 but of the movement trajectories of exemplary prior art devices.

It will be appreciated that patients may not be sitting on seating of uniform height or orientation and it may be necessary to lower or raise the patient support (5) so it engages with the proper portion of the patient's anterior torso. It may be possible to provide a vertical adjustment mechanism on the patient support attachment to the coupler link (15) to achieve such variability. However, the particular geometry of the coupled reorientation mechanism (4) of preferred embodiments enables the patient support (5) to be raised or lowered vertically without moving the patient support (5) relative to the coupler link (15). FIG. 26 shows a schematic representation of the vertical height adjustment capabilities of the patient moving device (1).

In FIG. 26, position 'B' of the patient support (5) shows the patient support with contact surface (39) aligned vertically. If the patient is at a lower seating the reorientation mechanism may be rotated to lower the patient support vertically to position 'A'. If the patient is at a higher seating the reorientation mechanism may be rotated to raise the patient support vertically to position 'C'. Position 'D' represents the patient support (5) in the transport position.

As can be seen from FIG. 26, the reorientation mechanism (4) may be reorientated such that the patient support (5) is raised or lowered without significantly moving the primary pivot (17).

Preferred embodiments of the invention have been described by way of example only and modifications may be made thereto without departing from the scope of the invention.

The invention claimed is:

1. A patient-moving device for patient handling, said patient handling including raising and lowering a seated patient between sitting and transport positions, and moving a raised patient in the transport position, said device including:

a terrain-engaging mobile chassis;

a primary pivot, pivotable about a primary pivot axis;

a secondary pivot, pivotable about a secondary pivot axis and located eccentrically from said primary pivot;

a patient-support, formed to engage with, and at least partially support, a patient's anterior torso during patient handling;

at least one knee-rest, formed to engage with, and at least partially support, a patient's anterior knee surfaces during patient handling;

a reorientation mechanism, coupled to said patient-support, said primary pivot and said chassis, wherein said reorientation mechanism includes an operating handle, a patient securement strap extending from the reorientation mechanism and configured to form a loop around at least the patient's posterior torso in use, and wherein:

operation to reorientate the operating handle during patient handling to raise or lower a seated patient between the sitting and transport positions respectively re-orientates the patient support between a patient loading/unloading configuration and a patient transport configuration;

the at least one knee rest is movable relative to at least a portion of the chassis and is connected to, or proximal to, or located at, said primary pivot;

said patient support is movable relative to the chassis by rotation of at least one of:

said primary pivot;

said secondary pivot, a path traversed by the patient support during patient handling is defined by at least one corresponding averaged centre-of-rotation, the average centre-of-rotation located:

at or below the primary pivot in the vertical plane, and above the terrain-engaging mobile chassis in the vertical plane, said averaged centre-of-rotation is calculated from at least a start point, mid-point and end point of the patient handling to raise or lower a seated patient between the initial sitting position and the transport position;

said averaged centre-of-rotation is located within an effective-pivot region, the effective-pivot region defined, with respect to the initial sitting position, by a rectangle oriented in a vertical plane orthogonal to said primary pivot axis, the rectangle having four vertices, including a first reference vertex offset from the primary pivot:

400 mm downwards, and 50 mm horizontally in a first direction, and said rectangle is defined by vertical and horizontal sides, respectively extending from the first vertex:

450 mm upwards, and 250 mm horizontally in a second direction, opposite to the first direction.

2. A patient-moving device as claimed in claim 1, wherein the at least one knee rest is movable relative to at least a portion of the chassis by being pivotable about a tertiary pivot axis, the tertiary pivot axis located eccentrically from said primary pivot axis.

3. A patient-moving device as claimed in claim 1, wherein the at least one knee rest movement during patient handling correlates with, or is proximal to, the movement of said primary pivot.

4. A patient-moving device as claimed in claim 1, wherein the secondary pivot axis is located on the chassis.

5. A patient-moving device as claimed in claim 1, wherein the patient securement strap is securable to the operating handle at a position subtending an angle of φ 60°, +/−7.5° from vertically upright with the patient support orientated in said patient loading configuration.

6. A patient-moving device as claimed in claim 1, wherein the at least one knee-rest is attached to the reorientation mechanism.

7. A patient-moving device as claimed in claim 1, wherein the at least one knee-rest is attached to the reorientation mechanism such that the at least one knee-rest rotates about the secondary pivot axis as the patient support rotates about the primary pivot axis.

8. A patient-moving device as claimed in claim 1, configured such that during operation to reorientate the patient support through an angular movement θ between a patient loading/unloading configuration and a patient transport configuration via reorientation of the coupled reorientation mechanism, said reorientation mechanism is configured such that the primary pivot moves in an arc through an angle Ω about the secondary pivot axis, where angles θ and Ω are selected from one of:

v. θ=90° to 45°,
Ω=5° to 30°, vi. θ=90° to 50°,
Ω=11.5° to 25°, vii. θ=60° to 80°,
Ω=14° to 21°, and viii. θ=70°,
Ω=15°.

9. A patient-moving device as claimed in claim 1, configured such that during operation to reorientate the patient support between a patient loading/unloading configuration and a patient transport configuration via manipulation of the coupled reorientation mechanism, the patient support rotates through an inclination angle θ, while said primary pivot moves in an arc through an angle Ω about the secondary pivot and a distance δ, where angles Ω, θ and distance δ are selected from one of:

i. Ω=5° to 30°,
θ=90° to 45°,
δ=40 to 250 mm, ii. Ω=11.5° to 25°,
θ=90° to 50°,
δ=80 to 180 mm, iii. Ω=14° to 21°,
θ=80° to 60°,
δ=100 to 150 mm, i. Ω=15°,
θ=70°,
δ=130 mm.

10. A patient-moving device as claimed in claim 1, wherein said reorientation mechanism includes a multi-bar linkage, said multi-bar linkage including:

a first support link pivotable relative to the chassis about the second pivot;

a second support link pivotable relative to the chassis about a fourth pivot;

a coupler link pivotally attached to the first support link at the first pivot and pivotally attached to the second support link at a third pivot, wherein the moveable patient support is coupled to the coupler link.

11. A patient moving device as claimed in claim 1, including:

a first support link pivotable relative to the chassis about a second pivot;

a second support link pivotable relative to the chassis about a fourth pivot;

a coupler link pivotally attached to the first support link at a first pivot, and pivotally attached to the second support link at a third pivot, wherein the patient support is mounted in fixed relation to the coupler link;

the operating handle operably attached to the coupler link for moving the device between the patient loading/unloading configuration and the patient-transport configuration, and wherein movement of the coupler link and thereby the patient support is constrained by the first and second support links.

12. A patient moving device as claimed in claim 11, wherein the chassis, first support link, second support link, and coupler link form a four-bar mechanism, wherein, in the transport position, a virtual line extending between the first pivot and the third pivot intersects a virtual line extending between the second pivot and the fourth pivot.

13. A patient moving device as claimed in claim 11, wherein, in the patient loading/unloading position, the first pivot is vertically aligned with the second pivot.

14. A method of patient handling using a patient-moving device for patient handling, said patient-moving device including:

a terrain-engaging mobile chassis;

a primary pivot, pivotable about a primary pivot axis;

a secondary pivot, pivotable about a secondary pivot axis and located eccentrically from said primary pivot;

a patient-support, formed to engage with, and at least partially support, a patient's anterior torso during patient handling;

at least one knee-rest, formed to engage with, and at least partially support, a patient's anterior knee surfaces during patient handling;

a reorientation mechanism, coupled to said patient-support, said primary pivot and said chassis, wherein said reorientation mechanism includes an operating handle, a patient securement strap extending from the reorientation mechanism and configured to form a loop around at least the patient's posterior torso in use, and wherein:

operation to reorientate the operating handle during patient handling to raise or lower a seated patient between the sitting and transport positions respectively re-orientates the patient support between a patient loading/unloading configuration and a patient transport configuration;

said at least one knee rest is movable relative to at least a portion of the chassis and is connected to, or proximal to, or located at, said primary pivot, and said patient support is movable relative to the chassis by rotation of at least one of:

said primary pivot;

said secondary pivot, wherein said patient handling includes raising and lowering a seated patient between sitting and transport positions, and moving a raised patient in the transport position, said method including:

operation to reorientate the operating handle during patient handling to raise or lower a seated patient between an initial sitting position and a transport position, thereby re-orientating the patient support between a patient loading/unloading configuration and a patient transport configuration;

said patient support moving relative to the chassis by rotation of said primary pivot and/or said secondary pivot, and the at least one knee rest moving relative to at least a portion of the chassis;

wherein a path traversed by the patient support during patient handling is defined by at least one corresponding averaged centre-of-rotation, the average centre-of-rotation located:

at or below the primary pivot in the vertical plane, and above the terrain-engaging mobile chassis in the vertical plane, wherein said averaged centre-of-rotation is calculated from at least a start point, mid-point and end point of the patient handling to raise or lower a seated patient between the initial sitting position and the transport position;

wherein said averaged centre-of-rotation is located within an effective-pivot region, the effective-pivot region defined, with respect to the initial sitting position, by a rectangle oriented in a vertical plane orthogonal to said primary pivot axis, the rectangle having the rectangle having four vertices, including a first reference vertex offset from the primary pivot:

400 mm downwards, and 50 mm horizontally in a first direction, and wherein said rectangle is defined by vertical and horizontal sides, respectively extending from the first vertex, 450 mm upwards, and 250 mm horizontally in a second direction, opposite to the first direction.

15. A method of patient handling as claimed in claim 14, further including:

fitting a patient securement strap in a loop around the patient's torso posterior, and securing the patient securement strap to at least one of:

i. the patient support;

ii. the operating handle;

iii. the reorientation mechanism;

adjusting the patient securement strap to engage the patient with the patient support, such that the patient securement strap is securable to the patient support at a position subtending an angle of $\varphi$ 60° (+/−7.5°) from vertically upright with the patient support orientated in said patient loading configuration.

16. A patient-moving device as claimed in claim 1, configured such that during operation to reorientate the patient support through an angular movement $\theta$ between a patient loading/unloading configuration and a patient transport configuration via reorientation of the coupled reorientation mechanism, said reorientation mechanism is configured such that the primary pivot moves in an arc through an angle $\Omega$ about the secondary pivot axis, where the ratio $\theta:\Omega$ is selected from one of:

18 to 1.5;

7.8 to 2;

5.7 to 2.9, or 4.7.

17. A patient-moving device as claimed in claim 1, configured such that during operation to reorientate the patient support between a patient loading/unloading configuration and a patient transport configuration via manipulation of the coupled reorientation mechanism, the patient support rotates through an inclination angle θ, while said primary pivot moves in an arc through an angle Ω about the secondary pivot and a distance δ, where the ratio δ:θ is selected from one of:

5.6 to 0.45 mm/degree;

3.6-0.9 mm/degree;

2.5-1.25 mm/degree;

1.8 mm/degree.

18. A method of patient handling as claimed in claim 14, wherein the patient-moving device is configured to maintain a constant hip angle β during patient handling.

19. A method of patient handling as claimed in claim 14, wherein the patient moving device is configured to maintain a seated hip angle β between 80°-110°, during raising, lowering and transport.

* * * * *